(12) United States Patent
Lee et al.

(10) Patent No.: US 12,118,565 B2
(45) Date of Patent: \*Oct. 15, 2024

(54) TRANSACTION EXCHANGE PLATFORM WITH A PAUSE MICROSERVICE TO PAUSE PROCESSING OF WORKFLOWS

(71) Applicant: Capital One Services, LLC, McLean, VA (US)

(72) Inventors: Earle Michael Lee, Midlothian, VA (US); David Smit, Richmond, VA (US); Brian T. Burnett, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/077,613

(22) Filed: Dec. 8, 2022

(65) Prior Publication Data
US 2023/0108180 A1   Apr. 6, 2023

Related U.S. Application Data

(63) Continuation-in-part of application No. 17/389,045, filed on Jul. 29, 2021, now Pat. No. 11,562,368.
(Continued)

(51) Int. Cl.
*G06F 11/14* (2006.01)
*G06F 11/07* (2006.01)
(Continued)

(52) U.S. Cl.
CPC ....... *G06Q 20/425* (2013.01); *G06F 11/0745* (2013.01); *G06F 11/0757* (2013.01);
(Continued)

(58) Field of Classification Search
CPC .. G06Q 20/425; G06Q 20/085; G06Q 20/401; G06Q 20/389; G06Q 20/4016;
(Continued)

(56) References Cited

U.S. PATENT DOCUMENTS

| 5,596,754 A | 1/1997 | Lomet |
| 7,110,969 B1 | 9/2006 | Bennett et al. |

(Continued)

FOREIGN PATENT DOCUMENTS

| CN | 108052996 A | 5/2018 |
| CN | 111666291 A | 9/2020 |

OTHER PUBLICATIONS

Rimma Nehme, Efficient Query Processing for Rich and Diverse Real-Time Data, Purdue University, Jun. 10, 2009 (Year: 2009).
(Continued)

*Primary Examiner* — Maher N Algibhah
(74) *Attorney, Agent, or Firm* — Banner & Witcoff, Ltd.

(57) ABSTRACT

Aspects described herein may relate to a transaction exchange platform using a streaming data platform (SDP) and microservices to process transactions according to review and approval workflows. The transaction exchange platform may receive transactions from origination sources, which may be added to the SDP as transaction objects. Microservices on the transaction exchange platform may interact with the transaction objects based on configured workflows associated with the transactions. Processing on the transaction exchange platform may facilitate clearing and settlement of transactions. Some aspects may provide for pausing the processing of transactions during a workflow. Other aspects may provide for a messaging microservice that permits communications between the transaction exchange platform and external third-parties.

30 Claims, 25 Drawing Sheets

Related U.S. Application Data which is a continuation of application No. 16/723,545, filed on Dec. 20, 2019, now Pat. No. 11,080,120.

(51) Int. Cl.
   *G06F 16/23* (2019.01)
   *G06Q 20/08* (2012.01)
   *G06Q 20/40* (2012.01)
   *G06Q 20/42* (2012.01)

(52) U.S. Cl.
   CPC ...... *G06F 11/1405* (2013.01); *G06F 11/1474* (2013.01); *G06F 16/2379* (2019.01); *G06Q 20/085* (2013.01); *G06Q 20/401* (2013.01)

(58) Field of Classification Search
   CPC .......... G06F 11/07; G06F 11/14; G06F 16/23; G06F 16/24
   See application file for complete search history.

(56) References Cited

U.S. PATENT DOCUMENTS

| | | |
|---|---|---|
| 9,754,318 B1 | 9/2017 | Spies et al. |
| 10,474,977 B2 | 11/2019 | Stevens et al. |
| 10,839,022 B1 | 11/2020 | Klein et al. |
| 2005/0015425 A1 | 1/2005 | Kumar et al. |
| 2006/0149611 A1 | 7/2006 | Diep et al. |
| 2007/0100961 A1 | 5/2007 | Moore |
| 2007/0185872 A1 | 8/2007 | Ho et al. |
| 2007/0276714 A1 | 11/2007 | Beringer |
| 2007/0288459 A1 | 12/2007 | Kashiyama et al. |
| 2007/0288635 A1 | 12/2007 | Gu et al. |
| 2008/0010198 A1 | 1/2008 | Eliscu |
| 2009/0313311 A1 | 12/2009 | Hoffmann et al. |
| 2010/0138438 A1 | 6/2010 | Torikai et al. |
| 2010/0232286 A1 | 9/2010 | Takahashi et al. |
| 2011/0047054 A1 | 2/2011 | Ginter et al. |
| 2012/0030094 A1 | 2/2012 | Khalil |
| 2012/0310881 A1 | 12/2012 | Shadmon |
| 2013/0152021 A1 | 6/2013 | Hatfield et al. |
| 2013/0152041 A1 | 6/2013 | Hatfield et al. |
| 2014/0372394 A1 | 12/2014 | Frankel et al. |
| 2015/0088756 A1 | 3/2015 | Makhotin et al. |
| 2015/0379514 A1 | 12/2015 | Poole |
| 2016/0004751 A1 | 1/2016 | Lafuente Alvarez et al. |
| 2016/0035014 A1 | 2/2016 | Smith |
| 2016/0092488 A1 | 3/2016 | Sun et al. |
| 2016/0110687 A1 | 4/2016 | Kamat et al. |
| 2016/0124742 A1 | 5/2016 | Rangasamy et al. |
| 2016/0253645 A1 | 9/2016 | Ciabarra et al. |
| 2016/0307190 A1 | 10/2016 | Zarakas et al. |
| 2017/0041189 A1 | 2/2017 | Aswathanarayana et al. |
| 2018/0077038 A1* | 3/2018 | Leff ...................... H04L 67/142 |
| 2018/0101848 A1 | 4/2018 | Castagna et al. |
| 2018/0307514 A1* | 10/2018 | Koutyrine ........... G06F 11/0706 |
| 2018/0332138 A1 | 11/2018 | Liu et al. |
| 2019/0043207 A1 | 2/2019 | Carranza et al. |
| 2019/0199626 A1 | 6/2019 | Thubert et al. |
| 2019/0333069 A1 | 10/2019 | Noble et al. |
| 2020/0004604 A1 | 1/2020 | Lavoie et al. |
| 2020/0241944 A1 | 7/2020 | Derdak et al. |
| 2020/0257676 A1 | 8/2020 | Zhang et al. |
| 2020/0310830 A1 | 10/2020 | Morgan et al. |
| 2021/0192515 A1 | 6/2021 | Lee et al. |
| 2021/0357947 A1 | 11/2021 | Lee et al. |

OTHER PUBLICATIONS

Nov. 25, 2020—Final Rejection—U.S. Appl. No. 16/723,545.
Oct. 16, 2020—Final Rejection—U.S. Appl. No. 16/723,509.
Feb. 1, 2021—Notice of Allowance—U.S. Appl. No. 16/723,439.
Rathnayake, A Realtime Monitoring Platform forWorkflow Subroutines, 2018 IEEE (Year: 2018).
Feb. 12, 2021—Notice of Allowance—U.S. Appl. No. 16/723,509.
Apr. 1, 2021—International Search Report and Written Opinion—PCT/US2020/065979.
Mar. 21, 2024—(WO) International Search Report and Written Opinion—App No. PCT/US2023/085884.
Anonymous: "Documentation : Redis", Jan. 3, 2023, XP093137739, https://redis.io/docs, pp. 1-65.
Apr. 3, 2024—(WO) International Search Report and Written Opinion—App No. PCT/US2023/082686.
May 13, 2024—(WO) International Search Report and Written Opinion—App No. PCT/US2023/085366.

* cited by examiner

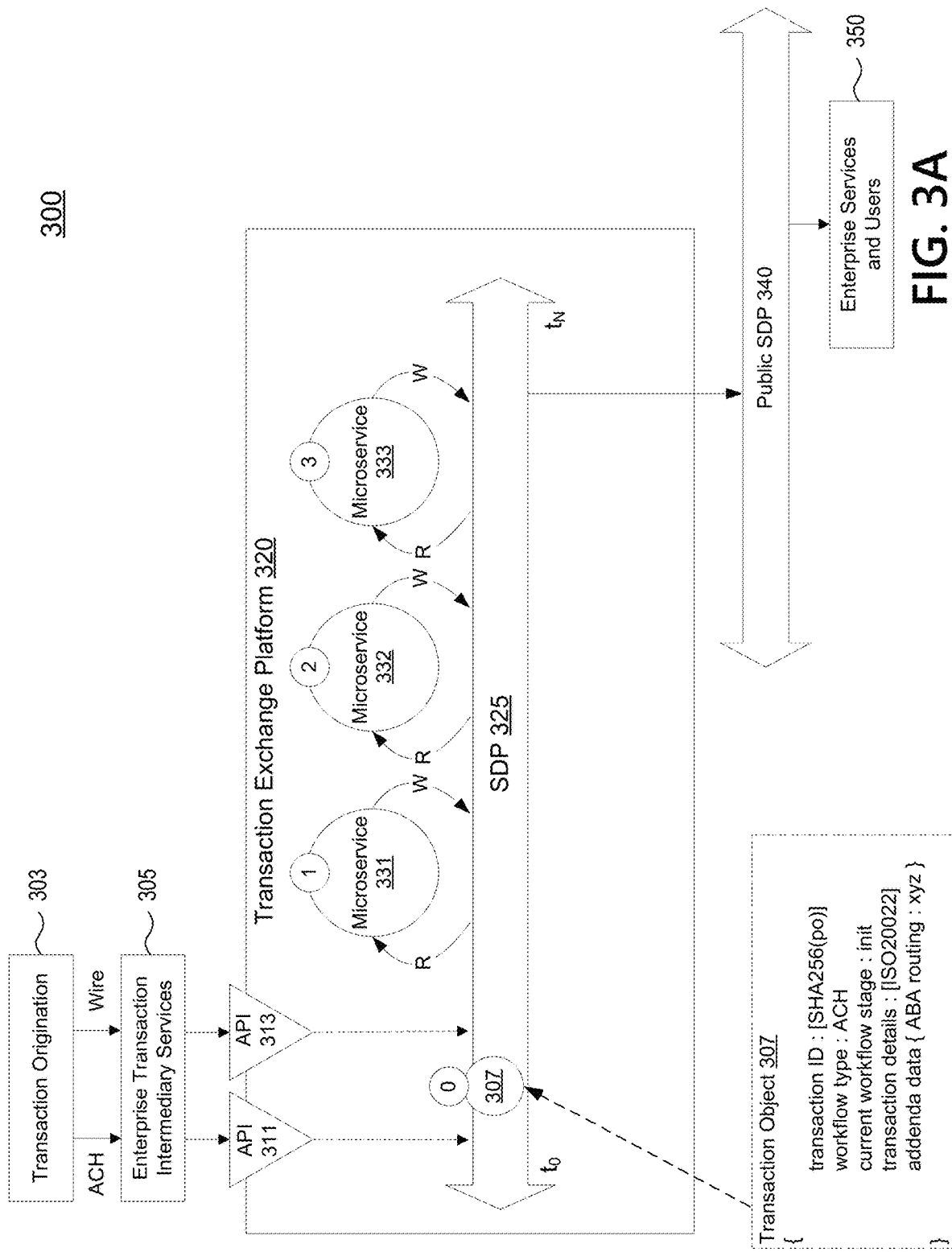

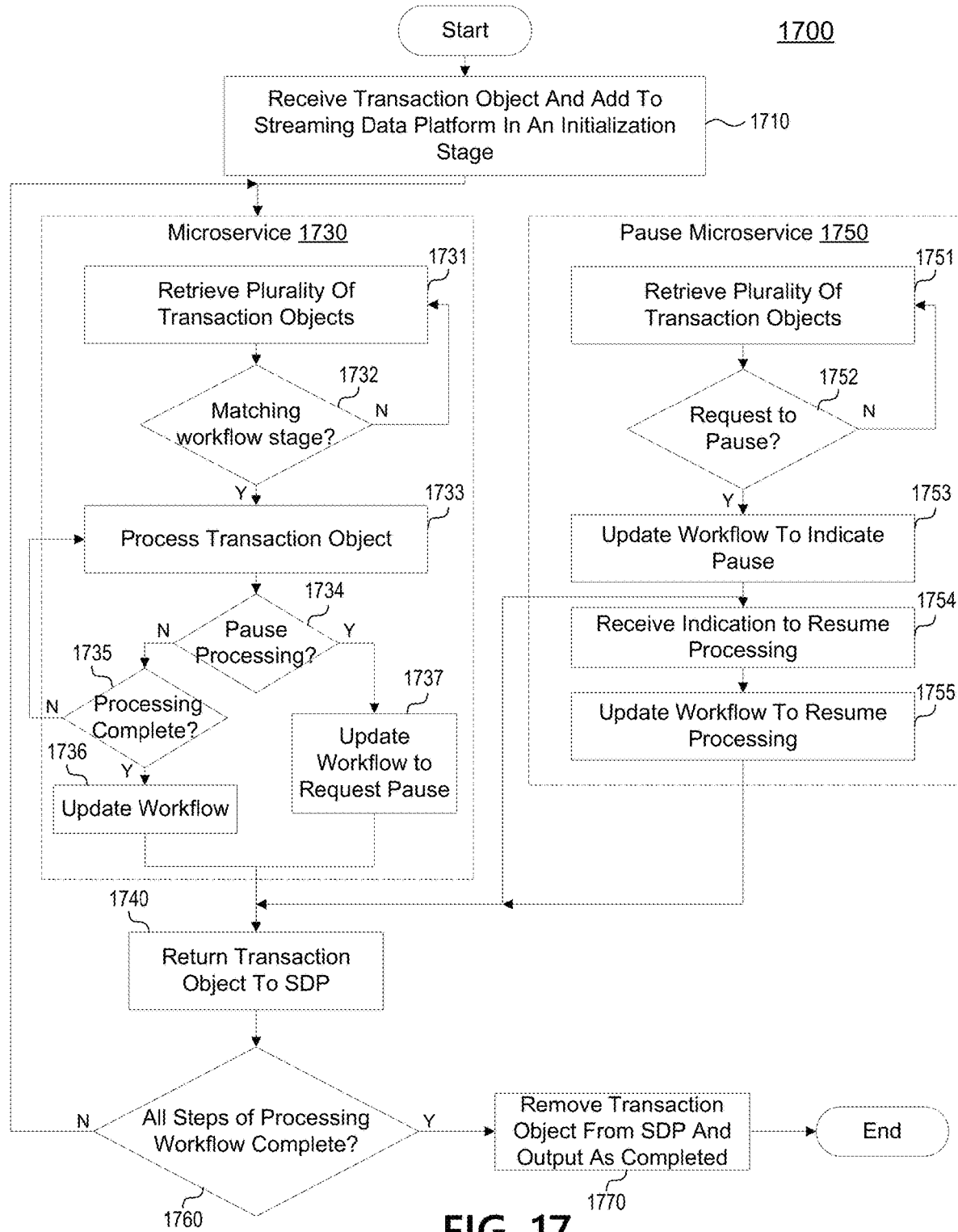

TRANSACTION EXCHANGE PLATFORM WITH A PAUSE MICROSERVICE TO PAUSE PROCESSING OF WORKFLOWS

CROSS REFERENCE TO RELATED APPLICATIONS

This application is a continuation-in-part of U.S. application Ser. No. 17/389,045, filed on Jul. 29, 2021 and entitled "Transaction Exchange Platform with Watchdog Microservice," which is a continuation of U.S. application Ser. No. 16/723,545 (now U.S. Pat. No. 11,080,120), filed on Dec. 20, 2019 and entitled "Transaction Exchange Platform with Watchdog Microservice," the entireties of which are incorporated herein by reference.

This application is also related to the following U.S. patent applications, filed on the same day:

U.S. application Ser. No. 18/077,655, entitled "Transaction Exchange Platform with a Messenger Microservice to Update Transactions" and filed concurrently herewith;

U.S. application Ser. No. 18/077,698, entitled "Transaction Exchange Platform with a Watchdog Microservice to Handle Stalled Transactions" and filed concurrently herewith; and U.S. application Ser. No. 18/077,767, entitled "Transaction Exchange Platform Defining Conditions for the Processing of Transaction Objects" and filed concurrently herewith.

Each of the related applications is incorporated by reference herein in its entirety for all purposes.

FIELD OF USE

Aspects of the disclosure relate generally to a transaction exchange platform. More specifically, aspects of the disclosure may provide for pausing transactions as the transactions are processed using a streaming data platform.

BACKGROUND

Computer systems and applications have revolutionized the handling of transactions and greatly accelerated clearing and settlement processes. Software solutions have been created to facilitate processing, validation, and approval of transactions. These systems serve to interface transaction originators with clearing and settlement operations, allowing transactions to flow between enterprises and facilitating the movement of trillions of dollars per year. Yet regulations, security, and risk management processes have grown increasingly important and detailed, thereby complicating the approval and settlement of transactions. Further, any issues with a transaction may cause the transaction to fail out. The transaction would then have to be re-worked, outside the system, and re-submitted. Alternatively, the transaction would be cancelled after being processed. Neither option is desirable since it results in delays in processing transactions, which disrupt customer experiences, and hides visible functions, like fraud investigations.

Aspects described herein may address these and other shortcomings present in existing solutions. Novel aspects discussed herein may implement a transaction exchange platform using a streaming data platform and microservices to provide faster, more dynamic, and more robust processing and approval of transactions. The novel transaction exchange platform may provide benefits such as improving the flexibility and reliability of transaction approval and processing systems, while offering robust record keeping for transaction audit purposes. The novel platform may also provide other benefits such as support for legacy and ongoing operations, solving for new and changing requirements in today's environment, and adapting to future technologies

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may relate to a transaction exchange platform using a streaming data platform (SDP) and microservices to process transactions according to review and approval workflows. The transaction exchange platform may receive transactions from origination sources, which may be added to the SDP as transaction objects. Microservices on the transaction exchange platform may interact with the transaction objects based on configured workflows associated with the transactions. Processing on the transaction exchange platform may facilitate clearing and settlement of transactions. Some aspects may provide for the processing of transaction objects to be paused, for example, based on a request from an external party, missing information, fraud investigations, etc. To address missing information or fraud investigations, a messaging microservice may be used to communicate with parties external to the transaction exchange platform. Transaction objects may be updated with the missing information or cleared of the fraud investigations. After being updated, the transaction objects may continue to be processed by the transaction exchange platform.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3A depicts an example transaction exchange platform according to one or more aspects of the disclosure;

FIG. 17 depicts an illustrative method for pausing processing of a transaction object according to one or more aspects of the disclosure;

DETAILED DESCRIPTION

Figure 1:
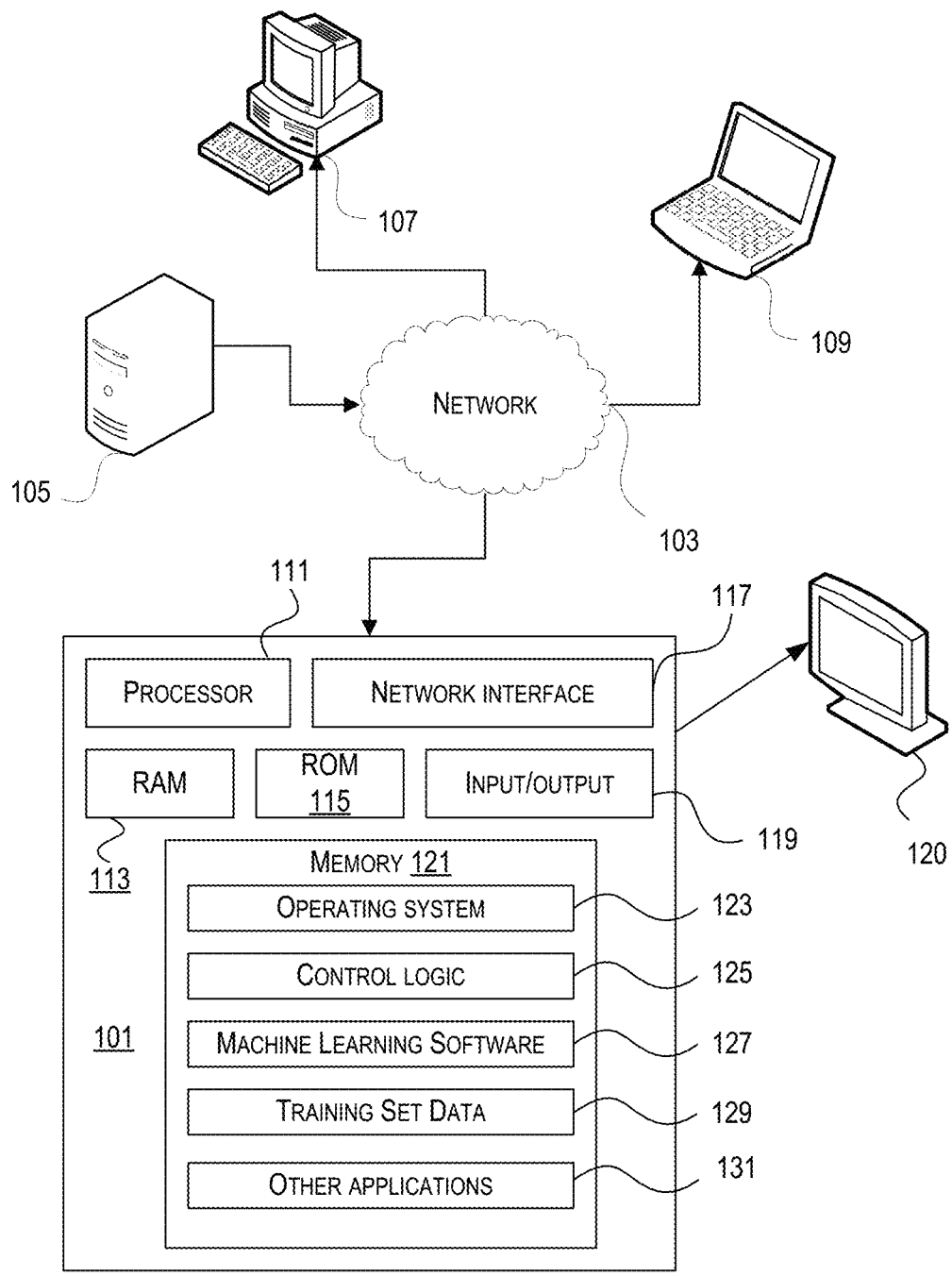
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein may relate to a transaction exchange platform using a streaming data platform and microservices to process transactions according to review and approval workflows. A transaction exchange platform, according to one or more aspects discussed herein, may provide a version agnostic data streaming, reactive microservice solution that facilitates payment related workflows to be executed. Although the term "microservice" is used throughout this disclosure, aspects are not limited to "microservices" as used in cloud computing contexts. Generally, as used herein "microservice" may refer to a technology process that does work on an object on a streaming data platform in any given step of a workflow. Aspects discussed herein may refer to "approval" of transactions. This generally refers to the processing necessary to move a transaction through the transaction exchange platform from intake to output, and does not necessarily mean that the payment exchange platform affirmatively approves the nature of the transaction. Instead, "approval" as used herein may refer to processing, validating, and/or affirmatively approving a transaction according to a workflow indicating the steps necessary to process a transaction on the platform before it is ready for output to downstream processors. Some aspects may provide for the processing of transaction objects to be paused, for example, based on a request from an external party, missing information, fraud investigations, etc. To address missing information or fraud investigations, a messaging microservice may be used to communicate with parties external to the transaction exchange platform. Transaction objects may be updated with the missing information or cleared of the fraud investigations. After being updated, the transaction objects may continue to be processed by the transaction exchange platform.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, transaction exchange platform software 125 for instructing computing device 101 to perform aspects discussed herein, machine learning software 127, smart database 129, and other applications 131. Machine learning software 127 may be incorporated in and may be a part of transaction exchange platform software 125. In embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to methods and techniques for implementing a transaction exchange platform.

Transaction Exchange Platform—Processing Streaming Transaction Data Using Microservices Aspects described herein may provide a transaction exchange platform implemented using a streaming data platform (SDP) and a plurality of microservices to process transactions according to workflows corresponding to different transaction types. Microservices on the transaction exchange platform may be configured to retrieve transactions having a current workflow stage that is assigned to the microservice from the SDP. The microservice may perform one or more steps of the approval/review workflow for the type of transaction, update the status of the object, and put it back to the SDP. Other microservices, later in the workflow, may see that the current workflow status of a transaction indicates that earlier pre-requisite processing steps have completed and may accordingly retrieve the transaction objects and perform their respective workflow steps. When the current workflow stage of a transaction indicates that all requisite steps of the workflow have been completed, the transaction may be removed from the SDP of the transaction exchange platform and output to downstream systems for further processing.

Figure 2:
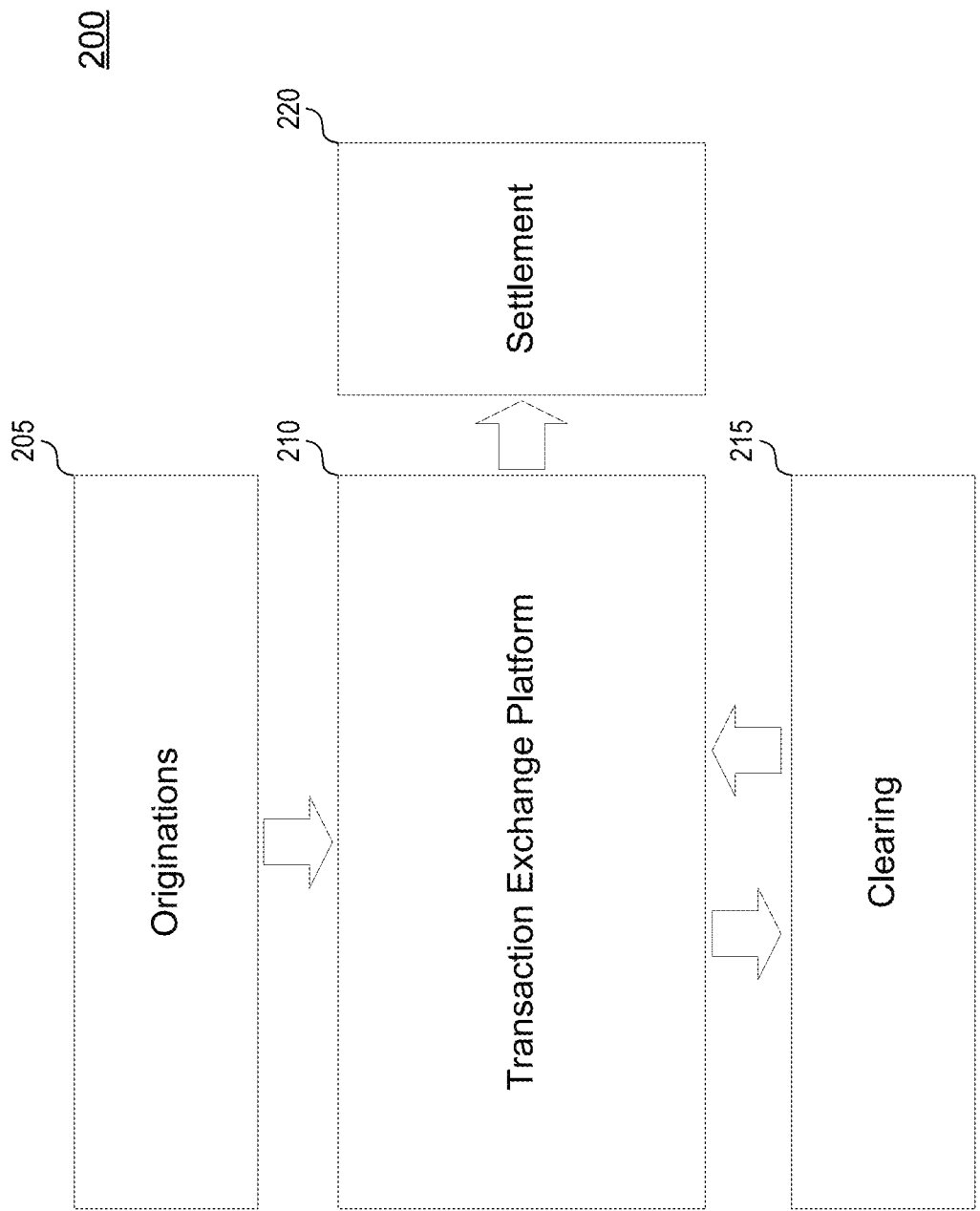
FIG. 2 depicts an example operating environment used to discuss illustrative aspects of a transaction exchange according to one or more aspects of the disclosure.

A high level system 200 for processing transactions, such as payments, is illustrated in FIG. 2. Transaction processing system 200 may broadly illustrate the flow of transactions from origination source 205 through to settlement systems 220. Transactions handled by system 200 may take any suitable form, generally as payment transactions. Example types of payment transactions include: wires, automated clearing house (ACH) payments, checks, cashier checks, real-time payments (RTP), credit cards, and/or many other types of payment transactions. Other factors that may inform the "type" of a transaction may include whether the transaction originates domestically or internationally, whether the destination is domestic or international, an amount of the transaction, the identity of one or more financial entities associated with the transaction, and the like. For purposes of the discussion herein, a transaction type may be relevant primarily for informing the review/approval steps that should be applied to the transaction prior to final settlement.

Transactions may begin at origination sources 205. For example, if a customer were to purchase a donut at a bakery using a credit card, the transaction may be sent via a point-of-sale (POS) terminal at the bakery to a payment processor. As another example, an investor may cause a wire payment to be sent to their broker via a banking website. The banking website may receive the wire payment transaction and begin the process of facilitating settlement of the wire transaction via a transaction processing system 200.

Transactions may be routed to settlement systems 220 to effect the transfer of the monies indicated in the transaction. For example, the wire transaction may be routed to respective financial institutions associated with the investor and broker to indicate the respective debit/credit to their accounts. However, substantial review and approval processing may be required before a transaction may be settled. This processing may involve regulatory, security, and/or risk management.

Transaction exchange platform 210 may serve as an interface between the origination source 205 and settlement systems 220, and according to some aspects may implement the transaction review and approval workflow for each supported transaction type. Origination sources 205 may send transactions to transaction exchange platform 210 for review and approval processing, and ultimately for routing to settlement systems 220. Transaction exchange platform 210 may be provided by the same entity operating settlement systems 220 and/or one or more of origination sources 205, or may be provided by a third-party entity.

Transaction exchange platform 210 may perform the review and approval processing for transactions. This may include interfacing with clearing systems 215. Clearing systems 215 may provide regulatory, security, and/or risk management support for transactions. For example, transactions may be referred to systems provided by the U.S. Federal Reserve as part of a clearance process. As another example, the identities of the parties to the transaction may need to be evaluated against various criteria in support of anti-money laundering or other such efforts. Clearing systems 215 may be provided as part of transaction exchange platform 210, or as logically separate systems. Clearing systems 215 may be provided by the entities operating origination sources 205, transaction exchange platform 210, settlement systems 220, government entities, and/or other third parties.

Transaction exchange platform 210 may interface with clearing systems 215 to complete review and approval processing on the transaction. Transactions that are approved on transaction exchange platform 210 may be routed to settlement systems 220 for settlement and/or further processing.

FIG. 3A illustrates a system 300 that may provide further details of a novel transaction exchange platform 320 than provided in FIG. 2, according to some aspects described herein. Similarly, transactions may originate at transaction origination sources 303 and route to downstream settlement systems, illustrated in FIG. 3A as enterprise systems and users 350.

Transaction exchange platform 320 may serve to perform review and approval workflow processing on transactions received from transaction origination sources 303 via enterprise transaction intermediary services 305. Transaction origination sources 303 may include both first- and third-party sources of transactions. The enterprise providing transaction exchange platform 320 may provide transaction intermediary services 305 to receive transactions, whether from third-parties or not, and route those transactions to transaction exchange platform 320. Enterprise transaction intermediary service 305 may perform validation, pre-processing, standardization, and/or any other suitable processing to prepare transactions for further handling by transaction exchange platform 320.

Transactions may be sent to transaction exchange platform 320 via application programming interfaces (APIs), such as API 311 and API 313. The APIs may validate aspects of the transaction details, and may package and/or standardize transactions into transaction objects suitable for processing on transaction exchange platform 320. In some implementations, transaction exchange platform 320 may provide different APIs for each type of transaction. For example, API 311 may correspond to ACH transactions while API 313 corresponds to wire transactions. In some implementations, fewer APIs (such as a single centralized API) may be used to flexibly validate and initialize transactions for processing by transaction exchange platform 320. The APIs for interfacing with transaction exchange platform 320 may comprise a number of components, such as a public API frontend, basic input validation logic, message level integrity processes, monitoring, and/or integration aspects.

Transaction objects may be pushed to a streaming data platform (SDP) 325 underlying transaction exchange platform 320. Streaming data platforms, such as those based on the Apache Kafka open-source platform, may be used to process real-time data in computer systems. Message objects pushed to the streaming data platform may be read by consumer software modules, processed, and put back to the streaming data platform. Transaction objects on SDP 325 may be subject to processing by microservices on transaction exchange platform 320, such as microservice 331, microservice 332, and microservice 333. The microservices can read and write transaction objects from/to SDP 325. Objects on SDP 325 may proceed logically through time, e.g. $t_0$ through $t_n$, as they progress through stages of the workflow associated with a corresponding transaction type.

Transaction objects, such as transaction object 307, may include transaction details, addenda, and transaction metadata. The transaction details and/or addenda may include the particulars of the transaction, such as the parties and/or accounts involved, as well as the amount of the payment. Addenda data of the transaction object may include, e.g., ABA routing numbers and other details that may be added, updated, and/or processed by the microservices on transaction exchange platform 320. The transaction metadata may include at least an indication of a workflow corresponding to a transaction type of the transaction object and a current workflow stage of the transaction object. In some implementations, discussed further herein, the transaction metadata may also include workflow version information.

As an example, transaction object 307 may include the following:

```
{
    transaction ID : a SHA256 encoded token
    workflow type : ACH
    current workflow stage : init
    transaction details : ISO20022 token
    addenda data { ABA routing : xyz }
}
```

Transaction object 307 may encapsulate any suitable standard payment object, such as one storing transaction details in a recognized JSON format. As mentioned, and as illustrated further in FIG. 6, transaction objects may also include a current workflow version assigned to the transaction object. Still other metadata may be included, such as a replay tracking count indicating the number of times that the transaction has been subject to replay through one or more steps of the workflow. Transaction details may be immutable, not subject to change while the transaction object is on the streaming data platform, whereas metadata and/or addenda data may be subject to change through additions, removals, updates, and/or other processing or modification by the microservices on transaction exchange platform 320.

A current workflow stage value may be maintained as part of the transaction metadata in each transaction object. The current workflow stage may indicate which processing steps of the associated workflow have been completed on the transaction. The current workflow stage may indicate the completion status of each respective step of the workflow. As such, in an example implementation the current workflow stage value may be a set of values and/or a data structure indicating the completion of individual workflow steps, e.g. processing by respective microservices. Microservices may be configured to poll the SDP for transactions having a current workflow stage value that indicates completion of each of the pre-requisite steps for processing by the microservice.

Microservices on the transaction exchange platform may poll the SDP to identify and retrieve transaction objects having a current workflow stage matching a workflow stage associated with the microservice. Transaction objects matching the microservice's assigned workflow stage may be processed by the microservice for review, approval, and/or any other suitable processing as part of the overall series of steps required to approve a transaction of the corresponding transaction type. Processing may result in updating one or more elements of the transaction metadata. Once the microservice completes its processing of the transaction object, the microservice can put the transaction object back to the SDP with an updated current workflow stage indicating that the microservice completed its processing. The updated transaction object may then be identified and processed by a next microservice based on the workflow.

Figure 3B:
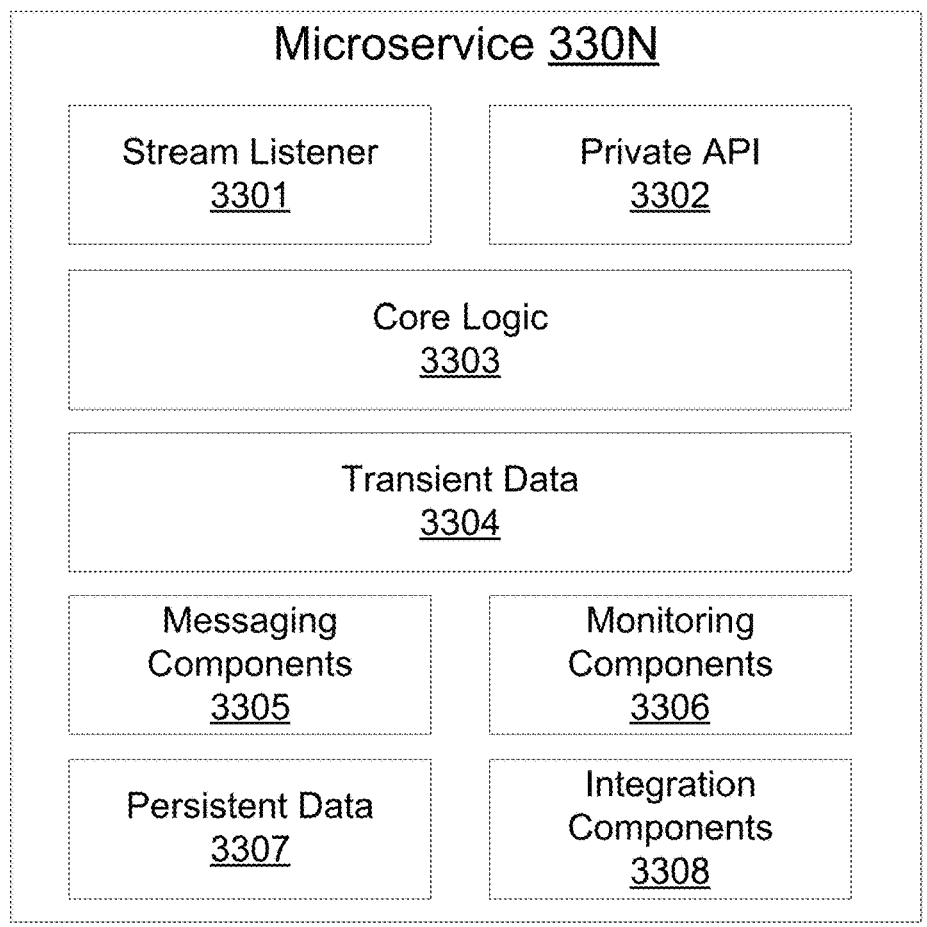
FIGS. 3B-3C depict example structures for microservices according to one or more aspects of the disclosure.
Figure 3C:
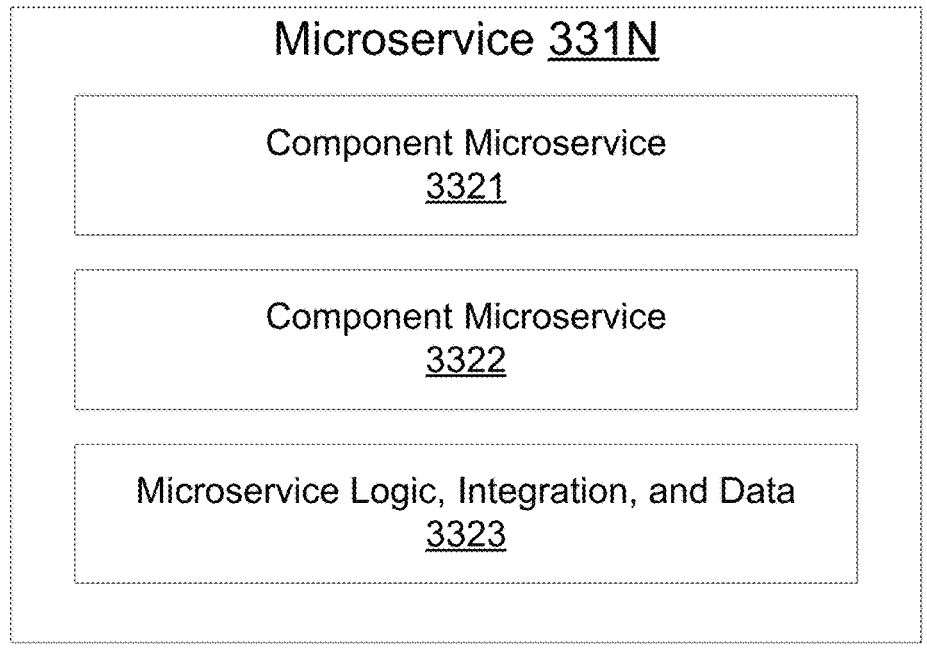

Turning briefly to FIGS. 3B and 3C, FIG. 3B illustrates an example structure for a microservice 330N. The microservice may comprise subcomponents configured to work in concert to apply processing logic associated with a workflow step assigned to the microservice. In the illustrated structure, microservice 330N comprises a stream listener 3301 which may operate as a standardized way to read from SDP 325 and consume transaction objects that meet the workflow criteria (e.g., stage) associated with microservice 330N. Microservice 330N may also include private API 3302, which may be a RESTful implementation used in synchronous calls supporting singleton integrations into transaction exchange platform 320, and its use may allow only the response to be exposed to the public API aspect of microservice 330N. Microservice 330N may also include core logic 3303, which may contain the business logic and associated computer instructions to fulfill microservice 330N's assigned role in the workflow. Core logic 3303 may be adapted to process transaction objects in accordance with one or more steps of regulatory, security, and/or risk management processes. Microservice 330N may further include transient data 3304, which may include a data management layer that deals with data that is attributed to the local functionality of the system, for example truth tables used in processing by core logic 3303, and persistent data 3307, which may include a construct to capture state data for the associated workflow stage. Microservice 330N may further include messaging components 3305 to track message level integrity via natural key encryption derivations of the payment object. And microservice 330N may include monitoring components 3306, configured to provide oversight and tracking, and integration components 3308, configured to provide the ability to integrate with software structure patterns such as Async SDP, SOAP, RESTful API, and the like. As illustrated in FIG. 3C, however, a microservice may be made up of a collection of other microservices. For example, as illustrated microservice 331N comprises component microservices 3321, 3322, and 3323.

Returning to FIG. 3A, illustrative transaction exchange platform 320 includes three microservices (microservices 331, 332, and 333) configured to operate on ACH transactions. Transaction object 307 is an example ACH transaction, and is added to SDP 325 via API 311. Transaction object 307 may be added to SDP 325 in an "init" or initialization stage, indicating that none of the workflow steps have yet been completed. In some implementations, the initialization stage may be a separate stage that is marked completed prior to processing by a first microservice, or may be commensurate in scope with a first workflow stage associated with a first microservice of the workflow. In some implementations, the initialization stage for the object may be handled as part of the processing by the APIs 311, 313 or otherwise handled alongside workflow processing by the respective microservices.

Walking through the example, transaction object 307 may be added to SDP 325 in the initialization stage (stage '0'). Microservice 331 may be configured to perform a first step in an approval workflow for transaction having a transaction type of ACH. For example, microservice 331 may be configured to verify that the recipient account of the ACH transaction is valid. Microservice 331 may look for transaction objects on SDP 325 having a first workflow stage (stage '1'), for example a stage that indicates initialization pre-processing was completed or, in some implementations, transaction objects in the initialization stage itself. As mentioned above, the current workflow stage of transaction object 307 may indicate each (and/or a subset) of the workflow steps that have been completed on transaction object 307, and the current workflow stage thus may comprise a data structure listing the completion status of each (and/or a subset) of the workflow steps. Microservice 331 may poll SDP 325 to retrieve transaction objects having a current workflow stage matching (e.g., meeting) the first workflow stage assigned to microservice 331. In this manner, microservice 331 may extract transaction objects from SDP 325 that have met the criteria for microservice 331 to begin processing. For example, microservice 331 may be configured to wait until initialization steps such as new object snapshotting is completed before performing its processing to verify the recipient account. Transaction objects retrieved by microservice 331 may be removed and/or otherwise blocked on SDP 325 pending processing by microservice 331.

Microservice 331, having retrieved one or more transaction objects such as transaction object 307, may perform its corresponding workflow step on the transaction object. The workflow step may comprise suitable processing of the transaction object, such as according to core logic of microservice 331 (similar to core logic 3303 of FIG. 3B). Processing of the transaction object by microservice 331 (or any other microservice) may comprise any of: retrieving the transaction object; reviewing values and other characteristics of the transaction object; interfacing with clearing systems such as clearing systems 215 and/or other systems; comparing values or characteristics to rules, regulations, policies, and the like; adding, removing, updating, or otherwise changing any aspect of the transaction addenda data or transaction metadata; generating reports and/or alerts; presenting the transaction for manual or other review; and/or any other suitable processing associated with the respective step of the workflow for transactions of that type. For example, processing by a microservice may comprise verifying a value of the transaction details, addenda data, and/or transaction metadata against at least one rule. As another example, processing may comprise verifying a value of the transaction details, addenda data, and/or transaction metadata against a watchlist. Processing may comprise determining that the transaction details, addenda data, and/or transaction metadata fail at least one rule; flagging the transaction object for further review; and holding the transaction object in the current workflow stage pending the further review, where updating the current workflow stage of the transaction object to the third workflow stage is based on determining that the further review is completed. Flagging the transaction object for further review may comprise flagging the transaction object for manual review by a user and/or setting the current workflow stage of the transaction object to a current workflow stage associated with another microservice, other than the microservice that typically processes transactions after the first microservice.

The processed transaction object may be put back to SDP 325 by microservice 331, and the current workflow stage of the transaction object may be updated to indicate that microservice 331 has completed its processing. For example, transaction object 307 may be updated to have a current workflow stage of '2' after microservice 331 completes its processing.

Back on the SDP 325, the updated transaction object may be subject to further processing by other microservices in like fashion. For example, microservice 332 may correspond to a second step of processing in the workflow corresponding to ACH transactions, such as a regulatory check associated with anti-money laundering efforts. Microservice 332 may be configured to look for transaction objects having a second current workflow stage, e.g., stage '2', on SDP 325. Microservice 332 can poll SDP 325 to retrieve such transaction objects and process them according to its own core logic, similarly to that described above with respect to microservice 331. The processed transaction object may be put back to the SDP 325 with an updated current workflow stage indicating that processing by microservice 332 is completed. Microservice 333 may be configured to look for a third current workflow stage, e.g. stage '3', and may process transaction objects similarly. For example, microservice 333 could perform processing to obligate a customer's account for the value of the transaction.

When the current workflow stage of a transaction object indicates it has completed the steps of the corresponding workflow, the transaction object may be removed from SDP 325 and routed or otherwise made available to other components of the overall transaction system. For example, the approved transaction object, having passed through all steps of the corresponding workflow, may be published to a public streaming data platform 340 accessible outside of the transaction exchange platform. Enterprise systems, applications, users, and others (e.g. enterprise services and users 350) may access the completed transaction objects on the public streaming data platform and further process for transaction settlement or other purposes.

The structure described herein, where microservices poll SDP 325 for transaction objects having corresponding current workflow stages, may drive payments and other transactions through the system and requisite review and approval workflows. As mentioned, the workflow for a given transaction type may comprise a plurality of processing steps required to approve a given transaction of the transaction type. Workflows may be implemented in the configurations of what workflow stage metadata each microservice is configured to look for on the SDP 325. However, workflows may also be logically described and/or defined using a directed acyclic graph structure, as described further with respect to FIG. 4.

Figure 4:
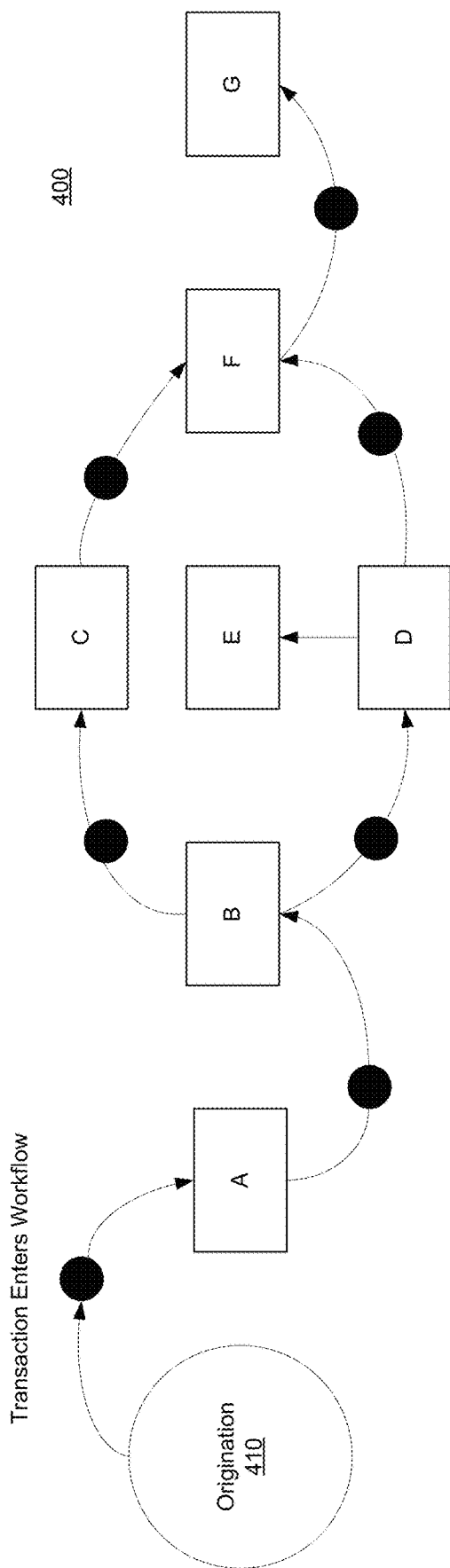
FIG. 4 depicts an illustrative workflow as a directed acyclic graph according to one or more aspects of the disclosure.

FIG. 4 illustrates a sample directed acyclic graph (DAG) 400 that may correspond to a workflow corresponding to transactions having a wire transaction type. The steps of the workflow corresponding to a given transaction type may be organized as a DAG. The DAG may comprise nodes corresponding to the individual steps of the workflow, and edges corresponding to pre-requisite relationships between the steps. The DAG may indicate how transactions from an origination source such as origination 410 flow through the transaction exchange platform 320, until approval is completed and the transaction is ready for further processing by downstream systems. The DAG may include parallel paths, whereby the transaction object may be subject to concurrent processing by multiple microservices. The DAG may indicate pre-requisite conditions that govern the progression of the transaction object through the stages of the workflow. For example, processing by a microservice in the DAG may be conditioned on the completion of processing by one or more other microservices. The DAG may also indicate branching, conditional paths where a transaction object may be subject to processing by different microservices (and/or different processing generally) based on certain transaction attributes.

In the example workflow for wire transactions 400 illustrated in FIG. 4, a transaction object added to transaction platform 320 from origination 410 may first enter step 'A'. Step 'A' may correspond to a microservice that performs processing to verify that a recipient account in the transaction details and/or addenda is valid. Once step 'A' processing is complete, the workflow proceeds to step 'B', which may correspond to a high value thresholder that operates to split transactions for different processing based on their value (also implemented as a microservice). For example, once step 'A' is completed and a first microservice updates the current workflow stage of the transaction object, a microservice associated with step 'B' may pick up the transaction object and determine if it involves a payment over a certain value, e.g., payments more than 5000. The microservice associated with step 'B' may update the transaction object with different current workflow stages depending on whether the transaction should be subject to high value processing (e.g., step 'C') or standard processing (e.g., step 'D'). Step 'C' may occur subsequent to step 'B' determining that a high value transaction should be subject to enhanced verification, and may comprise performing the enhanced verification by a corresponding microservice. Step 'D' may comprise performing standard regulatory verification by a corresponding microservice. Step 'D' may also determine if the transaction is an international or domestic wire, and may update the current workflow stage and/or other transaction metadata accordingly. If the transaction is an international wire, it may be routed (by means of the updated transaction metadata) to a microservice associated with step 'E', which may perform further international wire processing. If the transaction is a domestic wire, it may proceed to step 'F' once regulatory checks are completed. Step 'F' may comprise a step to obligate the customer's account for the amount of the wire, and may be conditioned on successful completion of steps 'C', 'D', or 'E' depending on how the transaction progressed through the workflow. For example, a microservice corresponding to step 'F' may be configured to poll SDP 325 for transactions having a current workflow stage that indicates they have completed steps 'C', 'D', or 'E'. Finally, completing the workflow step 'G' may correspond to a microservice configured to send the wire transaction for settlement, such as to settlement systems 220 of FIG. 2 or enterprise services and users 350 of FIG. 3A. Having completed workflow step 'G', the transaction metadata may be updated to indicate completion of the workflow. For example, the current workflow stage of the transaction object may be updated to indicate completion of step 'G'. As another example, the current workflow stage of the transaction object may reflect the completion of each of steps 'A', 'B', 'D', 'F', and 'G'.

Workflow 400 is just one example of a workflow corresponding to a transaction type, and the transaction exchange platform 320 may have many such workflows corresponding to different transaction types. Microservices on transaction exchange platform 320 may be involved in one or more workflows, and may operate on different stages of different workflows.

Workflow steps may proceed in parallel, and may be independent of one or more other steps in the workflow. For example, if validating the account number of the sending party and validating the account number of the receiving party were handled by different microservices, the workflow may indicate that both may occur once the transaction is brought onto the platform. However, later steps may be conditioned on the completion of both steps. Either step may occur first in time, depending on the availability of each respective microservice to handle the transaction.

Microservices on transaction exchange platform 320 may be automatically configured to look for a corresponding current workflow stage. This automatic configuration may be based on the DAG structure used to logically define the workflow. For example, the individual microservices may be automatically configured to poll SDP 325 for transactions having a current workflow stage that indicates that the pre-requisite criteria represented in the DAG is met prior to processing by the microservice. Each microservice may be configured to look for transaction objects on SDP 325 that have a given workflow type and also have a current workflow stage matching that assigned to the microservice. Thus, microservices may be configured to operate as part of multiple workflows, and can look for transaction objects at different stages of the workflows. As discussed further herein with respect to FIG. 6, changes to the DAG may be used to automatically re-configure the microservices to watch for transaction objects in different workflows and/or different workflow stages.

Figure 5:
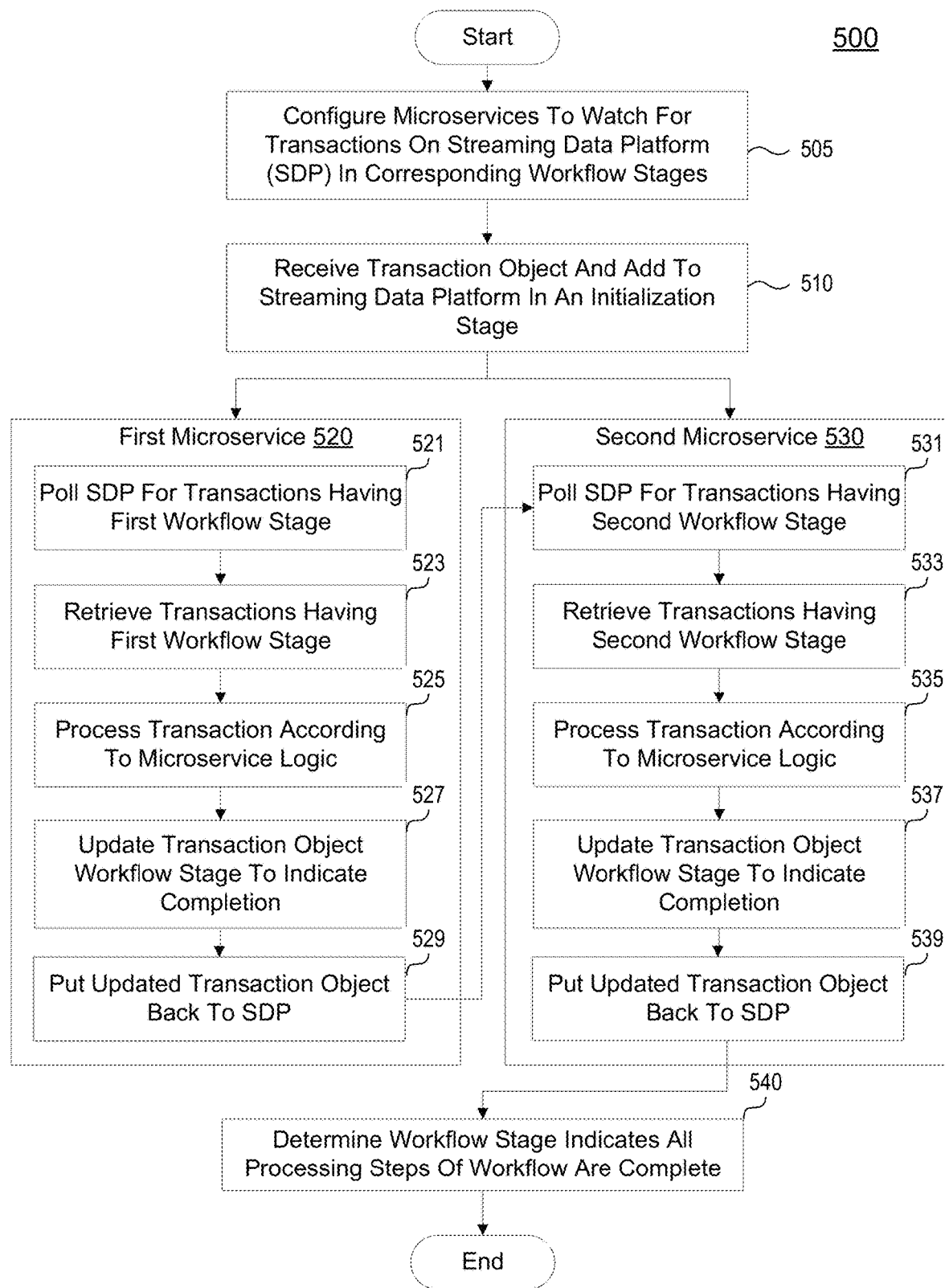
FIG. 5 depicts an illustrative method for processing transactions on a streaming data platform according to one or more aspects of the disclosure.

FIG. 5 depicts a flowchart illustrating an example method 500 to process transactions by a transaction exchange platform, such as transaction exchange platform 320. Method 500 may be performed by any suitable computing device and/or combination of computing devices, referred to as the system implementing method 500.

At step 505, the system may configure microservices on the transaction exchange platform to watch for transactions of the streaming data platform (SDP) that have transaction metadata indicating that they are in a current workflow stage corresponding to the individual microservice. As discussed above with respect to FIG. 4, the system may automatically configure the microservices based on a DAG structure that logically defines the steps of the workflow and their relationships.

At step 510, the system may receive a transaction object and add it to the streaming data platform. The transaction object may be received from a transaction origination source such as origination source 303, and may be received from an enterprise intermediary service, such as enterprise transaction intermediary service 305. The transaction object may be received via one or more APIs of the transaction exchange platform, such as APIs 311 and 313 of transaction exchange platform 320. The transaction object may be added to the SDP in an initialization stage, which may be implemented through setting a current workflow stage of the transaction object's transaction metadata to an initialization value. The initialization stage may be separate from a first workflow stage associated with a first microservice of the workflow, or could be the same as the first workflow stage. Objects in the initialization stage may be subject to various system processes on the transaction exchange platform, such as format or other verifications, standardization, snapshots, and the like. If the initialization stage is separate from a first workflow stage of the workflow, the transaction object may be updated to have the first workflow stage once initialization processing is completed.

The transaction object, on the SDP, may be subject to processing by one or more microservices including first microservice 520 and second microservice 530. First microservice may be configured to poll the SDP for transactions in a first workflow stage, while second microservice may be configured to poll the SDP for transactions in a second workflow stage.

At step 521, first microservice 520 may poll the SDP for transactions having a particular workflow type (corresponding to a transaction type) and having a first workflow stage within that workflow corresponding to first microservice 520. The SDP may identify transaction objects that have a current workflow stage value that matches the first workflow stage criteria associated with the first microservice 520. Identification of matching transaction may be based on transaction metadata indicating a type of workflow, a current workflow stage, and other information associated with the workflow (such as workflow version information, discussed below with respect to FIG. 6). At step 523, first microservice 520 may retrieve the matching transaction objects for processing. Although steps 521 and 523 are illustrated separately, it will be understood that in practice they may be part of a single contiguous act.

At step 525, first microservice 520 may process the transaction objects it retrieved from the SDP according to processing logic associated with first microservice 520. Processing a transaction object may include: reviewing, assessing, analyzing, updating, adding to, removing, and/or any other suitable processing of the transaction data, addenda data, and/or transaction metadata associated with the transaction object.

At step 527, first microservice 520 may update a current workflow stage of the transaction object to indicate completion of the processing corresponding to first microservice 520. In some embodiments, the current workflow stage may be updated to different next step values depending on the processing by first microservice 520. For example, as discussed with respect to workflow 400 in FIG. 4, a microservice may update the current workflow stage of a transaction object to route it to different next microservices depending on whether it meets certain criteria, such as having a value greater than a threshold amount.

At step 529, first microservice 520 may put the updated transaction object back to the SDP. The updated transaction object may have one or more changed values (or none) of its transaction data, addenda data, and/or transaction metadata, in addition to the updated current workflow stage.

In the example of method 500, first microservice 520 may update the current workflow stage of the transaction object to indicate completion of processing by the first microservice 520. This updated current workflow stage may correspond to the second current workflow stage that second microservice 530 is looking for on the SDP.

Thus, at step 531, the second microservice 530 may poll the SDP for transactions having the second workflow stage and, at step 533, may retrieve transaction objects matching the second workflow stage. The second microservice 530 may perform similar processing to that described above with respect to first microservice 520. That is, steps 531, 533, 535, 537, and 539 may be analogous to steps 521, 523, 525, 527, and 529, modified as appropriate for the role assigned to second microservice 530 in the workflow for a given transaction type. The processed, updated transaction object may be put back to the SDP with an updated current workflow stage indicating completion of the processing corresponding to second microservice 530.

At step 540, the system may determine that the current workflow stage metadata of the transaction object indicates that all requisite processing steps of the workflow have been completed. As a result, processing by the transaction exchange platform may be completed and the approved transaction object may be removed from the SDP and output for further processing and/or settlement. For example, as illustrated in FIG. 3A, a completed, approved transaction may be output to a public SDP for access by downstream systems and users.

Thus, according to some embodiments a computer-implemented method may receive a transaction object comprising transaction details and transaction metadata. That transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The computer-implemented method may further comprise adding the transaction object to a streaming data platform and updating the current workflow stage of the transaction object to a first workflow stage. A first microservice may poll the streaming data platform to retrieve transactions matching the first workflow stage. The first workflow stage may be associated with the first microservice based on the workflow corresponding to the transaction type. The first microservice may retrieve, from the streaming data platform, the transaction object based on the current workflow stage matching the first workflow stage. The first microservice may process the transaction object. The computer-implemented method may further comprise updating the current workflow stage of the transaction object to a second workflow stage based on completing processing, by the first microservice, of the transaction object. A second microservice may poll the streaming data platform to retrieve transactions matching the second workflow stage. The second workflow stage may be associated with the second microservice based on the workflow corresponding to the transaction type. The second microservice may retrieve, from the streaming data platform, the transaction object based on the current workflow stage matching the second workflow stage. The second microservice may process the transaction object. The computer-implemented method may further comprises updating the current workflow stage of the transaction object to a third workflow stage based on completing processing, by the second microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

The first and second microservice may be automatically configured to watch for transactions on the streaming data platform in the first and second workflow stages, respectively, based on the plurality of processing steps. A different second workflow may be associated with a second transaction type and may comprise a different second plurality of processing steps required to approve a given transaction of the second transaction type. The second transaction type may be different from the transaction type. The first microservice may operate on transactions associated with both the workflow and the different second workflow. The plurality of processing steps of the workflow may indicate that the first microservice processes the transaction object at a different stage than the different second plurality of processing steps of the different second workflow.

The workflow corresponding to the transaction type may comprise a directed acyclic graph (DAG) indicating the plurality of processing steps required to approve a given transaction of the transaction type. The first and second microservice may be automatically configured to watch for transactions on the streaming data platform in the first and second workflow stages, respectively, based on the DAG. The computer-implemented method may further comprise, responsive to an update to at least one of the plurality of processing steps indicated in the DAG, automatically reconfiguring at least one microservice based on the update.

The current workflow stage of the transaction object may comprise a data structure indicating completion status of each respective step of a plurality of processing steps associated with the workflow. The transaction object may be updated to have a current workflow stage corresponding to the second workflow stage based on the current workflow stage indicating that the transaction object has been processed by at least the first microservice and a different third microservice. The first workflow stage and a fourth workflow stage may be independent, such that a third microservice receives the transaction object based on the current workflow stage of the transaction object matching the fourth workflow stage irrespective of whether the first microservice has processed the transaction object.

The transaction details may be immutable and may not change while the transaction object is on the streaming data platform. The processing, by the first microservice, of the transaction object may comprise verifying a value of the transaction details, addenda data, and/or transaction metadata against at least one rule. Processing of the transaction object by the first microservice may comprise verifying a value of the transaction details, addenda data, and/or transaction metadata against a watchlist. Processing of the transaction object by the second microservice may comprise determining that the transaction details, addenda data, and/or transaction metadata fail at least one rule, flagging the transaction object for further review, and holding the transaction object in the second workflow stage pending the further review. Updating the current workflow stage of the transaction object to the third workflow stage may be based on determining that the further review is completed. Flagging the transaction object for further review may comprise flagging the transaction object for manual review by a user. Flagging the transaction object for further review may comprise setting the current workflow stage of the transaction object to a fourth workflow stage associated with a third microservice. Updating the current workflow stage of the transaction object to the third workflow stage may be based on determining that processing by the third microservice is completed.

As examples, the transaction type of the transaction object may be a wire type transaction. The workflow may comprise a plurality of processing steps required to approve a wire transaction. The transaction type of the transaction object may be an automated clearing house (ACH) type transaction. The workflow may comprise a plurality of processing steps required to approve an ACH transaction. The transaction type of the transaction object may be a cashier check type transaction. The workflow may comprise a plurality of processing steps required to approve a cashier check transaction. The first microservice may process the transaction object to validate a routing number associated with the transaction object. The second microservice may process the transaction object to verify compliance with at least one regulatory requirement associated with the transaction type. The transaction object may be received via an application programming interface (API).

According to some aspects, a transaction exchange platform may comprise a streaming data platform, a plurality of microservices, at least one processor, and memory. The plurality of microservices may comprise at least a first microservice and a second microservice. The first and second microservice may be automatically configured to watch for transactions on the streaming data platform in corresponding workflow stages based on a plurality of workflows corresponding to a plurality of transaction types. The memory may store instructions that, when executed by the at least one processor, cause the platform to receive a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The instructions, when executed by the at least one processor, may further cause the platform to add the transaction object to the streaming data platform; update the current workflow stage of the transaction object to a first workflow stage; and poll, by the first microservice, the streaming data platform to retrieve transactions matching the first workflow stage. The first workflow stage may be associated with the first microservice based on the workflow corresponding to the transaction type. The instructions, when executed by the at least one processor, may further cause the platform to retrieve, by the first microservice and from the streaming data platform, the transaction object based on the current workflow stage matching the first workflow stage; process, by the first microservice, the transaction object to add, remove, or update addenda data associated with the transaction object; update the current workflow stage of the transaction object to a second workflow stage based on completing processing, by the first microservice, of the transaction object; and poll, by the second microservice, the streaming data platform to retrieve transactions matching the second workflow stage. The second workflow stage may be associated with the second microservice based on the workflow corresponding to the transaction type. The instructions, when executed by the at least one processor, may further cause the platform to retrieve, by the second microservice and from the streaming data platform, the transaction object based on the current workflow stage matching the second workflow stage; process, by the second microservice, the transaction object; update the current workflow stage of the transaction object to a third workflow stage based on completing processing, by the second microservice, of the transaction object; determine that the current workflow stage of the transaction object indicates that the transaction object has completed processing corresponding to the workflow; and remove the transaction object from the streaming data platform and output the transaction object and an indication that the transaction object has completed the processing corresponding to the workflow.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; updating the current workflow stage of the transaction object to a first workflow stage; and polling, by a first microservice, the streaming data platform to retrieve transactions matching the first workflow stage. The first workflow stage may be associated with the first microservice based on the workflow corresponding to the transaction type. The steps may further comprise retrieving, by the first microservice and from the streaming data platform, the transaction object based on the current workflow stage matching the first workflow stage; processing, by the first microservice, the transaction object; and polling, by a second microservice, the streaming data platform to retrieve transactions matching the first workflow stage. The first workflow stage may be also associated with the second microservice based on the workflow corresponding to the transaction type. The steps may further comprise retrieving, by the second microservice and from the streaming data platform, the transaction object based on the current workflow stage matching the first workflow stage; processing, by the second microservice, the transaction object; updating the current workflow stage of the transaction object to a second workflow stage based on completing processing, by the first microservice and the second microservice, of the transaction object; and polling, by a third microservice, the streaming data platform to retrieve transactions matching the second workflow stage. The second workflow stage may be associated with the third microservice based on the workflow corresponding to the transaction type. The steps may further comprise retrieving, by the third microservice and from the streaming data platform, the transaction object based on the current workflow stage matching the second workflow stage; processing, by the third microservice, the transaction object; updating the current workflow stage of the transaction object to a third workflow stage based on completing processing, by the third microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

According to some aspects, a computer-implemented method may comprise steps comprising receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; and retrieving, by a second microservice and from the streaming data platform, the transaction object based on the current workflow stage matching the second workflow stage. The second workflow stage may be associated with the second microservice based on the workflow corresponding to the transaction type. The steps may further comprise processing, by the second microservice, the transaction object; updating the current workflow stage of the transaction object to a third workflow stage based on completing processing, by the second microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

Configurator—Dynamic Microservice Configuration

One or more aspects described herein may provide for dynamic reconfiguration of the workflows and/or microservices. For example, a workflow may be modified to change a progression of a transaction object from one microservice to the next. This may be implemented by modifying the configuration of a microservice to look for a different current workflow stage on the streaming data platform. A microservice may be modified to change processing logic and/or any other aspect controlling how the microservice interacts with the streaming data platform and/or transaction objects, or any other aspect of the microservice. For example, processing logic of the microservice may be changed to an updated version to be used in processing future transactions.

A configuration interface may generate configuration transaction objects that cause the dynamic reconfiguration of the workflow and/or microservices. Configuration transaction objects may be added to the SDP with a configuration workflow type, and the microservices may retrieve and process the configuration transaction objects. The configuration transaction objects may operate such that a target microservice is reconfigured as a result of processing the configuration transaction object, whether to look for transactions on a different workflow and/or workflow stage, or to modify the processing logic applied to the transactions retrieved by the microservice.

As discussed above, each defined workflow on transaction exchange platform 320 may accept a transaction as part of the transaction's "saga" through the transaction exchange platform. Through the workflow, the transaction may or may not undergo different processing steps, where each step may be provided by one or many microservices or vendor systems. In this way, updating the "saga" that applies to the microservices, integrated vendor systems and datasets, and the entire transaction exchange ecosystem may be akin to an exercise in configuration control. Aspects described herein may allow configurations to be loaded into the transaction exchange platform via the streaming data platform, and may be used to update the entire transaction exchange platform, one or more components of the transaction exchange platform, and/or transactions on the platform.

Traditional methods for doing this may require that each element of the workflow be updated, creating exponentially expanding complexity, downtime, and consequently interjecting risk to the transaction exchange ecosystem. Dynamic reconfiguration as described further herein may solve a problem of traditional deployments that interrupt the entire system and require each component to be individually validated. It may also interject a level of control in the deployment by enabling any level of control from the level of remapping the system up to controlling which component gets transactions associated with different versions of the corresponding workflow. Dynamic reconfiguration may also provide control over the system so that configuration can work from the most tactical single transaction (singleton) level up to the entire transaction exchange. Coupled with other tools, such as cloud-based resiliency tools, dynamic reconfiguration may provide a level of flexibility not present in other deployment approaches or solutions to simplifying and/or mitigating the risk of a failed deployment.

The transaction exchange may exist in a space that includes numerous legacy, vendor, and future state solutions. Dynamic reconfiguration may provide advantages in supporting partnering with vendors and third parties of any kind as an integration approach can be agreed on and brought into the transaction exchange as a service controlled through dynamic reconfiguration. Once integrated, similarly to the version control described herein, the integration service can be toggled on and off easily through dynamic reconfiguration processes.

Figure 6:
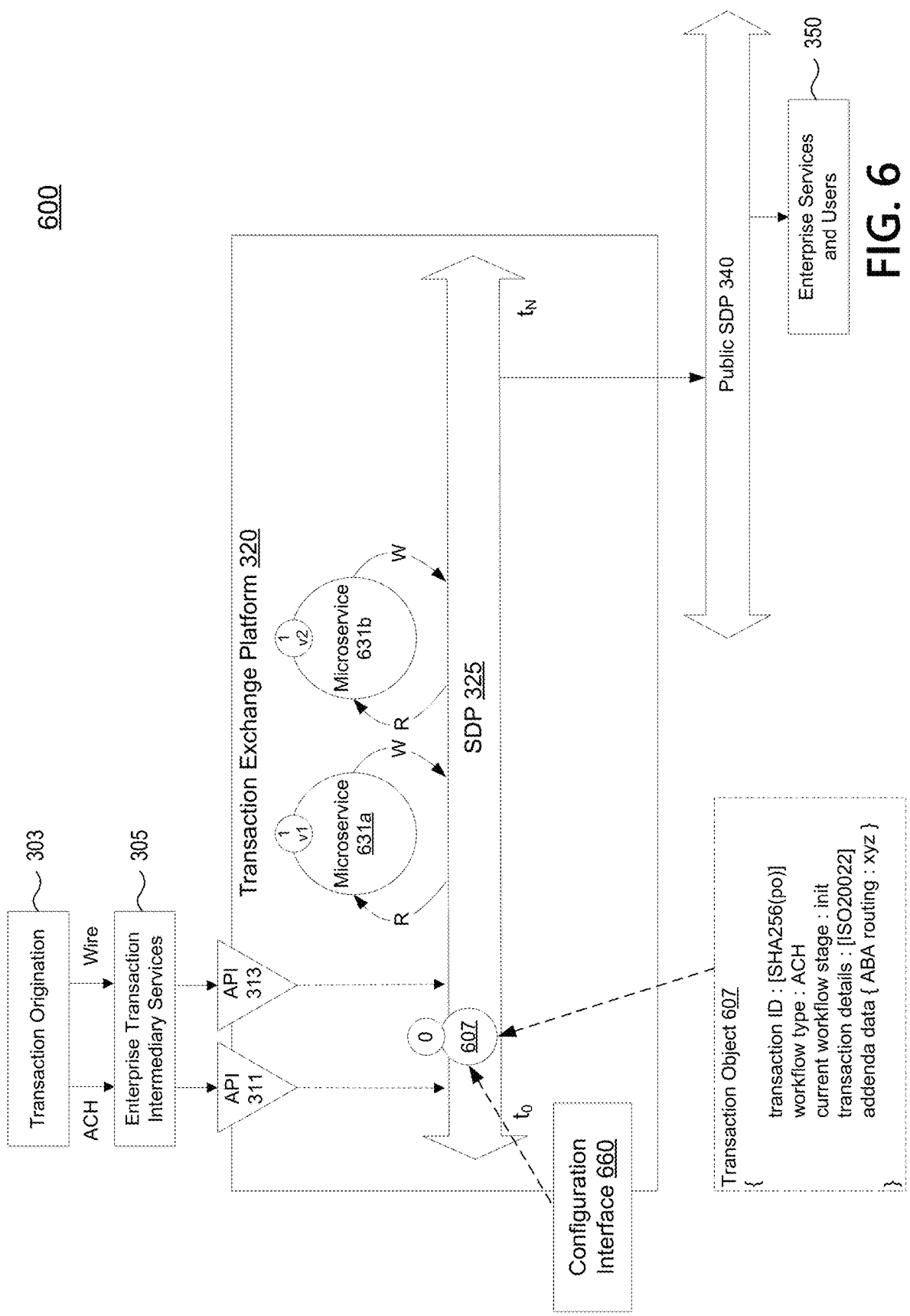
FIG. 6 depicts an example transaction exchange platform having a configuration interface according to one or more aspects of the disclosure.

FIG. 6 illustrates a transaction processing system 600, similar to that illustrated in FIG. 3A and sharing many like components. However, transaction processing system 600 includes configuration interface 660 to provide dynamic reconfiguration of the workflows and/or microservices. Configuration interface 660 may push configuration transaction objects to SDP 325 to cause re-configuration of a first microservice 631a (represented as first version 631a, which may be updated to second version 631b). Due to dynamic reconfiguration, transaction objects may be modified to keep track of the workflow version they should be processed under, as shown by example transaction object 607.

Users managing transaction exchange platform 320 may determine to dynamically reconfigure one or more aspects of the platform, such as by modifying a workflow or causing a new version of a microservice to be deployed. Reconfiguration may be prompted through other processes, such as via a watchdog microservice as discussed further below with respect to FIG. 9. Reconfiguration may be done to update and/or improve software processes. Reconfiguration may also be done to address problems that arise during processing, such as when certain systems become unavailable or otherwise encounter problems. Reconfiguration may be done as a new persistent configuration, or could be temporary pending resolution of an issue. The reconfiguration may target any aspect of the platform with desired granularity. For example, the reconfiguration may apply to the entire platform, one or more microservices, and/or one or more transactions, as appropriate. Workflows on transaction exchange platform 320 may also be reconfigured, which may be accomplished through modifying individual microservices to control the workflow type and workflow stages that they watch for.

Configuration interface 660 may generate configuration transaction objects that cause the dynamic reconfiguration of the workflow and/or microservices. Configuration transaction objects may be added to the SDP with a configuration workflow type, and the microservices may retrieve and process the configuration transaction objects. Each microservice on transaction exchange platform 320 may be configured to watch for transaction objects having a configuration workflow type (e.g., configuration transaction objects), and may have a corresponding workflow stage similarly to that discussed above with respect to FIGS. 3A and 4.

A configuration transaction object may be configured such that, when processed by a microservice, it causes reconfiguration of that microservice. Microservices on the transaction exchange platform 320 may be programmed to process configuration transaction objects and make suitable changes to their parameters based on the processed objects. For example, a microservice may process configuration transaction object comprising instructions to update the workflow assigned to the microservice to a second version of the workflow, e.g., ACH v. 2, and may update a workflow stage assigned to the microservice. Reconfiguration of microservices can be used to update workflows to new versions, create new workflows, and/or modify existing workflows. Transactions requiring modified processing may be assigned to modified/updated/other workflows to change their assigned processing.

Versioning may be used to control processing by appropriate workflows, and may facilitate reliable and accurate record keeping and playback. By tracking which version of a workflow handles a transaction, the transaction can be replayed using the same version at a later time as part of an audit. To this end, microservices may maintain separate indications of each workflow and version handled by the microservice. Transactions may maintain transaction metadata indicating a version value for the workflow applied to the transaction. Transactions may be assigned a current workflow value when added to the transaction exchange platform, and this may be maintained through the life of the transaction. In some circumstances, the version may be changed later and the transaction re-run through the new version of the workflow.

Examples of some types of changes that may be implemented through dynamic reconfiguration will be discussed with references to FIGS. 7A-7C.

Figure 7A:
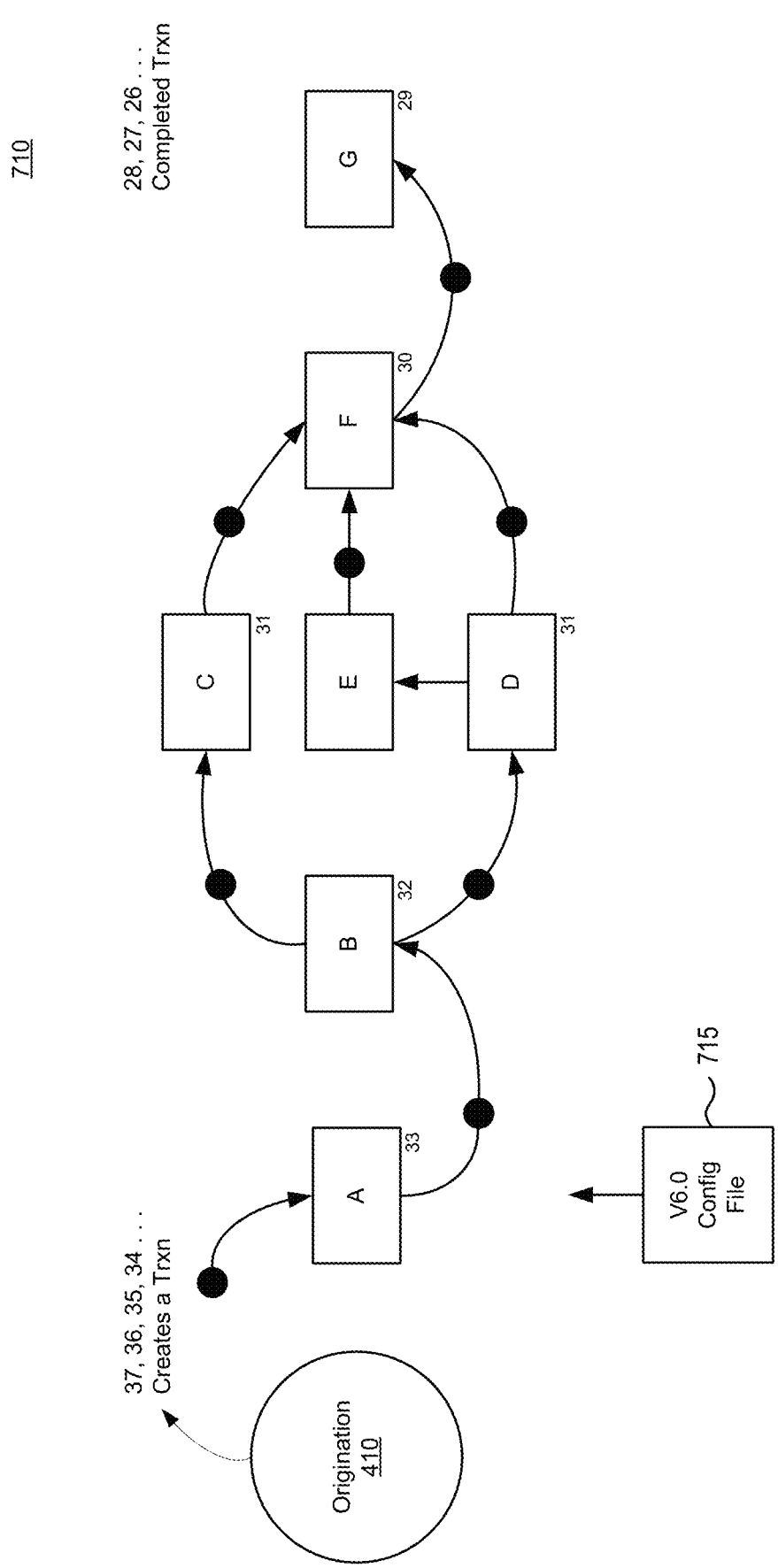
FIGS. 7A-7C depict illustrative changes to workflows, as graphs, according to one or more aspects of the disclosure.

FIG. 7A illustrates pushing a new configuration to one or more of the microservices associated with example workflow 710, which may correspond to example wire transaction workflow 400. This new configuration may modify the processing logic applied by one or more of the microservices corresponding to the steps of workflow 400/710. Configuration interface 660 may generate a configuration transaction object comprising the new configuration and push it to the SDP stream. The configuration transaction object may cause update of the microservices mid-stream as part of the flow within the transaction exchange platform on the SDP. Each microservice, as with transaction objects, may be configured to watch for configuration transaction objects associated with a configuration workflow and corresponding workflow stage. The microservices may retrieve matching configuration transaction objects and process them to effect an update to their respective processing logic. A microservice, transaction object, and/or the configuration microservice may maintain a new and prior version of their configurations. This may allow for processing under an appropriate version, and may facilitate a transition between versions as further discussed herein.

The mid-stream nature of the dynamic reconfiguration may help avoid significant interruptions and replayability problems posed by prior solutions. As illustrated, transactions 20, 30, 31, 32, and 33 may be on the SDP and already subject to processing by microservices in the current version of the workflow. When a new configuration is pushed (such as version 6.0), the transactions pending on the SDP may continue to be processed according to the prior version that they started under (e.g., version 5.0). New transactions 34, 35, 36, and 37 may be processed under the new version (6.0). As described above, this may be effected through transaction metadata tracking the workflow version associated with the transaction as well as by configuring the microservices to utilize version metadata in retrieving transactions from the SDP. For example, returning to FIG. 6, microservice 631a may represent a first version of a microservice that looks for transactions in a given workflow type that have a first version value at a corresponding first workflow stage. Microservice 631b may represent a second version of the microservice, and may look for transactions in the same workflow type but having a second version value at the same corresponding first workflow stage. In some implementations, the version value may be combined with the workflow type rather than separate (e.g., "ACHv1" and "ACHv2" as separate workflows rather than version values).

This procedure, pushing configuration transaction objects via the SDP, may provide additional advantages in that, when new components are added, the configuration interface 660 can interject that new component mid-stream so that it is enabled as a new route without updating the entire transaction exchange. This limits disruption to the local "new" component being added or changed while protecting the entire system for the change. This may be advantageous as change remains one of the single biggest drivers of break events. It also enables on-the-fly updates without taking the entire system down into maintenance.

Figure 7B:
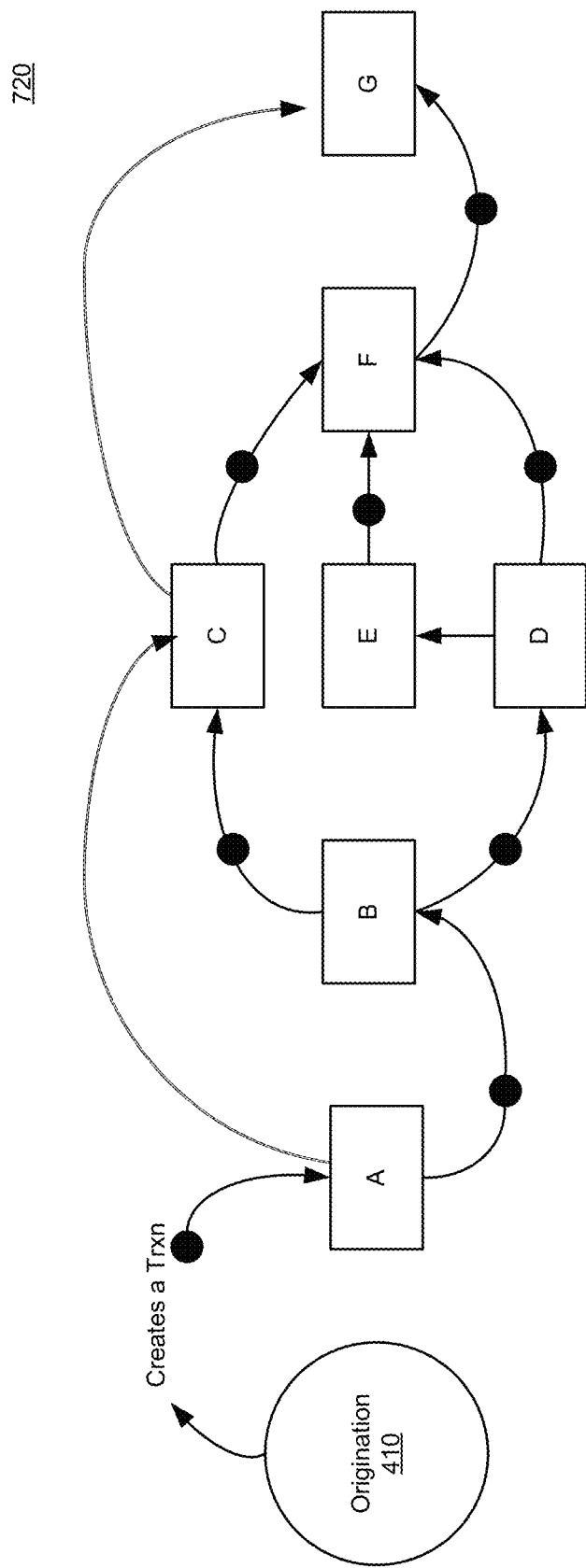

FIG. 7B illustrates a dynamic reconfiguration of a workflow process 720, such as when a component becomes unavailable due to breakage or other adverse events. The dynamic reconfiguration may reconfigure the workflow to bypass problematic services and redirect the workflow to manual review and/or other replacement processing steps. The reconfiguration may avoid bottlenecks associated with microservices earlier in the workflow breaking and preventing transactions from advancing to later microservices. Reconfiguration of workflows may be accomplished through reconfiguring the microservices involved in the workflow to look for different current workflow stages on the SDP.

For example, in reconfigured workflow process 720, which may be a modification of example wire transaction workflow 400, the dynamic reconfiguration may cause all wire transactions to be subject to the enhanced processing of step 'C' rather than the branching paths described above with respect to FIG. 4. This may be due to enhanced security concerns, problems with international wire processing, problems at other components, etc. The reconfiguration of FIG. 7B may be accomplished by configuration interface 660 pushing a configuration transaction object to the SDP that is configured to cause the microservices associated with workflow 400/720 to modify what workflows and workflow stages they look for, as well as how they update the current workflow once processing is completed. In particular, the modification shown in FIG. 7B could be effected by modifying the microservice associated with step 'D' to not pull any transactions, while the microservice affiliated with step 'C' may pull all transactions completed by step 'B'; or step 'B' could be modified to update the current workflow of all processed transactions such that they progress to the enhanced verification of step 'C', for example.

Modifications to the workflow may be done in response to determining conditions that indicate that modified workflow processing should be implemented. The modifications may also be done in response to user changes to a DAG representing the workflow. A user may modify the DAG to define a new workflow/version and the configuration interface 660 may generate a suitable configuration transaction object and push it to the SDP to effect the change. The system may provide a graphical user interface to facilitate users entering modifications to the DAG associated with the workflow processing.

Reconfiguration of the workflows and/or microservices may be handled in a versioned manner, such that transactions on the SDP may be handled according to an appropriate and auditable version of the workflow. When a new configuration version is pushed to the SDP for a given workflow, it may be added with a new version value. Transaction objects on the transaction exchange platform may include, as part of their transaction metadata, an indication of a current version value for the workflow at the time they entered the transaction exchange platform. The microservices on the transaction exchange platform may be further configured to identify transaction objects having an appropriate current workflow stages based on the version value of the transaction object. Thus, transactions added under a first workflow version may reliably be processed under the first workflow version, while transaction added after a shift to a second workflow version may be processed using the new, updated workflow version (and associated microservices and processing logic).

Thus, a first microservice in a first version 631a may be originally configured to watch for transactions associated with the first workflow that have a first version value, while the first microservice in a second version 631b may be configured to watch for transactions associated with the first workflow that have a different second version value. Transactions added to the transaction exchange platform may be added having a first version value prior to reconfiguring the first microservice. The first version of the first microservice 631a may retrieve transactions matching the first version value in a corresponding workflow/stage. Once a reconfiguration is pushed to the SDP, later transaction added to the SDP may be added having a second version value. The second version of the first microservice 631b may retrieve transaction matching the second version value in a corresponding workflow/stage. This may allow for reliable and replayable processing of transactions according to the appropriate version of approval workflows.

Figure 7C:
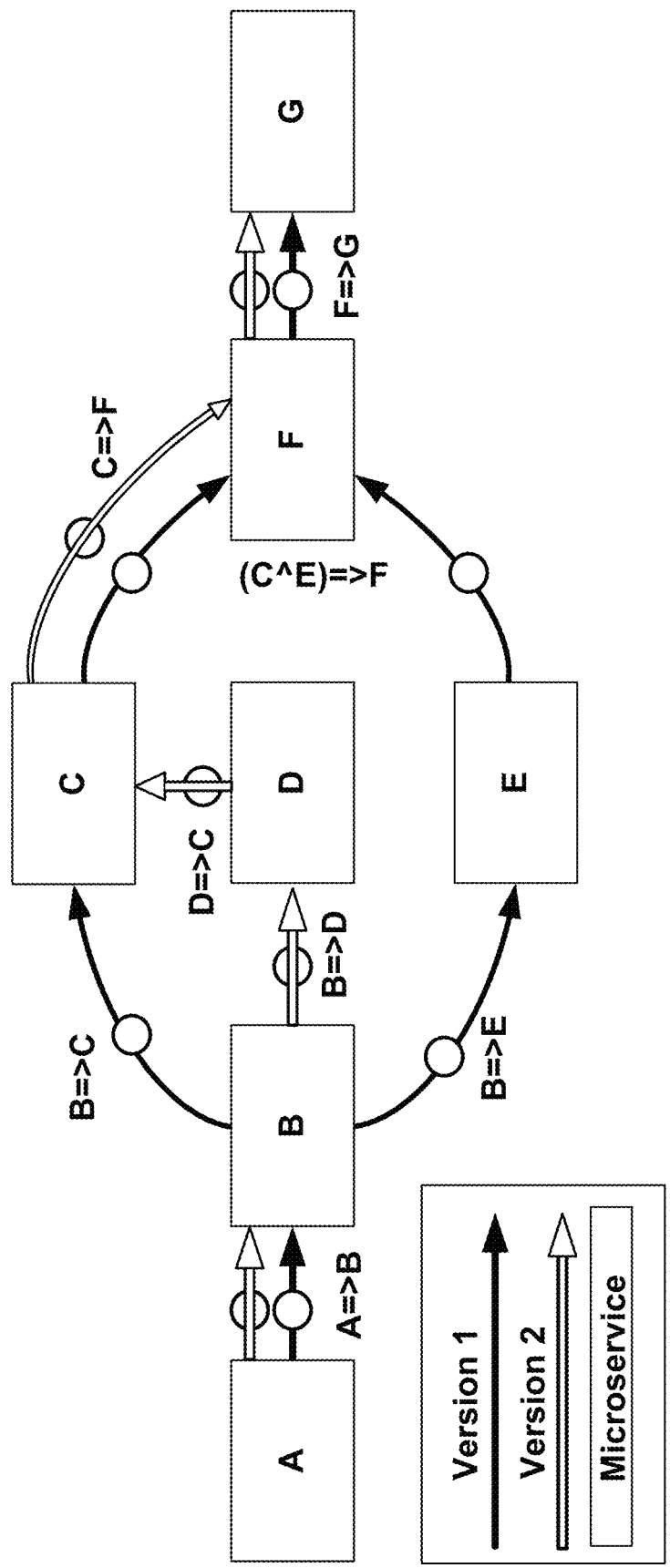

New workflow versions may be added as illustrated in FIG. 7C, through workflow 730. One flexible use of this approach is the ability to generate a workflow designed to modify an individual transaction and/or group of transactions. Version 1 of the work flow, indicated by the single arrows, may be applied to general transaction objects of a given transaction type. Version 2 of the workflow, indicated by the double arrows, may be applied to problematic transactions subject to modified processing. The transaction exchange platform may support microservices, queuing, and manual workflows as part of being highly resilient, especially around high value workflows. As such, the dynamic configuration aspects may facilitate controlling a single transaction's path through the platform enabling it to bypass steps normally required by the common workflow. A new workflow can be introduced to the ecosystem with differentiating execution tied directly to a transaction.

As an example implementation, the following sample data illustrates how a workflow may change across versions of the workflow according to one or more aspects:

```
Initial Configuration Version 1
{
    "SecurityIdentifier": "<< identifier >>",
    "ConfigurationVersion": "1",
    "WorkflowStage": [{
        "A": [{
            "WorkflowType": ["WIRE", "ACH", "RTP", "CHECK", "CONFIG"],
            "WorkflowStageCompleted": ["INIT"]
        }],
        "B": [{
            "WorkflowType": ["WIRE", "ACH", "RTP", "CHECK", "CONFIG"],
            "WorkflowStageCompleted": ["A"]
        }],
        "C": [{
            "WorkflowType": ["WIRE", "ACH", "RTP", "CHECK", "CONFIG"],
            "WorkflowStageCompleted": ["B"]
        }],
        "E": [{
            "WorkflowType": ["WIRE", "ACH", "RTP", "CHECK", "CONFIG"],
            "WorkflowStageCompleted": ["B"]
        }],
        "F": [{
            "WorkflowType": ["WIRE", "ACH", "RTP", "CHECK", "CONFIG"],
            "WorkflowStageCompleted": ["C", "E"]
        }],
        "G": [{
            "WorkflowType": ["WIRE", "ACH", "RTP", "CHECK", "CONFIG"],
            "WorkflowStageCompleted": ["F"]
        }]
    }]
}
Post Configuration Update Version 2
{
    "SecurityIdentifier": "<< identifier >>",
    "ConfigurationVersion": "2",
    "WorkflowStage": [{
        "A": [{
            "WorkflowType": ["WIRE", "ACH", "RTP", "CHECK", "CONFIG"],
            "WorkflowStageCompleted": ["INIT"]
        "B": [{
            "WorkflowType": ["WIRE", "ACH", "RTP", "CHECK", "CONFIG"],
            "WorkflowStageCompleted": ["A"]
        }],
        "D": [{
            "WorkflowType": ["WIRE", "ACH", "RTP", "CHECK", "CONFIG"],
            "WorkflowStageCompleted": ["B"]
        }],
        "C": [{
            "WorkflowType": ["WIRE", "ACH", "RTP", "CHECK", "CONFIG"],
            "WorkflowStageCompleted": ["D"]
```

```
        }],
        "F": [{
            "WorkflowType": ["WIRE", "ACH", "RTP", "CHECK", "CONFIG"],
            "WorkflowStageCompleted": ["C"]
        }];
        "G": [{
            "WorkflowType": ["WIRE", "ACH", "RTP", "CHECK", "CONFIG"],
            "WorkflowStageCompleted": ["F"]
        }]
    }]
}
```

Another aspect of dynamic reconfiguration may provide an event configuration library. Configurations employed to process transactions have certain characteristics may be stored for re-use in other settings, such as when those same characteristics are encountered again. Configurations that were pushed to resolve those transaction may be used again to facilitate handling of other similar transactions. For example, if manual or other review identifies a high risk transaction, a high risk transaction configuration can be pushed to apply a high risk version of the workflow to the high risk transaction. As a particular example, consider when a transaction is associated with a merger of two companies. To facilitate the merger, transactions may be reconfigured to bypass standard workflows and feed through specialized microservices configured to meet specific reporting needs of M&A transactions.

These configurations may be utilized manually, automatically, through a hybrid approach, and others. For example, machine learning may be employed to recognize problem situations with transactions. The machine learning system may flag a transaction to be reconfigured to follow a configuration of the configuration library that was previously employed on similar transactions. The system may be designed to self-optimize its own configurations, employing approaches based on features such as shortest path, fastest time, most secure, guaranteed deliver, or any other features desirable to customers.

Figure 8:
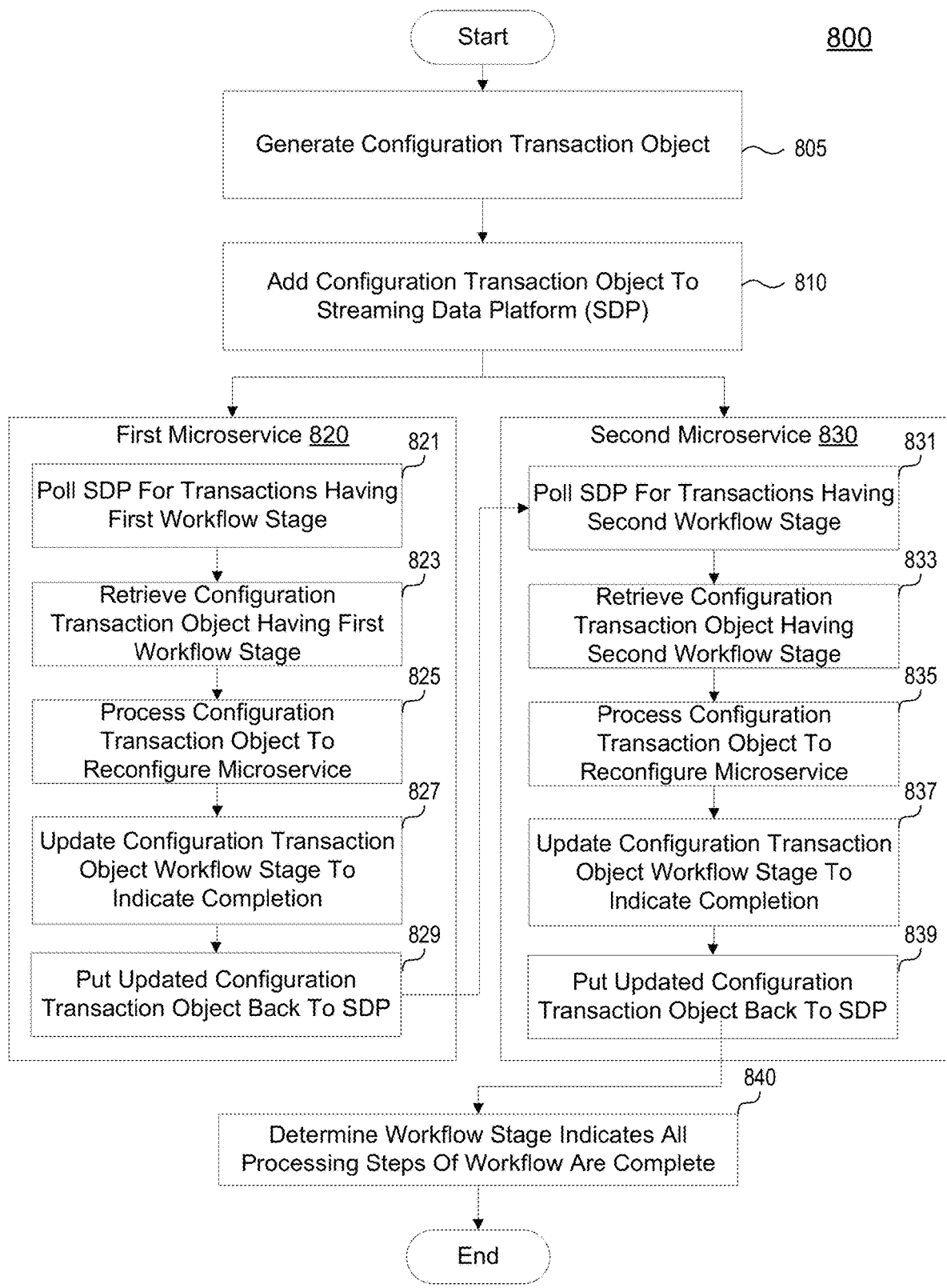
FIG. 8 depicts an illustrative method for reconfiguring microservices according to one or more aspects of the disclosure.

FIG. 8 depicts a flowchart illustrating an example method 800 to dynamically reconfigure a transaction exchange platform, such as transaction exchange platform 320. Method 800 may be performed by any suitable computing device and/or combination of computing devices, referred to as the system implementing method 800.

At step 805, the configuration interface 660 may generate a configuration transaction object. The configuration transaction object may be configured to cause a reconfiguration of the transaction exchange platform, one or more workflows, one or more microservices, and/or one or more transactions. The configuration interface 660 may receive a request to generate the configuration transaction object from a user and/or other system processes, such as a watchdog microservice (discussed further below with respect to FIG. 9). The configuration transaction object may comprise transaction details and transaction metadata. The transaction metadata may indicate that the transaction object has a configuration workflow type and a current workflow stage of the configuration transaction object. In some embodiments, the workflow type of the configuration transaction object is a workflow that is modified by the configuration transaction object, and other aspects of the configuration transaction object indicate to a processing microservice that it includes an update to the processing of the microservice. The configuration transaction object may include instructions that, when processed by the microservice, cause the microservice to be reconfigured. Reconfiguration may include modifying which workflow/version/stage the microservice looks for on the SDP, and/or may include modifying the core processing logic employed by the microservice.

At step 810, the configuration interface 660 may add the configuration transaction object to the SDP, where it may await processing by first microservice 820 and second microservice 830.

The configuration transaction object may be picked up by first microservice 820 and second microservice 830 in a similar fashion to that described above with respect to FIG. 5. At steps 821 and 831, first and second microservices 820 and 830 may poll the SDP to retrieve transactions matching their assigned workflow stages in corresponding workflow types. The configuration transaction objects may have a configuration workflow type, and the microservices may watch for a configuration workflow type object having the workflow stage corresponding to the microservice. At steps 823 and 833, the microservices may retrieve the configuration transaction object for processing.

At steps 825 and 835, the microservices may process the configuration transaction object when it is in a corresponding workflow stage. Processing the configuration transaction object may cause the microservice to be updated. For example, the configuration transaction object may cause the microservice to update what workflow/version/stage it looks for on the SDP. As another example, processing the configuration transaction object may cause the microservice to update the core processing logic that it applies to transactions.

At steps 827 and 837, the microservices may update the current workflow stage of the configuration transaction object and, at steps 829 and 839, the microservices may push the updated configuration object back to the SDP. For example, microservice 820 may update the current workflow stage of the configuration object to indicate that microservice 820 has completed processing, and microservice 830 may be configured to look for transaction objects that have a current workflow stage that indicates that microservice 820 completed its processing.

At step 840, the system may determine that the current workflow stage of the configuration transaction object indicates that the processing associated with the configuration workflow has completed, and the configuration transaction object may be removed from the SDP. Notification may be provided to an entity that prompted the reconfiguration that it has been implemented, in some embodiments.

Thus, according to some aspects, a computer-implemented method may comprise configuring a plurality of microservices on a streaming data platform to watch for transactions having a corresponding workflow stage associated with a first workflow. The first workflow may correspond to a transaction type and may comprise a plurality of processing steps required to approve a given transaction of the transaction type. The steps may further comprise generating a configuration transaction object that may be configured to cause reconfiguration of the first workflow by causing reconfiguration of at least one microservice of the plurality of microservices. The configuration transaction object may comprise transaction metadata that indicates a configuration workflow and a current workflow stage of the configuration transaction object. The steps may further comprise adding the configuration transaction object to the streaming data platform and updating the current workflow stage of the configuration transaction object to a first workflow stage. The method may comprise polling, by a first microservice of the plurality of microservices, the streaming data platform to retrieve transactions matching the first workflow stage; retrieving, by the first microservice and from the streaming data platform, the configuration transaction object based on the current workflow stage matching the first workflow stage; processing, by the first microservice, the configuration transaction object to reconfigure the first microservice; and updating the current workflow stage of the configuration transaction object to a second workflow stage based on completing processing, by the first microservice, of the configuration transaction object. The method may also comprise determining that the current workflow stage of the configuration transaction object indicates that the configuration transaction object has completed processing corresponding to the configuration workflow, and removing the configuration transaction object from the streaming data platform and outputting an indication that the configuration transaction object has completed the processing corresponding to the configuration workflow.

Reconfiguring the first microservice may comprise reconfiguring the first microservice to watch for a different second workflow stage. Reconfiguring the first microservice may cause the first microservice to process transaction objects at a different stage of the plurality of processing steps of the first workflow. Reconfiguring the first microservice may comprise reconfiguring the first microservice to modify at least one operation that the first microservice performs on transaction objects associated with the first workflow. Reconfiguring the first microservice may cause removal of at least one second microservice from the first workflow. The first microservice may be originally configured to update completed transactions with a first completed workflow stage. Reconfiguring the first microservice may comprise reconfiguring the first microservice to update completed transactions with a different completed workflow stage. Reconfiguring the first microservice may cause transaction objects to bypass at least one second microservice included in the first workflow. The first microservice may be originally configured to watch for transactions associated with the first workflow that have a first version value. The reconfigured first microservice may be configured to watch for transactions associated with the first workflow that have a different second version value.

The method may further comprise adding a first transaction object having a first version value to the streaming data platform prior to reconfiguring the first microservice; retrieving, by the first microservice and from the streaming data platform, the first transaction object based on a current workflow stage of the first transaction matching the first workflow stage; processing, by the first microservice, the first transaction object based on an original configuration of the first microservice based on the first version value; adding a second transaction object having a different second version value to the streaming data platform subsequent to reconfiguring the first microservice; retrieving, by the first microservice and from the streaming data platform, the second transaction object based on a current workflow stage of the second transaction matching the first workflow stage; and processing, by the first microservice, the second transaction object based on the reconfiguration of the first microservice based on the second version value. The steps may further comprise adding a first transaction object to the streaming data platform; determining a current version of the first workflow implemented on the streaming data platform; and updating a version value of the first transaction object based on the current version. The first microservice may process the first transaction object based on an original configuration or a modified configuration based on the version value.

The workflow corresponding to the transaction type may comprise a directed acyclic graph (DAG) indicating the plurality of processing steps required to approve a given transaction of the transaction type. The first microservice may be automatically configured to watch for transactions on the streaming data platform in the first workflow stage based on the DAG. Generating the configuration transaction object may be in response to an update to at least one of the plurality of processing steps indicated in the DAG. The steps may further comprise providing a graphical user interface to allow a user to update the at least one of the plurality of processing steps indicated in the DAG.

According to some aspects, a transaction exchange platform may comprise a streaming data platform, a plurality of microservices, at least one processor, and memory. Each microservice of the plurality of microservices may be automatically configured to watch for transactions on the streaming data platform in a corresponding workflow stage based on a plurality of workflows corresponding to a plurality of transaction types. The memory may store instructions that, when executed by the at least one processor, cause the platform to perform steps including configuring the plurality of microservices on the streaming data platform to watch for transactions having a corresponding workflow stage associated with a first workflow. The first workflow may correspond to a transaction type and comprises a plurality of processing steps required to approve a given transaction of the transaction type. The steps may further comprise processing, by a first microservice, transaction objects on the streaming data platform based on the configuration; and generating a configuration transaction object that may be configured to cause reconfiguration of the first workflow by causing reconfiguration of at least one of microservice of the plurality of microservices. The configuration transaction object may comprise transaction metadata that indicates a configuration workflow and a current workflow stage of the configuration transaction object. The steps may further comprise adding the configuration transaction object to the streaming data platform; updating the current workflow stage of the configuration transaction object to a first workflow stage; polling, by a first microservice of the plurality of microservices, the streaming data platform to retrieve transactions matching the first workflow stage; retrieving, by the first microservice and from the streaming data platform, the configuration transaction object based on the current workflow stage matching the first workflow stage; and processing, by the first microservice, the configuration transaction object to reconfigure the first microservice. Subsequent to processing the configuration transaction object, the first microservice may process transaction objects on the streaming data platform based on the reconfiguration.

According to some aspects, one or more non-transitory computer readable media may comprise instructions that, when executed by at least one processor, cause a transaction exchange platform to perform steps. Those steps may comprise configuring a first microservice on a streaming data platform to watch for transactions having a first workflow stage associated with a first workflow corresponding to a transaction type. The first workflow may comprise a plurality of processing steps required to approve a given transaction of the transaction type. The steps may further comprise configuring a second microservice on the streaming data platform to watch for transactions having a second workflow stage associated with the first workflow; and generating a configuration transaction object that may be configured to cause reconfiguration of the first workflow by causing reconfiguration of the first microservice and the second microservice. The configuration transaction object may comprise transaction metadata that indicates a configuration workflow, and a current workflow stage of the configuration transaction object. The steps may further comprise adding the configuration transaction object to the streaming data platform; updating the current workflow stage of the configuration transaction object to the first workflow stage; polling, by the first microservice, the streaming data platform to retrieve transactions matching the first workflow stage; retrieving, by the first microservice and from the streaming data platform, the configuration transaction object based on the current workflow stage matching the first workflow stage; processing, by the first microservice, the configuration transaction object to reconfigure the first microservice; updating the current workflow stage of the configuration transaction object to a second workflow stage based on completing processing, by the first microservice, of the configuration transaction object; polling, by the second microservice, the streaming data platform to retrieve transactions matching the second workflow stage; retrieving, by the second microservice and from the streaming data platform, the configuration transaction object based on the current workflow stage matching the second workflow stage; processing, by the second microservice, the configuration transaction object to reconfigure the second microservice; updating the current workflow stage of the configuration transaction object to a third workflow stage based on completing processing, by the second microservice, of the transaction object; determining that the current workflow stage of the configuration transaction object indicates that the configuration transaction object has completed processing corresponding to the configuration workflow; and removing the configuration transaction object from the streaming data platform and outputting an indication that the configuration transaction object has completed the processing corresponding to the configuration workflow.

According to some aspects, a computer-implemented method may comprise steps comprising configuring a plurality of microservices on a streaming data platform to watch for transactions having a corresponding workflow stage associated with a first workflow. The first workflow may correspond to a transaction type and comprises a plurality of processing steps required to approve a given transaction of the transaction type. The steps may further comprise generating a configuration transaction object that may be configured to cause reconfiguration of the first workflow by causing reconfiguration of at least one microservice of the plurality of microservices. The configuration transaction object may comprise transaction metadata that indicates: a configuration workflow, and a current workflow stage of the configuration transaction object. The steps may further comprise adding the configuration transaction object to the streaming data platform; retrieving, by a first microservice and from the streaming data platform, the configuration transaction object based on the current workflow stage matching a first workflow stage associated with the first microservice; processing, by the first microservice, the configuration transaction object to reconfigure the first microservice; and updating the current workflow stage of the configuration transaction object to a second workflow stage based on completing processing, by the first microservice, of the configuration transaction object.

Chronos—Snapshot Microservice and Transaction Replay

Some aspects described herein may provide a snapshot microservice on the transaction exchange platform, configured to maintain a record of the data values of each transaction object as they progress through the corresponding workflows. "Snapshot," when used to refer to the snapshot microservice, may refer to the functionality of the snapshot microservice to track a transaction object's data values and each of its changed states as an archival service. The snapshot microservice thus may also be referred to as a payment transaction object changed state archive, or Chronos. The snapshot microservice may create a snapshot record for new transaction objects and store a copy of the data of the transaction object. As the transaction object progresses through the workflow and is processed by the other microservices, the snapshot microservice can identify transaction objects that have their data changed. The snapshot microservice can retrieve the changed objects and store snapshot data tracking the change of the transaction object.

Figure 9:
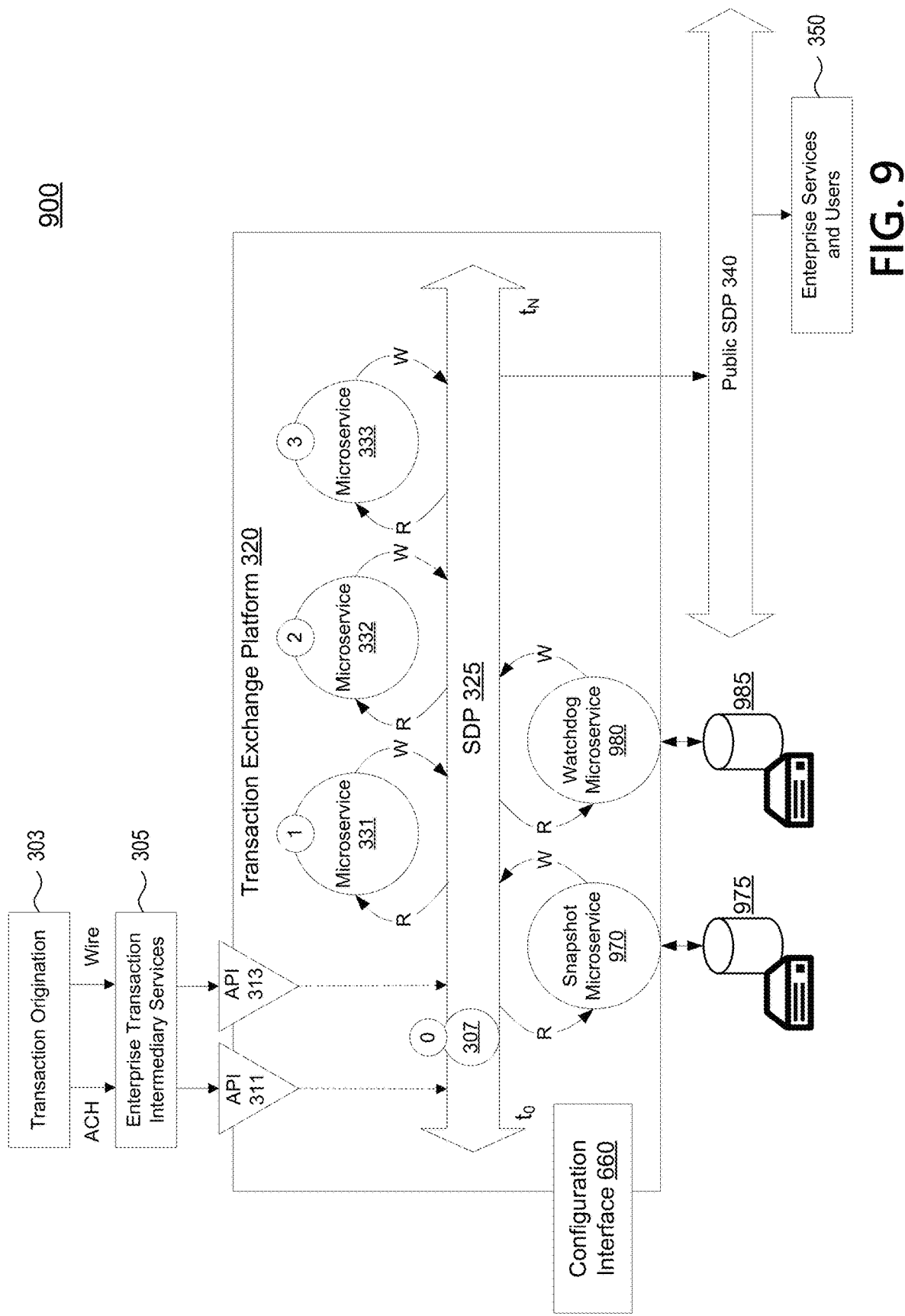
FIG. 9 depicts an example transaction exchange platform having a snapshot microservice and a watchdog microservice according to one or more aspects of the disclosure.

FIG. 9 illustrates a transaction processing system 900 that may be similar to transaction processing systems 300 and/or 600 of FIGS. 3A and 6. Transaction processing system 900 may add, relative to systems 300 and 600, snapshot microservice 970 and watchdog microservice 980. This document section focuses on snapshot microservice 970, while the next document section focuses on watchdog microservice 980.

Snapshot microservice 970 may operate on transaction exchange platform 320 to maintain a record of the data values of each transaction object on the streaming data platform, and may track how the transaction objects change during processing on the platform. Snapshot data may be stored in snapshot database 975, which may comprise on-disk storage capable of effectively storing large volumes of data. Snapshot microservice 970 and snapshot database 975 may be configured to store differential snapshots of a transaction object. Snapshot microservice 970 may store an original state of a transaction object when it is added to the SDP, and may store information indicating each subsequent change to the transaction object. Snapshot microservice may track data values associated with each of the transaction details, transaction addenda data, and/or transaction metadata. In some embodiments however, the transaction metadata may be additionally and/or alternatively tracked by watchdog microservice 980.

The snapshot microservice 970 may be configured to identify and retrieve transaction objects added to SDP 325 in an initialization stage. Transaction objects may be added to the SDP 325 in an "init" or initialization stage, indicating that none of the workflow steps have yet been completed. In some implementations, the initialization stage may be a separate stage that is marked completed prior to processing by a first microservice 331, or may be commensurate in scope with a first workflow stage associated with a first microservice 331 of the workflow. In some implementations, the initialization stage for the object may be handled as part of the processing by the APIs 311, 313 that receive transactions to be added to the SDP 325, or otherwise handled alongside workflow processing by the respective microservices 331, 332, and 333.

Snapshot microservice 970 may store an initial snapshot of a transaction object in the initialization stage, then update a current workflow stage of the transaction object to indicate that the initialization processing has completed. This may comprise updating the current workflow stage of the transaction object to match a first workflow stage associated with microservice 331, which microservice 331 performs the first step of the workflow. Alternatively, snapshot microservice 970 may treat transaction objects in the first workflow stage as being subject to initialization (as new objects), and may determine that an initial, new snapshot should be recorded in snapshot database 975.

Snapshot microservice 970 may be configured to poll the SDP to retrieve all transaction objects having changed data. In some embodiments, this may comprise retrieving all transaction objects and determining whether there have been any changes. In other embodiments, it may comprise retrieving specifically the transaction objects that have changed, whether based on determining that the data has changed or merely that a workflow stage has advanced. Snapshot microservice 970 may determine a difference in the changed transaction object and store snapshot information indicating the difference. The snapshot information may include metadata such as an associated timestamp, workflow stage, and/or any other suitable metadata to facilitate audit and potential rollback of the transaction object and workflow processing.

These snapshots of the transaction object may be used to correct processing errors in the approval workflow, as a transaction object may have its data reverted back to an earlier state and its workflow stage reverted to an earlier stage. In this way, the transaction object may be made to repeat an earlier step of the workflow and be subject to re-processing by a corresponding microservice (or, in some cases such as repeated failures, a human operator). The snapshot microservice 970 may regenerate a transaction object using the snapshot data corresponding to the transaction object from an earlier time, prior to a point in processing that is subject to the rewind. In effect, snapshot microservice 970 may roll back the values of the transaction object to an earlier point in time. Then, the regenerated transaction object may be put back on SDP 325 and will be picked up for re-processing by the earlier microservice. For example, if an error is determined to have occurred during processing of transaction object 307 by first microservice 331, the snapshot microservice 970 may revert transaction object 307 to state prior to processing by first microservice 331. The first microservice 331 would have updated the stage of the transaction object 307 to the second workflow stage when processing completed. The snapshot microservice 970 may revert the current workflow stage of the transaction object 307 to the first workflow stage, so that when the transaction object 307 is pushed back to the SDP 325 it will be picked up for processing again by the first microservice 331.

A command to replay a transaction may be received by the snapshot microservice 970. For example, watchdog microservice 980 may determine that processing by first microservice 331 completed abnormally, and may command snapshot microservice 970 to perform a replay. Other conditions may prompt a replay, such as an error state of a microservice or the transaction exchange platform 320.

The snapshot microservice may track the total number of times that a transaction object is reverted/replayed on one or more microservices, and may flag a transaction as presenting problems requiring manual or other review when the number of replays exceeds a transaction or based on other criteria. Replaying a transaction may cause update of a transaction replay count associated with the transaction, which may be stored as part of the transaction object's transaction metadata and/or as part of the snapshot information. If a threshold number of replays take place, for example a configurable maximum of 3 replays at a single stage of the workflow, the snapshot microservice 970 may flag the transaction as having failed and/or requiring further review. The maximum, which may be implemented as a threshold value, may be configured by a user and/or may be automatically configured by system processes based on historical data, current system state, and other performance metrics. The transaction may be held in a workflow stage corresponding to the microservice where processing failed, in some instance. In other instances, a failed transaction may be routed to additional processing, such as by a different workflow and/or other parts of the same workflow, where it may be processed by other microservices.

When a replay occurs, the snapshot information may continue to track all subsequent events as well as all events that had occurred already on the transaction, even if they are subject to rewinding. Thus, the snapshot information may support a comparison during troubleshooting to assess which parts of the system led to errors in the workflow. This information may be archived to assist in troubleshooting and audits. Snapshot information related to error processing that is fixed via replay may be deleted upon successful completion of the re-attempt.

The snapshot data may also support audit of the transactions, offering a complete picture of how the transaction object changed while on the transaction exchange platform. If desired as part of auditing results, the snapshot microservice 970 may replay an entire transaction snapshot by snapshot. This may be done in support of an audit or for troubleshooting and analysis.

Figure 10:
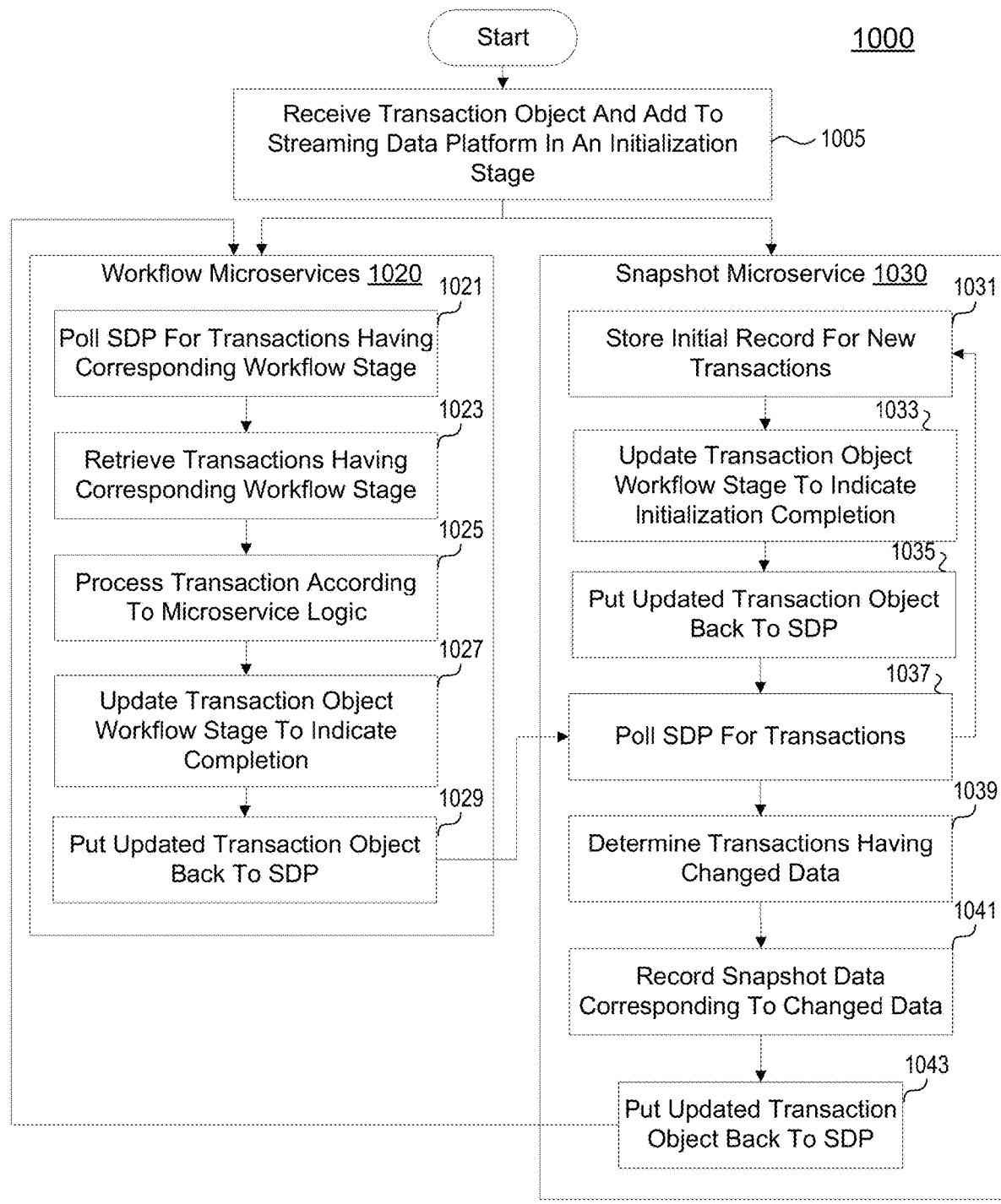
FIGS. 10-15 depict illustrative methods for operation of the snapshot microservice and the watchdog microservice according to one or more aspects of the disclosure.

FIG. 10 depicts a flowchart illustrating an example method 1000 to generate snapshot information tracking a transaction object on a transaction exchange platform, such as transaction exchange platform 320. Method 1000 may be performed by any suitable computing device and/or combination of computing devices, referred to as the system implementing method 1000.

At step 1005, the transaction exchange platform may receive a transaction object and add it to a SDP. The transaction object may be added to the SDP in an initialization stage.

At step 1031, snapshot microservice 1030 may store an initial snapshot record for new transaction objects on the SDP. For example, snapshot microservice 1030 may poll the SDP for transaction objects in the initialization stage. Alternatively and/or additionally, snapshot microservice 1030 may poll SDP for all transaction objects, and determine which are new and should be stored as initial snapshot records.

At step 1033, snapshot microservice 1030 may update the current workflow stage of the transaction object to indicate completion of initialization processing by the snapshot microservice 1030. This may comprise updating the current workflow stage of the transaction object to be a workflow stage associated with a workflow microservice 1020. At step

1035, snapshot microservice 1030 may put the transaction object back to the SDP with the updated current workflow stage.

At step 1021, workflow microservice 1020 may poll the SDP for transactions having a current workflow stage assigned to the microservice, and at step 1023 the workflow microservice may retrieve the matching transaction objects. At step 1025, workflow microservice 1020 may process the transaction objects according to its respective processing logic, which may include updating, adding, removing, and/or otherwise changing values of the transaction details, addenda data, and/or transaction metadata associated with the transaction object. At step 1027, workflow microservice 1020 may update the transaction object's current workflow stage to indicate completion of processing by microservice 1020 and, at step 1029, put the updated transaction object back to the SDP.

At step 1037, snapshot microservice 1030 may poll the SDP for transactions and, at step 1039, determine transaction having changed data. Snapshot microservice 1030, at step 1041, may record snapshot data corresponding to the changed data as a result of processing by workflow microservices 1020. The snapshot microservice 1030 may, at step 1043, put the transaction object back to the SDP for further processing by workflow microservices 1020.

Figure 11:
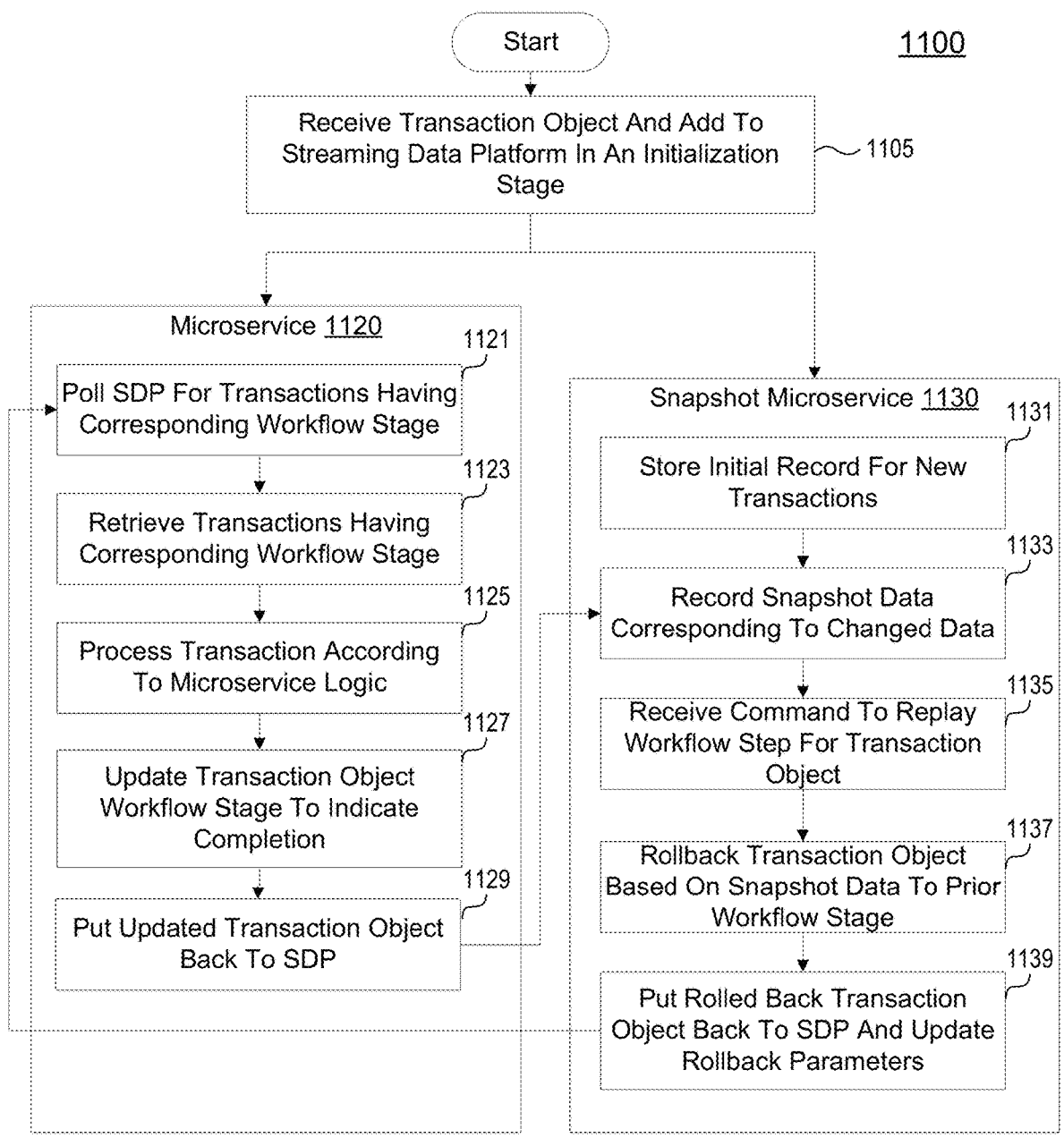

FIG. 11 depicts a flowchart illustrating an example method 1100 to replay a transaction (e.g., subject it to reprocessing) using a snapshot microservice on a transaction exchange platform, such as transaction exchange platform 320. Method 1100 may be performed by any suitable computing device and/or combination of computing devices, referred to as the system implementing method 1100.

At step 1105, the transaction exchange platform may receive a transaction object and add it to a SDP. The transaction object may be added to the SDP in an initialization stage.

The transaction object may be processed by microservice 1120 in steps 1121, 1123, 1125, 1127, and 1129 as described herein, for example in similar fashion to that described with respect to FIG. 10 in steps 1021, 1023, 1025, 1027, and 1029.

Snapshot microservice 1130 may record initial and changed snapshot information in steps 1131 and 1131, as described in greater detail above with respect to FIG. 10 in steps 1031, 1033, 1035, 1037, 1039, 1041, and 1043.

At step 1135, snapshot microservice 1130 may receive a command to replay a workflow step for a transaction object. For example, a watchdog microservice may send snapshot microservice 1130 a command to replay the transaction object in a first workflow stage.

At step 1137, snapshot microservice 1130 may use the stored snapshot information to rollback the transaction object to its state prior to the point of replay. The transaction object may be made to repeat an earlier step of the workflow and be subject to re-processing by a microservice to the workflow step indicated to be replayed. The snapshot microservice 1130 may regenerate a transaction object using the snapshot data corresponding to the transaction object from an earlier time, prior to a point in processing that is subject to the rewind.

At step 1139, snapshot microservice 1130 may put the regenerated transaction object back on the SDP. Because the regenerated transaction object has the earlier workflow stage, it will be picked up for re-processing by the earlier microservice.

Thus, according to some aspects, a computer-implemented method may comprise steps comprising receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and updating the current workflow stage of the transaction object to a next workflow stage based on completing storing, by the snapshot microservice, the snapshot data corresponding to the transaction object. The method may comprise retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data. The method may comprise determining, by the snapshot microservice and via the streaming data platform, that at least one value associated with the addenda data of the transaction object has changed after the transaction object has left the initialization stage, and storing, by the snapshot microservice, snapshot data corresponding to the changed at least one value associated with the addenda data.

Determining that the at least one value associated with the addenda data of the transaction object has changed may comprise retrieving, by the snapshot microservice and from the streaming data platform, the transaction object. The steps may further comprise determining that the processing, by the first microservice, of the transaction object did not complete successfully, and causing the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on the snapshot data corresponding to the transaction object from prior to the start of the processing by the first microservice, and returning the regenerated transaction object to the streaming data platform. The current workflow stage of the regenerated transaction object may be set to the first workflow stage. The steps may further comprise determining a number of times that the transaction object has undergone processing by the first microservice and, in response to determining that the number of times that the transaction object has undergone processing by the first microservice exceeds a threshold value, rejecting the transaction object as having failed processing associated with the first microservice. The steps may further comprise flagging the transaction object for further review based on rejecting the transaction and holding the transaction object in the first workflow stage pending the further review. Updating the current workflow stage of the transaction object to a second workflow stage may be based on determining that the further review is completed. Flagging the transaction object for further review may comprise flagging the transaction object for manual review by a user. Flagging the transaction object for further review may comprise causing the transaction object to be processed by a third microservice. Updating the current workflow stage of the transaction object to the second workflow stage may be based on determining that processing by the third microservice is completed. The snapshot microservice may record second snapshot data corresponding to the transaction object from prior to causing the first microservice to repeat processing of the transaction object. The second snapshot data may be maintained despite the repeat processing of the transaction object.

The steps may further comprise determining, by the snapshot microservice and via the streaming data platform, that at least one value associated with the transaction metadata has changed; retrieving, by the snapshot microservice and from the streaming data platform, the transaction object based on determining that the at least one value has changed; and storing, by the snapshot microservice, data corresponding to the changed at least one value associated with the transaction metadata. The next workflow stage may correspond to the first workflow stage associated with the first microservice. The initialization stage may correspond to the first workflow stage. The snapshot microservice may generate a transaction history for the transaction object. The snapshot microservice may generate a transaction history for each transaction object added to the streaming data platform. The snapshot microservice may store snapshot data in an on-disk database.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details, addenda data, and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; and storing, by the snapshot microservice, snapshot data corresponding to the transaction object, updating the current workflow stage of the transaction object to a next workflow stage based on completing storing, by the snapshot microservice, the snapshot data corresponding to the transaction object; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data; determining, by the snapshot microservice and via the streaming data platform, that at least one value associated with the addenda data of the transaction object has changed after the transaction object has left the initialization stage; and storing, by the snapshot microservice, snapshot data corresponding to the changed at least one value associated with the addenda data.

The steps may further comprise determining that the processing, by the first microservice, of the transaction object did not complete successfully; and causing the first microservice to repeat processing of the transaction object based on the snapshot data corresponding to the transaction object from prior to the start of the processing by the first microservice. Causing the first microservice to repeat processing of the transaction object may comprise causing the transaction exchange platform to regenerate, by the snapshot microservice, the transaction object based on the snapshot data corresponding to the transaction object from prior to the start of the processing by the first microservice; and return the regenerated transaction object to the streaming data platform. A current workflow stage of the regenerated transaction object may be set to the first workflow stage. The snapshot microservice may generate a transaction history for each transaction object added to the streaming data platform.

According to some aspects, one or more non-transitory computer readable media may comprise instructions that, when executed by at least one processor, cause a transaction exchange platform to perform steps. Those steps may comprise receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; and storing, by the snapshot microservice, snapshot data corresponding to the transaction object, updating the current workflow stage of the transaction object to a next workflow stage based on completing storing, by the snapshot microservice, the snapshot data corresponding to the transaction object; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data; determining, by the snapshot microservice and via the streaming data platform, that at least one value associated with the addenda data of the transaction object has changed after the transaction object has left the initialization stage; storing, by the snapshot microservice, snapshot data corresponding to the changed at least one value associated with the addenda data; determining that the processing, by the first microservice, of the transaction object did not complete successfully; and causing the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on the snapshot data corresponding to the transaction object from prior to the start of the processing by the first microservice; and returning the regenerated transaction object to the streaming data platform. A current workflow stage of the regenerated transaction object may be set to the first workflow stage.

Arbiter—Watchdog Microservice for Tracking, Monitoring, and Remediation

Some aspects described herein may provide a watchdog microservice on the transaction exchange platform, configured to track the progress of transaction objects through their respective workflows. "Watchdog," when referring to the watchdog microservice, may refer to the functionality of the watchdog microservice to observe and archive the progress of transaction objects on the transaction exchange platform, and enforce the associated workflows. Thus the watchdog microservice may also be referred to as an observability and archive microservice, or Arbiter. The watchdog microservice may determine that a transaction object has completed the approval workflow based on the transaction object completing each component step of the workflow, and may cause the completed transaction to be output from the transaction exchange platform. The watchdog microservice may also enforce the workflow, causing transactions to repeat and/or revisit problematic steps of the workflow.

The watchdog microservice may track metrics and/or other statistics associated with the workflows, microservices, and/or transactions. Based on the tracked workflow data, the watchdog microservice may be able to assess trends associated with a workflow, microservice, or transaction. The watchdog microservice may compare a metric and/or other statistic to threshold performance values to determine when the workflow, microservice, or transaction is subject to abnormal or undesirable performance complications. For example, the watchdog microservice could determine that a particular microservice has a current average processing time greater than a configured warning threshold, or outside a typical range. Based on detecting abnormal or undesirable performance of the workflow, microservice, or transaction, the watchdog microservice can generate and/or implement a recommended corrective action. Example corrective actions may include causing a transaction to be replayed via a snapshot microservice, and causing a workflow to be dynamically reconfigured using a configuration interface.

FIG. 9, discussed above with respect to the snapshot microservice, also depicts watchdog microservice 980 and watchdog database 985. Watchdog microservice 980 may generate workflow tracking records for each transaction object on the transaction exchange platform 320, and may store information indicating whether the transaction object completed each step of the workflow along with timestamps and other suitable metadata. The workflow tracking records may be stored in watchdog database 985, which may comprise an in-memory database configured to support quick access and retrieval of records while on SDP 325.

The watchdog microservice 980 may serve as the judge (arbiter) in determining when a transaction object has completed the workflow processing steps of its corresponding workflow. This is further described with respect to FIG. 12.

Figure 12:
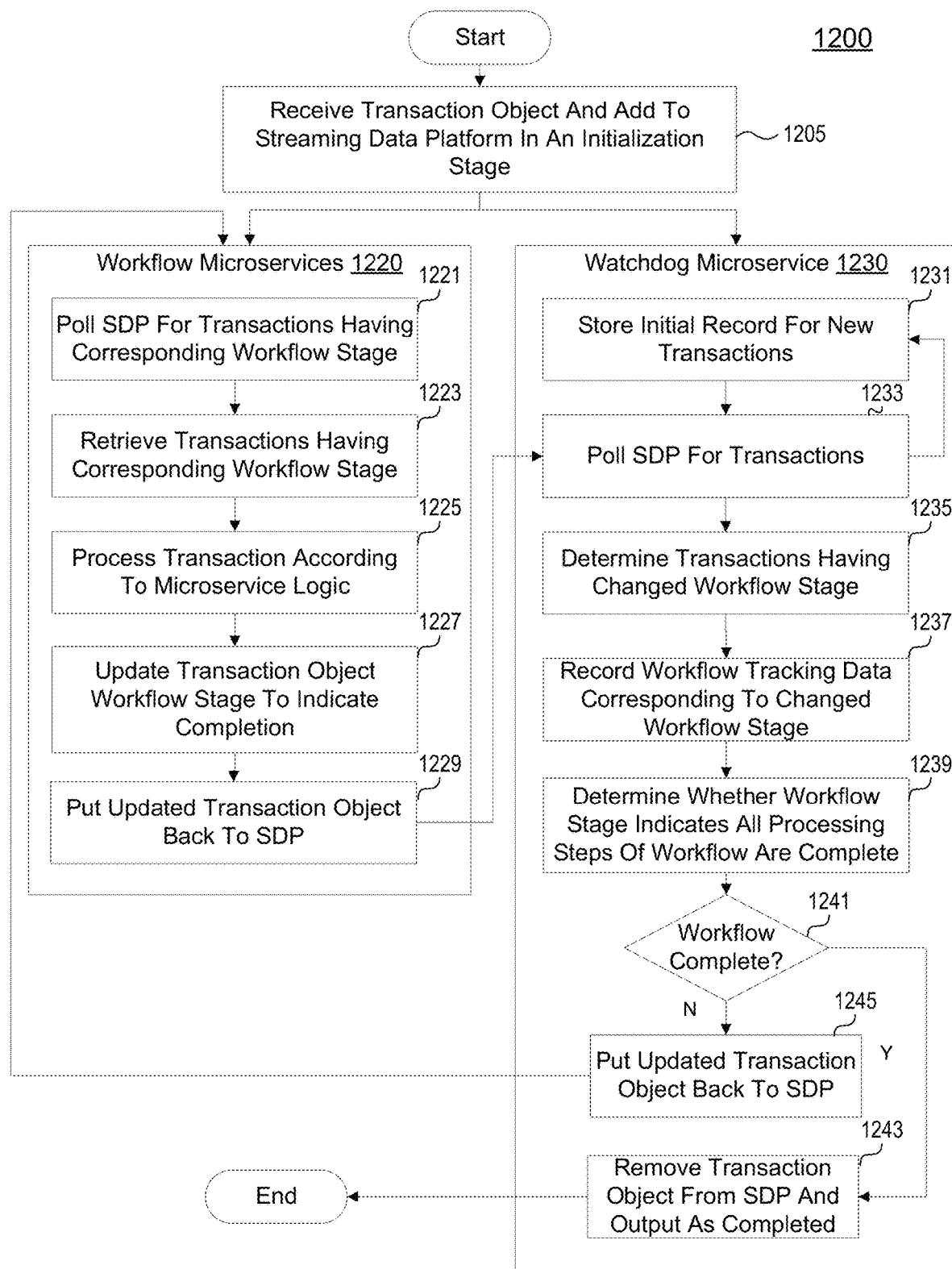

FIG. 12 depicts a flowchart illustrating an example method 1200 to track workflow progress and determine if a transaction has completed the workflow on a transaction exchange platform, such as transaction exchange platform 320. Method 1200 may be performed by any suitable computing device and/or combination of computing devices, referred to as the system implementing method 1200.

At step 1205, the transaction exchange platform may receive a transaction object and add it to a SDP. The transaction object may be added to the SDP in an initialization stage.

At step 1231, watchdog microservice 1230 may store an initial record for new transaction objects on the SDP. Watchdog microservice 1230 may identify new transactions on the SDP, potentially as a result of the initialization stage, and may generate new workflow tracking records for the new transaction objects. Watchdog microservice 1230 may poll the SDP to retrieve new transactions as they are added. Additionally and/or alternatively, watchdog microservice 1230 may poll the SDP to retrieve all new transactions and determine which are new, as shown in step 1233.

Workflow microservices 1220 may process transaction objects on the SDP in the manners described above in detail. For example, illustrated steps 1221, 1223, 1225, 1227, and 1229 may correspond to steps 1021, 1023, 1025, 1027, and 1029 of FIG. 10.

At step 1233, watchdog microservice 1230 may poll the SDP for transactions and, at step 1235, determine transaction objects having a changed workflow stage. In some embodiments, watchdog microservice 1230 may poll all transactions and determine which have changes. In other embodiments, watchdog microservice 1230 may poll the SDP to request transaction that have changed.

At step 1237, watchdog microservice 1230 may record workflow tracking data corresponding to the change in the workflow stage of the transaction object. For example, watchdog microservice 1230 may update a workflow tracking record associated with the transaction object to indicate it completed a workflow stage associated with a workflow microservice 1220. The watchdog microservice 1230 may further store other metadata regarding the updated workflow stage, including a timestamp of the recorded change.

At step 1239, the watchdog microservice 1230 may determine whether the current workflow stage of the transaction object (and/or the workflow tracking data) indicate that the transaction object has met the requisite steps of the workflow associated with the transaction type of the transaction objects. For example, the watchdog microservice 1230 may assess whether the current workflow stage information of the transaction metadata indicates completion of a series of steps that satisfy the criteria of the workflow associated with a particular transaction type of the transaction object.

At step 1241, the watchdog microservice 1230 may determine that the workflow is not complete, and may proceed to step 1245 where the transaction object is put back to the SDP after recording the workflow tracking information.

If, at step 1241, the watchdog microservice 1230 determines that the workflow is complete, processing may proceed to step 1243 where the transaction object is removed from the SDP of the transaction exchange platform and output as completed. For example, the transaction object may be updated with an indication that it completed the workflow and is approved, and may be put to a public SDP 340 accessible to enterprise systems and users 350.

Additionally and/or alternatively to the workflow completion determinations described above, the watchdog microservice 980/1230 may enforce the individual steps of the workflow. The watchdog microservice may assess whether a current workflow stage indicates a valid workflow stage under the restrictions of the workflow structure. If the current workflow stage of the transaction object is not valid, the watchdog microservice may cause the transaction object to be processed by one or more appropriate microservices associated with the workflow, thereby enforcing the workflow. Working in conjunction with the snapshot microservice, the watchdog microservice may cause a transaction to repeat a step of the workflow by reverting the transaction object to an earlier state in response to detecting problems.

According to some aspects, the watchdog microservice may track metrics and/or other statistics associated with the workflows, microservices, and/or transactions. Based on the tracked workflow data, the watchdog microservice may be able to assess trends associated with a workflow, microservice, or transaction. The watchdog microservice may compare a metric and/or other statistic to threshold performance values to determine when the workflow, microservice, or transaction is subject to abnormal or undesirable performance complications. This is described further below with respect to FIG. 13.

Figure 13:
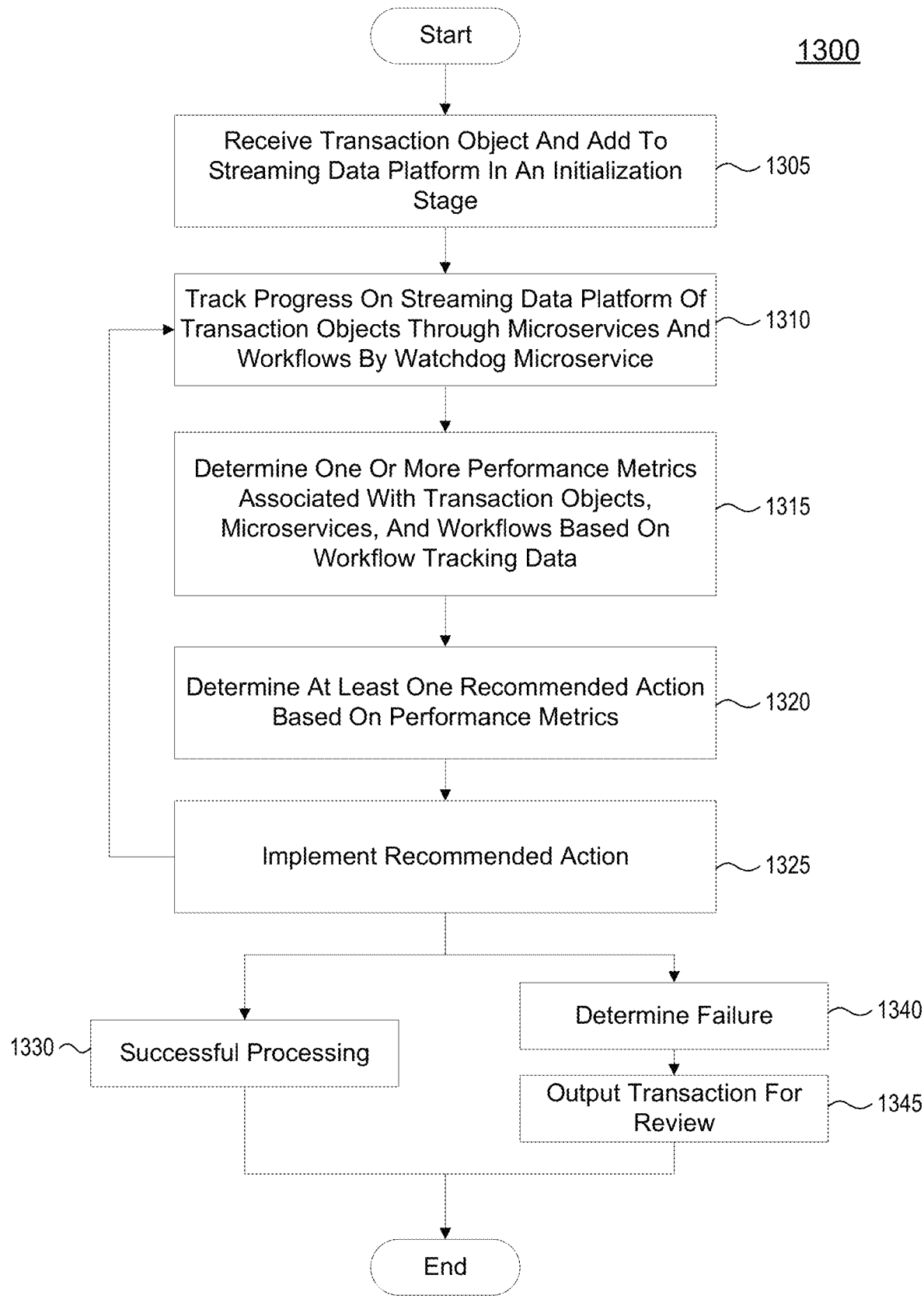

FIG. 13 depicts a flowchart illustrating an example method 1300 to track workflow progress and recommend corrective action based on performance metrics on a transaction exchange platform, such as transaction exchange platform 320. Examples of performance metrics include, for example, how long it takes a transaction to complete an associated workflow from start to finish. As will be discussed, performance metrics may be measured at any suitable level, for example per transaction, per group of transaction, within a time frame, within a sample, and the like. Method 1300 may be performed by any suitable computing device and/or combination of computing devices, referred to as the system implementing method 1300.

At step 1305, the transaction exchange platform may receive a transaction object and add it to a SDP. The transaction object may be added to the SDP in an initialization stage.

At step 1310, the watchdog microservice may track progress of transaction objects on the SDP through the microservices and workflows associated with a transaction type of the transaction object, as described above with respect to FIG. 12.

At step 1315, the watchdog microservice may determine one or more performance metrics associated with the transaction exchange platform, one or more workflows, one or more microservices, types of transactions, groups of transactions, individual transactions, and/or any suitable granularity. The watchdog microservice may record how long it takes a transaction to move through its corresponding workflow, from microservice to microservice. This time may be recorded against upper and/or lower control limits with a rolling time period. The time period may be taken into account and normalized against business cycles (for example: weekends are different than work days and certain hours of the work day look very different). Other metrics may be considered besides processing time, such as throughput (volume), error rates, approve/deny rates, paths taken in branching workflows, and/or any other suitable metric.

Metrics may be tracked at any desired level of granularity. For example, the watchdog microservice may track how long transaction take to progress through the ACH workflow, and may assess whether this is within historical performance ranges. Similarly, the watchdog microservice may track how long a particular microservice takes to process transactions over the last five minutes and determine when this rises above a warning level, which may indicate a problem with the microservice. The watchdog microservice may determine baseline performance metrics for the transaction exchange platform, workflows, microservices, and the like. Current metrics may be compared to these baseline metrics to determine and address abnormal performance.

At step 1320, the watchdog microservice may determine at least one recommended action based on the performance metrics. Many corrective actions may be recommended by the watchdog microservice, which may flexibly adapt and learn suitable processes for responding to abnormal system conditions. A common recommended corrective action may be to command replay of an earlier workflow stage for a transaction or group of transactions. Working with the snapshot microservice, the watchdog microservice can cause a transaction object to revert to an earlier state, where the reversion to the current workflow stage of the transaction object would cause it to be processed again by an appropriate microservice. Where a particular microservice is showing performance abnormalities across a range of transactions, the watchdog microservice may determine that the particular microservice is having problems and recommend a suitable corrective action. As an example, the watchdog microservice may determine that a dynamic reconfiguration to implement alternate processing workflows, addressing the issues presented by the particular microservice, represents a suitable corrective action. The watchdog microservice may coordinate with the configuration interface to effect a reconfiguration of the workflow and the corresponding microservices, potentially temporarily. In some implementations, dynamic reconfiguration of a workflow, microservice, or transaction may be recommended and implemented once successive replays through the snapshot microservice have failed. Such reconfiguration may address patterns of failure that become apparent from repeat errors from the microservices/workflows.

The watchdog microservice may implement other corrective actions as well. For example, the watchdog microservice may utilize machine learning techniques to self-optimize the workflows based on any suitable feature, such as enhancing actions (rather than corrective action), security lockdown against intrusions, speed throughput, prioritized routing, restart, and most any other incident, administrative, or management handling. The watchdog microservice provides a useful interface and allows machine learning collector agents to be deployed on the transaction exchange platform to gather system state information for use in optimizing and managing the transaction exchange platform. Other metrics in addition to performance, security, resiliency, responsiveness, robustness, visibility, etc. may be considered by the watchdog microservice, and the flexibility and comprehensive scope of the watchdog microservices may enable powerful management of the transaction exchange platform.

At step 1325, the watchdog microservice may cause the recommended action to be implemented. For example, the watchdog microservice may command the snapshot microservice to replay a workflow stage for the transaction object.

As another example, the watchdog microservice may command the configuration interface to dynamically reconfigure one or more workflows and/or microservices based on the performance metric.

Subsequent to implementing the corrective action, the watchdog microservice may determine that successful processing is completed in step 1330. Or the watchdog microservice may determine that processing has failed in step 1340, and may output the transaction for further review (manually and/or automatically), and may generate another recommended action, at step 1345.

According to some aspects, and as discussed above, the watchdog microservice may recommend as a corrective action replay of an earlier workflow stage for a transaction or group of transactions. Working with the snapshot microservice, the watchdog microservice can cause a transaction object to revert to an earlier state, where the reversion to the current workflow stage of the transaction object would cause it to be processed again by an appropriate microservice. This is described further below with respect to FIG. 14.

Figure 14:
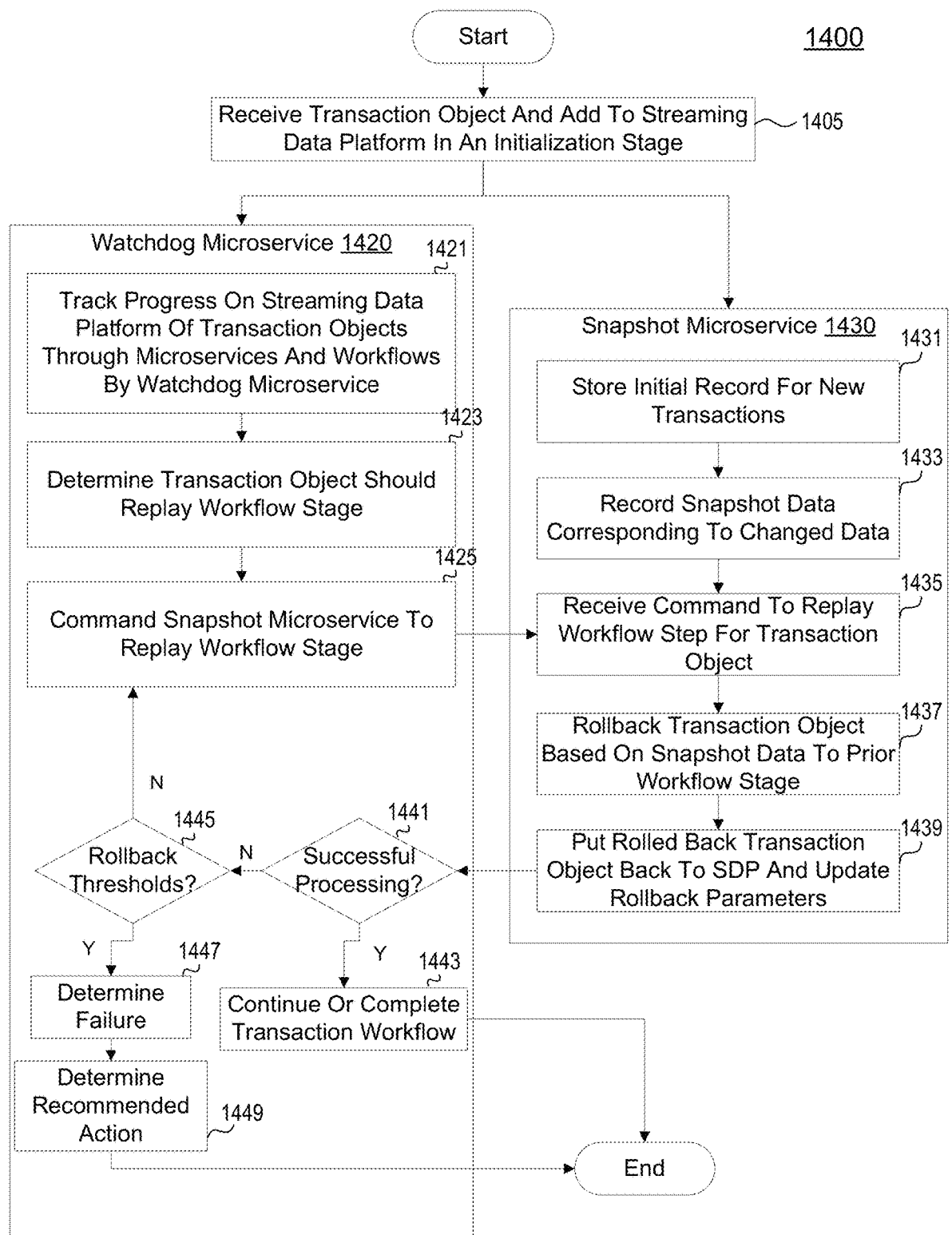

FIG. 14 depicts a flowchart illustrating an example method 1400 to track performance metrics and determine to replay a transaction on a transaction exchange platform, such as transaction exchange platform 320. Method 1400 may be performed by any suitable computing device and/or combination of computing devices, referred to as the system implementing method 1400. FIG. 14 may combine aspects of FIGS. 11 and 13, as explained further below.

At step 1405, the transaction exchange platform may receive a transaction object and add it to a SDP. The transaction object may be added to the SDP in an initialization stage. At step 1421, watchdog microservice 1420 may track program on the SDP of transaction objects through microservice and workflows, as described with respect to FIG. 12 above.

At step 1423, watchdog microservice 1420 may determine that a transaction object should replay a workflow stage. For example, as discussed above with respect to FIG. 13, the watchdog microservice may determine that a transaction object did not correctly complete the workflow step and/or that the microservice associated with the step is experiencing abnormal performance issues. At step 1425, the watchdog microservice 1420 may command snapshot microservice 1430 to replay the transaction object at the earlier workflow stage.

Snapshot microservice 1430 may store snapshot data records for transaction objects on the SDP in steps 1431 and 1433, as discussed above in FIGS. 10 and 11. At step 1435, snapshot microservice 1430 may receive the command to replay the workflow step for the transaction object from the watchdog microservice 1420. Snapshot microservice may rollback the transaction object and reinject it to the SDP at steps 1437 and 1439, in the manner described above with respect to FIG. 11.

At step 1441, watchdog microservice 1420 may determine if the replayed workflow stage was processed successfully. If it processed successful, processing may proceed to step 1443 where the transaction workflow continues.

If, at step 1441, watchdog microservice 1420 determines that processing did not complete successfully, watchdog microservice 1420 may determine whether a maximum number of rollbacks have been attempted at step 1445. The snapshot microservice 1430 and/or watchdog microservice 1420 may maintain a counter of the number of rollback/replay attempts. The number of rollback/replay attempts is less than a configurable threshold, then processing may return to step 1425 where watchdog microservice 1420 again commands snapshot microservice 1430 to replay the transaction.

If, at step 1445, watchdog microservice 1420 determines that a maximum number of replay attempts have already occurred, then watchdog microservice may determine a failure of the transaction to progress through the workflow stage at step 1447. At step 1449 the watchdog microservice 1420 may determine a further recommended action, such as triggering a dynamic reconfiguration of the work follow. This is shown further in FIG. 15.

Figure 15:
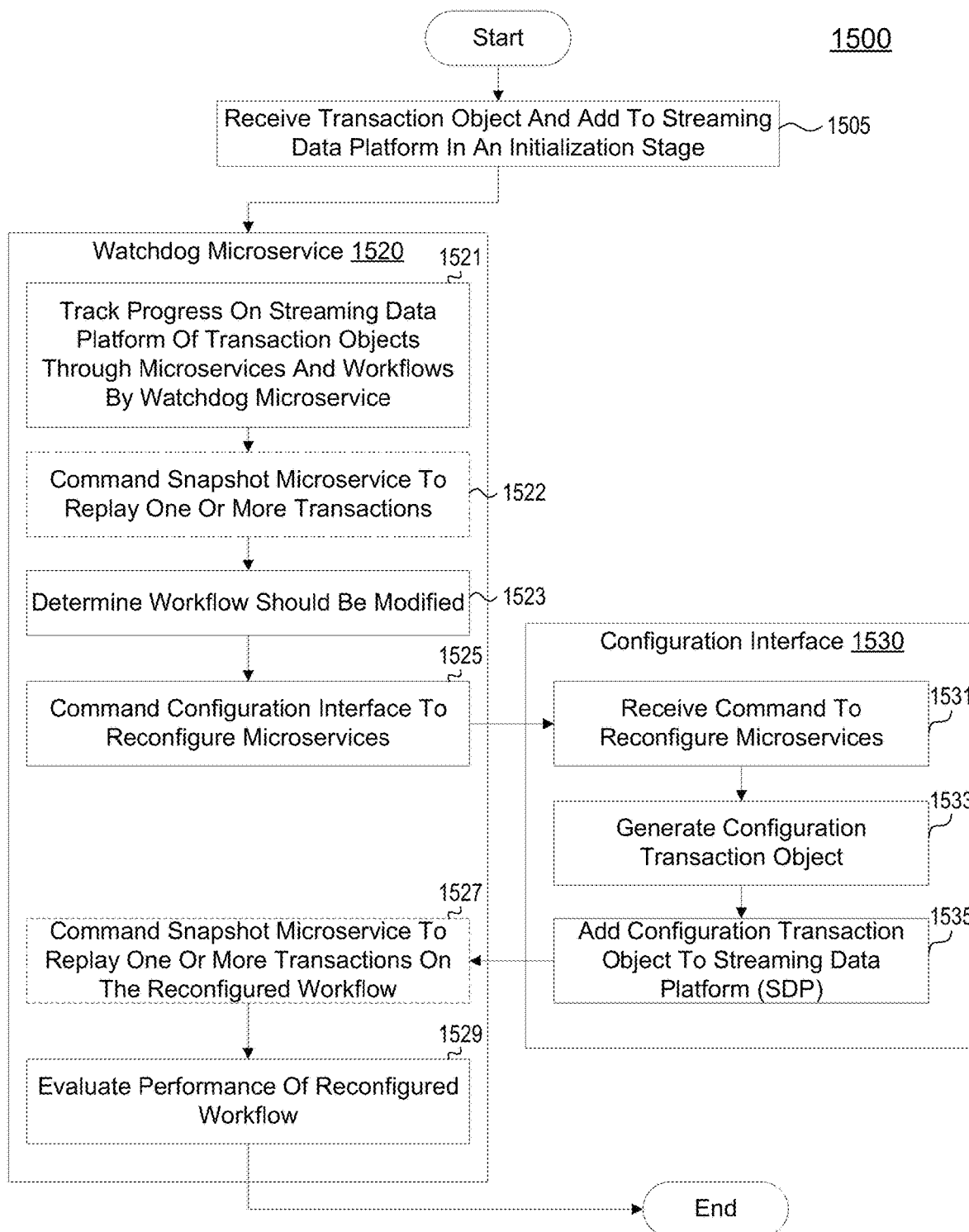

FIG. 15 depicts a flowchart illustrating an example method 1500 to track performance metrics and determine to replay a transaction on a transaction exchange platform, such as transaction exchange platform 320. Method 1500 may be performed by any suitable computing device and/or combination of computing devices, referred to as the system implementing method 1500. FIG. 15 may combine aspects of FIGS. 11-14, as explained further below.

At step 1505, the transaction exchange platform may receive a transaction object and add it to a SDP. The transaction object may be added to the SDP in an initialization stage. At step 1521, watchdog microservice 1520 may track program on the SDP of transaction objects through microservice and workflows, as described with respect to FIG. 12 above.

At step 1522, the watchdog microservice may determine that a transaction object should have a particular workflow stage replayed, and may order the snapshot microservice to replay the transaction as described in FIG. 14. Step 1522 may be optional, as watchdog microservice 1520 may determine to command dynamic reconfiguration even in the absence of a replayed transaction.

At step 1523, the watchdog microservice may determine that the transaction exchange platform, one or more workflows, one or more microservices, or any other component should be modified. As discussed further above with respect to FIG. 13, the watchdog microservice may make this determination based on tracking one or more performance metrics associated with the transaction exchange platform and/or any of its components.

At step 1525, the watchdog microservice 1520 may command the configuration interface 1530 to reconfigure one or more microservices (and/or workflows, and/or any other component of the transaction exchange platform).

At step 1531, configuration interface 1530 may receive the command to reconfigure the microservices of the workflow, and may proceed through steps 1533 and 1535 to generate a configuration transaction object that is pushed to the SDP to effect the desired reconfiguration, as described above with respect to FIG. 8.

At step 1527, the watchdog microservice 1520 may command the snapshot microservice to replay the transaction object using the reconfigured workflow, if a particular transaction and/or group of transactions were subject to erroneous and/or failed processing on the original configuration.

At step 1529, the watchdog microservice 1520 may evaluate performance of the reconfigured workflow and continue to evaluate performance metrics associated with aspects of the transaction exchange platform.

Thus, according to some aspects, a computer-implemented method may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object and updating the current workflow stage of the transaction object to a second workflow stage based on completing processing, by the first microservice, of the transaction object. In response to determining, by a watchdog microservice and via the streaming data platform, that the current workflow stage of the transaction object has changed, the method may comprise: retrieving, by the watchdog microservice and from the streaming data platform, the transaction object based on determining that the current workflow stage has changed and storing, by the watchdog microservice, workflow tracking data corresponding to the transaction object and the changed current workflow stage.

The steps may further comprise determining, by the watchdog microservice, that the stored workflow tracking data corresponding to the transaction object indicates that the transaction object completed each stage of the workflow corresponding to the transaction type and, in response to determining that the stored workflow tracking data indicates that the transaction object completed each stage of the workflow corresponding to the transaction type, removing the transaction object from the streaming data platform and outputting the transaction object and an indication that the transaction object has completed the processing corresponding to the workflow. The current workflow stage of the transaction object may comprise a data structure indicating completion status of each respective step of a plurality of processing steps associated with the workflow. The steps may further comprise, in response to the determining that the current workflow stage of the transaction object has changed, determining, by the watchdog microservice, whether the current workflow stage of the transaction object is valid based on the workflow associated with the transaction type and, in response to determining that the current workflow stage of the transaction object is not valid, causing, by the watchdog microservice, the transaction object to be processed by one or more microservices associated with the workflow. The watchdog microservice may store workflow tracking data in an in-memory database. The workflow tracking data may comprise a timestamp and an indication of the change to the current workflow stage of the transaction object. The steps may further comprise determining, by the watchdog microservice and based on the workflow tracking data, at least one performance metric associated with the first microservice. The at least one performance metric may correspond to a single transaction object. The at least one performance metric may correspond to a group of transaction objects over a period of time. The steps may further comprise determining, by the watchdog microservice, that the at least one performance metric associated with the first microservice fails to satisfy at least one threshold performance value; and performing at least one action based on determining that the at least one performance metric fails to satisfy the at least one threshold performance value. The steps may further comprise determining, by the watchdog microservice and based on the workflow tracking data, at least one performance metric associated with the workflow.

The steps may further comprise determining, by the watchdog microservice, that the at least one performance metric associated with the workflow fails to satisfy at least one threshold performance value; and performing at least one action based on determining that the at least one performance metric fails to satisfy the at least one threshold performance value. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with a first transaction object processed by the first microservice; determining that the at least one performance metric associated with the first transaction object fails to satisfy a threshold relationship to the at least one baseline metric; and generating a recommended action to be taken on the first transaction object. The recommended action may comprise causing the first transaction object to be re-processed by the first microservice. The recommended action may comprise re-routing the first transaction object to be processed by another microservice. The recommended action may comprise changing the transaction type of the first transaction object.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; in response to determining, by a watchdog microservice and via the streaming data platform, that the current workflow stage of the transaction object has changed: retrieving, by the watchdog microservice and from the streaming data platform, the transaction object based on determining that the current workflow stage has changed; and storing, by the watchdog microservice, workflow tracking data corresponding to the transaction object and the changed current workflow stage; determining, by the watchdog microservice, that the stored workflow tracking data corresponding to the transaction object indicates that the transaction object completed each stage of the workflow corresponding to the transaction type; and in response to determining that the stored workflow tracking data indicates that the transaction object completed each stage of the workflow corresponding to the transaction type, removing the transaction object from the streaming data platform and output the transaction object and an indication that the transaction object has completed the processing corresponding to the workflow. The steps may further comprise determining, by the watchdog microservice and based on the workflow tracking data, at least one performance metric associated with the first microservice. The steps may further comprise determining, by the watchdog microservice, that the at least one performance metric associated with the first microservice fails to satisfy at least one threshold performance value; and generating a recommended action based on determining that the at least one performance metric fails to satisfy the at least one threshold performance value.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; in response to determining, by a watchdog microservice and via the streaming data platform, that the current workflow stage of the transaction object has changed: retrieving, by the watchdog microservice and from the streaming data platform, the transaction object based on determining that the current workflow stage has changed; and storing, by the watchdog microservice, workflow tracking data corresponding to the transaction object and the changed current workflow stage; determining, by the watchdog microservice and based on the workflow tracking data, at least one performance metric associated with the first microservice; and generating a graphic user interface display corresponding to the first microservice and comprising the at least one performance metric.

And according to some aspects, a computer-implemented method may comprise receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on snapshot data corresponding to the transaction object captured by a snapshot microservice.

The steps may further comprise polling, by the snapshot microservice, the streaming data platform to retrieve transactions matching an initialization stage. Transactions may be added to the streaming data platform in the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; determining, by the snapshot microservice and via the streaming data platform, that at least one value associated with addenda data of the transaction object has changed after the transaction object has left the initialization stage; and storing, by the snapshot microservice, snapshot data corresponding to the changed at least one value associated with the addenda data. The snapshot microservice may cause the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on snapshot data corresponding to the transaction object from prior to the start of the processing by the first microservice; and returning the regenerated transaction object to the streaming data platform. The current workflow stage of the regenerated transaction object may be set to the first workflow stage. The steps may further comprise determining, by the watchdog microservice and based on the workflow tracking data, at least one performance metric associated with the first microservice. Determining that the processing, by the first microservice, of the transaction object did not complete successfully may be based on determining that the at least one performance metric associated with the first microservice fails to satisfy at least one performance threshold value. The at least one performance metric may correspond to a single transaction object. The at least one performance metric may correspond to a group of transaction objects over a period of time. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with a first transaction object processed by the first microservice. Determining that the processing, by the first microservice, of the transaction object did not complete successfully may be based on determining that the at least one performance metric associated with the first transaction object fails to satisfy a threshold relationship to the at least one baseline metric. The steps may further comprise determining a number of times that the transaction object has undergone processing by the first microservice; in response to determining that the number of times that the transaction object has undergone processing by the first microservice exceeds a threshold value, rejecting the transaction object as having failed processing associated with the first microservice; and determining a corrective action for the transaction object based on rejecting the transaction object. The corrective action may comprise re-routing the first transaction object to be processed by another microservice. The corrective action may comprise changing the transaction type of the transaction object. The corrective action may comprise changing the indication of the workflow corresponding to the transaction type of the transaction object.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details, addenda data, and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and polling, by a snapshot microservice, the streaming data platform to retrieve transactions matching an initialization stage. Transactions may be added to the streaming data platform in the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and processing, by a first microservice, the transaction object on the streaming data platform based on the current workflow stage matching a first workflow stage. The first workflow stage may be associated with the first microservice based on the workflow corresponding to the transaction type. The steps may further comprise determining, by the snapshot microservice and via the streaming data platform, that at least one value associated with the addenda data of the transaction object has changed after the transaction object has left the initialization stage; and storing, by the snapshot microservice, snapshot data corresponding to the changed at least one value associated with the addenda data; updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on the snapshot data corresponding to the transaction object captured by a snapshot microservice.

According to some aspects, one or more non-transitory computer readable media may comprise instructions that, when executed by at least one processor, cause a transaction exchange platform to perform steps. Those steps may comprise receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. The transaction object may be added to the streaming data platform in an initialization stage. The steps may further comprise polling, by the snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and processing, by the first microservice, the transaction object on the streaming data platform based on the current workflow stage matching a first workflow stage. The first workflow stage may be associated with the first microservice based on the workflow corresponding to the transaction type. The steps may further comprise determining, by the snapshot microservice and via the streaming data platform, that at least one value associated with addenda data of the transaction object has changed after the transaction object has left the initialization stage; storing, by the snapshot microservice, snapshot data corresponding to the changed at least one value associated with the addenda data; updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on snapshot data corresponding to the transaction object captured by a snapshot microservice by: regenerating, by the snapshot microservice, the transaction object based on snapshot data corresponding to the transaction object from prior to the start of the processing by the first microservice; and returning the regenerated transaction object to the streaming data platform. The current workflow stage of the regenerated transaction object may be set to the first workflow stage. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with the first transaction object processed by the first microservice. Determining that the processing, by the first microservice, of the transaction object did not complete successfully may be based on determining that the at least one performance metric associated with the single transaction objects fails to satisfy a threshold relationship to the at least one baseline metric.

According to some aspects, a computer-implemented method may comprise steps comprising receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and reconfiguring the first microservice or a related second microservice based on determining that the processing, by the first microservice, of the transaction object did not complete successfully. The steps may further comprise causing the first microservice to repeat processing of the transaction object based on snapshot data corresponding to the transaction object captured by a snapshot microservice; and determining that the repeat processing of the transaction object also did not complete successfully. Reconfiguring the first microservice or the related second microservice may be based on determining that the repeat processing of the transaction object failed. Reconfiguring the first microservice or a related second microservice may comprise generating a configuration transaction object that may be configured to cause reconfiguration of the first workflow by causing reconfiguration of the first microservice. The configuration transaction object may comprise transaction metadata that indicates a configuration workflow and a current workflow stage of the configuration transaction object. The steps may further comprise adding the configuration transaction object to the streaming data platform; updating the current workflow stage of the configuration transaction object to the first workflow stage; retrieving, by the first microservice and from the streaming data platform, the configuration transaction object based on the current workflow stage matching the first workflow stage; and processing, by the first microservice, the configuration transaction object to reconfigure the first microservice. Reconfiguring the first microservice or the related second microservice may cause transaction objects associated with the workflow to be dynamically re-routed. Reconfiguring the first microservice or the related second microservice may comprise reconfiguring the first microservice to modify at least one operation that the first microservice performs on transaction objects associated with the workflow. Reconfiguring the first microservice or the related second microservice may comprise reconfiguring the related second microservice to cause removal of the first microservice from the workflow. The second related microservice may be a predecessor microservice that proceeds the first microservice in the workflow. The steps may further comprise determining, by the watchdog microservice, at least one performance metric associated with the first micro service. Determining that the processing, by the first microservice, of the transaction object did not complete successfully may be based on determining that the at least one performance metric associated with the first microservice fails to satisfy at least one threshold performance value. The steps may further comprise determining, by the watchdog microservice and based on the workflow tracking data, at least one performance metric associated with the workflow. Determining that the processing, by the first microservice, of the transaction object did not complete successfully may be based on determining that the at least one performance metric associated with the workflow fails to satisfy at least one threshold performance value.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by the first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and reconfigure the first microservice based on determining that the processing, by the first microservice, of the transaction object did not complete successfully by generating a configuration transaction object that may be configured to cause reconfiguration of the first microservice and adding the configuration transaction object to the streaming data platform. The steps may further comprise causing the first microservice to repeat processing of the transaction object based on snapshot data corresponding to the transaction object captured by a snapshot microservice; and determining that the repeat processing of the transaction object also did not complete successfully. Reconfiguring the first microservice may be based on determining that the repeat processing of the transaction object failed. Reconfiguring the first microservice may cause transaction objects associated with the workflow to be dynamically re-routed. Reconfiguring the first microservice may comprise reconfiguring the first microservice to modify at least one operation that the first microservice performs on transaction objects associated with the workflow. Reconfiguring the first microservice may comprise reconfiguring a related second microservice to cause the removal of the first microservice from the workflow. The second related microservice may be a predecessor microservice that proceeds the first microservice in the workflow. The steps may further comprise determining, by the watchdog microservice, at least one performance metric associated with the first micro service. Determining that the processing, by the first microservice, of the transaction object did not complete successfully may be based on determining that the at least one performance metric associated with the first microservice fails to satisfy at least one threshold performance value. The steps may further comprise determining, by the watchdog microservice and based on the workflow tracking data, at least one performance metric associated with the workflow. Determining that the processing, by the first microservice, of the transaction object did not complete successfully may be based on determining that the at least one performance metric associated with the workflow fails to satisfy at least one threshold performance value.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; causing the first microservice to repeat processing of the transaction object based on snapshot data corresponding to the transaction object captured by a snapshot microservice; and determining that the repeat processing of the transaction object also did not complete successfully; and reconfiguring the first microservice or a related second microservice, based on determining that the repeat processing of the transaction object also did not complete successfully. Reconfiguring the first microservice may comprise generating a configuration transaction object that may be configured to cause reconfiguration of the first workflow by causing reconfiguration of the first microservice. The configuration transaction object may comprise transaction metadata that indicates a configuration workflow, and a current workflow stage of the configuration transaction object. Reconfiguring the first microservice may further comprise adding the configuration transaction object to the streaming data platform; updating the current workflow stage of the configuration transaction object to the first workflow stage; retrieving, by the first microservice and from the streaming data platform, the configuration transaction object based on the current workflow stage matching the first workflow stage; and processing, by the first microservice, the configuration transaction object to reconfigure the first microservice. Reconfiguring the first microservice or the related second microservice may cause transaction objects associated with the workflow to be dynamically re-routed.

Kharon & Mercury—Pause Microservice and Messaging Microservice

One or more aspects described herein may provide for the pausing of a workflow and/or the processing of a transaction object. As described above, a transaction object may be processed by one or more workflows and/or microservices. While the transaction object is being processed, the transaction exchange platform may determine that processing of the transaction object needs to be paused. The determination that processing of the transaction object needs to be paused may be based on a determination that processing of an entire workflow needed to be paused, for example, in response to a determination that the workflow needed to be re-configured using the techniques described above. Additionally or alternatively, the determination that processing of the transaction needs to be paused may be based on a request received from an external third-party. For example, a customer may request that the processing of a transaction be paused or cancelled. The pause microservice described herein provides techniques for pausing, or cancelling, the processing of a transaction object. Additionally or alternatively, the determination that processing of the transaction object needs to be paused may be based on a determination, by a microservice processing the transaction object, that the transaction object may be missing information or have incorrect information. In yet another example, the determination that processing of the transaction object needs to be paused may be based on a determination, by a microservice processing the transaction object, that the transaction object may be fraudulent. In these cases, a messaging microservice may send one or more electronic communications to an external platform. An application programming interface (API) may receive responses, such as the missing information or an indication that the transaction object is not associated with a fraudulent transaction. Once the response is received, processing of the transaction object may resume. By allowing the processing of transaction objects to be paused, the processing of the transaction objects may be handled more quickly and efficiently, without having to resubmit transactions or without disruptions for fraud investigations.

Figure 16A:
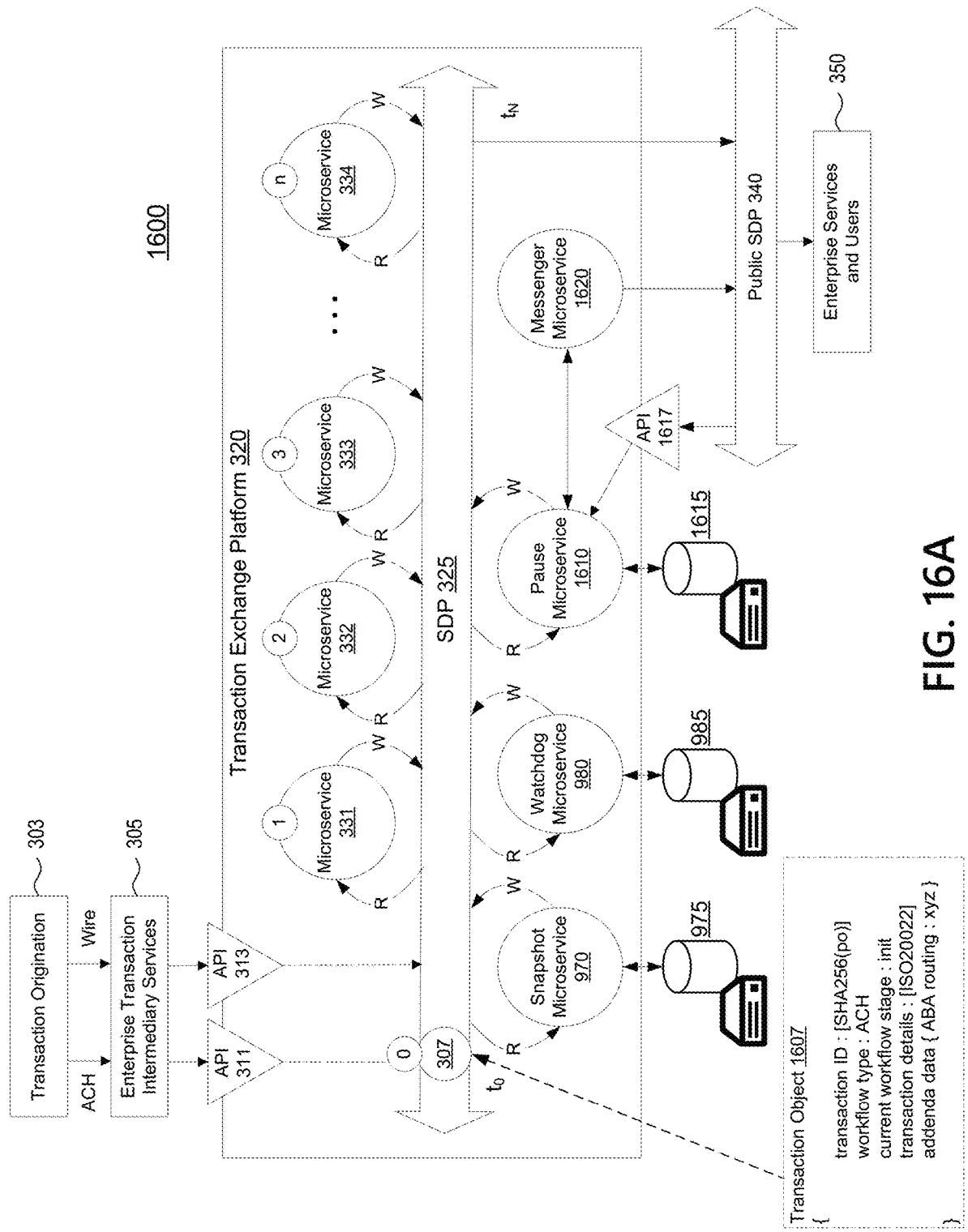
FIGS. 16A and 16B depict examples of a transaction exchange platform according to one or more aspects of the disclosure.
Figure 16B:
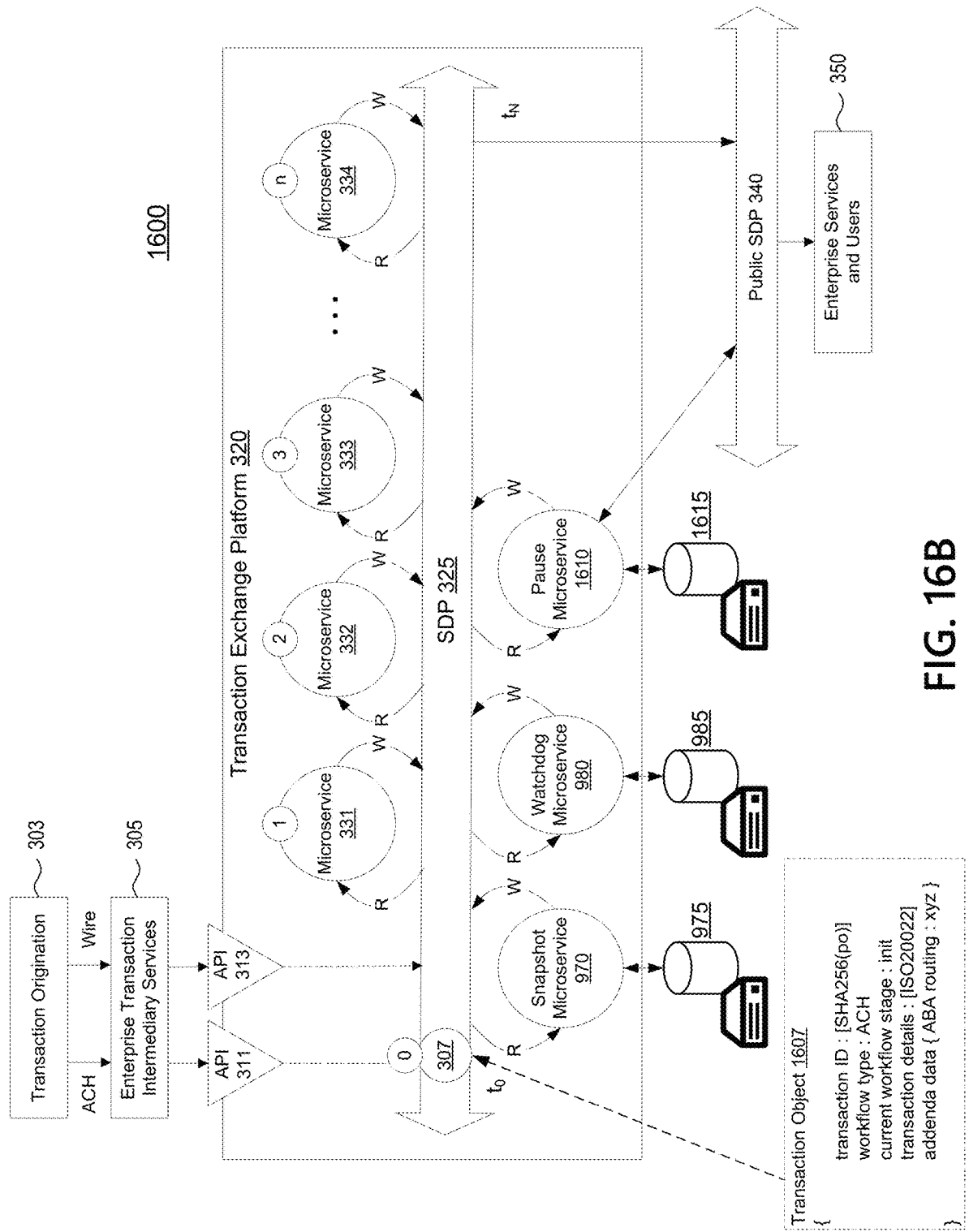

FIG. 16A and FIG. 16B illustrate a transaction processing system 1600 that may be similar to transaction processing systems 300, 600, and/or 900 of FIGS. 3A, 6, and 9, respectively. Relative to systems 300, 600, and/or 900, transaction processing system 1600 may add pause microservice 1610, an API 1617, and/or messenger microservice 1620.

Pause microservice 1610 may operate on transaction exchange platform 320 to pause transaction objects and maintain a record of paused transaction objects. The status of paused transaction objects may be stored in database 1615, which may comprise on-disk storage capable of effectively storing large volumes of data. Pause microservice 1610 and database 1615 may be configured to store state information for paused transaction objects. Additionally or alternatively, pause microservice 1610 and database 1615 may store the state of a transaction object, while details of the paused transaction object may be stored in a separate location, such as snapshot database 975. In yet another example, the state of a paused transaction object, as well as transaction metadata, may be stored in watchdog database 985, for example, in lieu of database 1615.

Pause microservice 1610 may be configured to identify and retrieve transaction objects added to SDP 325 with a pause request. Transaction objects may be added to the SDP 325 with an indication that processing of the transaction object should be paused. That is, a microservice or API may indicate that processing of the transaction object should be paused, for example, using a workflow stage included in the transaction metadata. In some examples, the microservice or API may indicate the workflow stage by appending a suffix (e.g., ".REQUESTPAUSE") to the transaction object. Pause microservice 1610 may monitor (e.g., listen to) SDP 325 for transaction objects that include the suffix. Upon recognizing the transaction objects with the suffix, pause microservice 1610 may retrieve the transaction objects from SDP 325. In an acknowledgement of the pause, pause microservice 1610 may update the current workflow stage of the transaction object. Continuing the example above, the suffix may be changed from ".REQUESTPAUSE" to ".PAUSE" to indicate (e.g., acknowledge) that the transaction object has been paused. Pause microservice 1610 may wait for an API call to resume processing of the transaction object or to terminate (e.g., stop) processing of the transaction object. When pause microservice 160 receives an API call to resume processing of the transaction object, pause microservice 160 may update the current workflow stage of the transaction object, for example, by removing the suffix. Pause microservice 160 may then return the transaction object to SDP 325 without the suffix, and processing of the transaction object may resume. When pause microservice 1610 received an API call to cancel processing of the transaction object, pause microservice 1610 may update the workflow stage of the transaction object to indicate that processing of the transaction object should be terminated (e.g., cancelled). In some examples, pause microservice 1610 may update the workflow stage of a transaction object that has been cancelled by appending another suffix (e.g., ".SNAG") to the transaction object. Transaction exchange platform 320 may monitor for transaction objects with the cancelled workflow status and remove those transaction objects from the platform.

API 1617 may provide an interface for receiving external requests and/or responses. For example, API 1617 may receive an external request from a third-party to pause or cancel the processing of a transaction object. Additionally or alternatively, API 1617 may receive responses, for example, when missing information, misinformation, or fraud alerts are generated. As will be discussed in greater detail below, messenger microservice 1620 may send electronic communications to external third-parties indicating that a transaction object is missing information, contains misinformation, and/or generated a fraud alert. Responses to those inquiries may be received by API 1617 and provided to pause microservice 1610. Pause microservice 1610 may then update the transaction object, for example, based on the information contained in the response. Pause microservice 1610 may write the information contained in the response as addenda data to the transaction object.

While pause microservice 1610 has been described as pausing individual transaction objects, it will be appreciated that pause microservice 1610 may be used to pause transactions of a certain type. For example, if a plurality of transaction objects are paused, a flag may be triggered. One or more machine learning models may be used to identify the transaction types and pause a workflow associated with the transaction type, for example, using pause microservice 1610. That is, pause microservice 1610 may place all transaction objects associated with a workflow in a paused state. The workflow may be updated using the techniques described above. After the workflow has been updated, pause microservice 1610 may remove the paused state for all the transaction objects, thereby allowing the transaction objects to resume processing. In another example, pause microservice 1610 may be used to posthumously identify transaction objects that would have been of interest and use those as input to the one or more machine learning models. In further examples, pause microservice 1610 and API 1617 may be used to query the status of the processing of a transaction object. That is, API 1617 may receive a request for the status of a transaction object. Pause microservice 1610 may receive the request and provide a response to the query via API 1617.

Messenger microservice 1620 may be configured to send requests for additional processing of a transaction object to external third-parties. In this regard, messenger microservice 1620 may monitor (e.g., listen to) SDP 325 to determine whether a paused transaction object requires additional information from a party external to the transaction exchange platform 320. In some instances, messenger microservice 1620 may monitor for a flag. Additionally or alternatively, messenger microservice 1620 may monitor the workflow status of transaction objects for paused transaction objects. Messenger microservice 1620 may then review the paused transaction objects to determine why processing of the transaction object was paused. For example, a paused transaction object may comprise an indication that the transaction object comprises insufficient information or improper information. Additionally or alternatively, a paused transaction object may comprise an indication that the transaction object generated a fraud alert.

Upon determining that the paused transaction object requires external processing, messenger microservice 1620 may send (e.g. transmit) a request for additional processing of the transaction object to the external party. The request for additional processing may comprise sending an electronic communication (e.g., email, API call, etc.) to a third-party. Additionally or alternatively, the request for additional processing may comprise writing the transaction object to a public streaming data platform, such as Public SDP 340. In some instances, messenger microservice 1620 may transform the transaction object prior to the transmitting the request for additional processing. As noted above, pause microservice 1610 may receive the response and write the additional information to the transaction object as addenda data. In some examples, messenger microservice 1620 may transform the response prior to the pause microservice 1610 writing the information to the transaction object.

While pause microservice 1610, API 1617, and messenger microservice 1620 have been described as separate entities, it will be appreciated that pause microservice 1610, API 1617, and/or messenger microservice 1620 may be implemented as a single microservice as shown, for example in FIG. 16B. that is, pause microservice 1610 may comprise the functionality of both API 1617 and messenger microservice 1620. In this regard, pause microservice 1617 may provide an interface between the transaction exchange platform 320 and public SDP 340.

FIG. 17 depicts an illustrative method 1700 for pausing processing of a transaction object according to one or more aspects of the disclosure. Method 1700 may be performed by any suitable computing device and/or combination of computing devices, referred to as the system implementing method 1700.

In step 1710, a system (e.g., a streaming data platform of a transaction exchange platform) may receive a transaction object. As noted above, the transaction object may comprise transaction details and transaction metadata. The transaction metadata may indicate a workflow corresponding to a transaction type of the transaction object. The workflow corresponding to the transaction type comprises a plurality of processing steps required to validate a given transaction of the transaction type. Additionally or alternatively, the transaction metadata may comprise a current workflow stage of the transaction object. As will be discussed in greater detail below, the transaction metadata may comprise one or more conditions that impact the processing of the transaction object.

In step 1731, microservice 1730, of a plurality of microservices executing on the system, may retrieve a plurality of transaction objects, including the transaction object received in step 1710. In step 1732, microservice 1730 may determine whether the current workflow stage of the transaction object matches a workflow stage associated with microservice 1730. Based on a determination that the current workflow stage matches the workflow stage associated with first microservice 1730, microservice 1730 may process the transaction object in step 1733. In step 1734, microservice 1730 may determine that processing of the transaction object should be paused. The determination that processing should be paused may be based on receiving a request to pause (or cancel) processing of the transaction object from an external third-party (e.g., a customer, a user, a party to the transaction, a fraud alert department, a financial institution, etc.). Additionally or alternatively, the determination that processing of the transaction object should be paused may be based on a determination that additional processing external to the streaming data platform is required to complete the processing of the transaction object. The additional processing may be based on an identification of missing information or misinformation. Additionally or alternatively, the additional processing may be based on a determination that processing of the transaction object generated a fraud alert. Accordingly, the transaction object may be reviewed to determine whether the transaction is fraudulent. In yet another example, the determination that processing of the transaction object should be paused may be based on a determination that processing of a workflow should be paused. In this regard, the workflow may be updated using the techniques described above, and transactions associated with the workflow may be paused until the workflow update is completed.

When microservice 1730 determines that processing should not be paused, method 1700 proceeds to step 1735, with the microservice 1730 determine whether processing is complete. If processing has not been completed, method 1700 returns to step 1733, with microservice 1730 continuing to process the transaction object. However, if processing has been completed, microservice 1730 may update the workflow stage of the transaction object in step 1736 and return the transaction object, with the updated workflow stage, to the SDP (e.g., SDP 325) in step 1740.

When microservice 1730 determines that processing should be paused, the method 1700 proceeds to step 1737, where microservice 1730 may update the workflow stage of the transaction object to indicate a request to pause processing of the transaction object. Microservice 1730, or an equivalent API, may update the workflow stage of the transaction object to indicate a request to pause. Additionally or alternatively, microservice 1730 may generate the request to pause by appending a suffix (e.g., ".REQUESTPAUSE") to the transaction object. After updating the workflow stage of the transaction object, microservice 1730 may add the transaction object back to the SDP (e.g., SDP 325), in step 1740.

In step 1751, pause microservice 1750 may retrieve a plurality of transaction objects from the SDP (e.g., SDP 325), similar to step 1731 described above. In step 1752, pause microservice 1750 may determine whether any of the plurality of transaction objects comprises a workflow stage indicating a request to pause. That is, pause microservice 1750 may monitor (e.g., listen to) SDP (e.g., SDP 325) for transaction objects that include a workflow stage indicating a request to pause, in step 1752. When none are found, pause microservice 1750 returns to step 1751 to monitor for transaction objects with a request to pause.

When pause microservice 1750 recognizes transaction objects with a workflow stage indicating a request to pause processing, pause microservice 1750 may update the current workflow stage of the transaction object, in step 1753. As discussed above, updating the workflow stage to a pause state may comprise updating the current workflow stage in the transaction metadata. Additionally or alternatively, updating the workflow stage to a pause state may comprise changing a suffix of the transaction object from ".REQUESTPAUSE" to ".PAUSE." These changes may indicate (e.g., acknowledge) that the transaction object has been paused. After the workflow stage has been updated to indicate the pause state of the transaction object, pause microservice 1750 may add the transaction object to the streaming data platform, for example, in step 1740. The transaction object may comprise an acknowledgement indicating that processing of the transaction object has been paused. The acknowledgement may prevent other microservices from processing the transaction object. Accordingly, the processing of a plurality of transaction objects, without a pause state, may continue by the microservices in accordance with one or more workflows of the streaming data platform, while the paused transaction object remains unprocessed.

After a transaction object has been paused, pause microservice 1750 may receive an indication to resume processing of the transaction object, in step 1754. The indication to resume processing may be received from an external third-party, for example, via an API call. For example, the indication to resume processing may be from a party to the transaction with missing, or corrected, information. Additionally or alternatively, the indication to resume processing may be from a device associated with a fraud investigation. In this example, the indication to resume processing may be based on a determination that a transaction associated with the transaction object does not constitute fraud. In yet another example, the indication to resume processing may be from another microservice, such as the watchdog microservice described above. The watchdog microservice may generate an alert after a first predetermined amount of time has elapsed since the transaction object was paused. The alert may cause an indication that the transaction object is paused to be displayed on a computing device. After a second predetermined amount of time has elapsed since the transaction object was paused, the watchdog microservice may cause processing of the transaction object to resume, e.g., in step 1754. The indication to resume processing of the transaction object may include an indication of whether to advance processing to the next workflow stage. Alternatively, the indication to resume processing of the transaction object may include an indication to re-generate the transaction object and begin processing at a specific workflow stage (e.g., the beginning, the last microservice to process the transaction object, etc.).

In response to receiving an indication to resume processing, pause microservice 1750 may update the workflow stage of the transaction object, in step 1755. The indication to resume processing may be received via an API call. Additionally, updating the workflow stage of the transaction object may cause pause microservice 1750 to remove a suffix from the transaction object. Additionally or alternatively, the pause microservice 1750 may update the workflow stage to indicate which of the plurality of microservices should process the transaction object. For example, the workflow stage may be set to the "INIT" stage, which indicates that the transaction object should be processed from the beginning of the workflow. Alternatively, the workflow stage may be set to the microservice that last processed the transaction object. That is, the workflow stage may be set such that the microservice that last processed the transaction object re-executes the transaction object. Re-execution may comprise regenerating, by the snapshot microservice described above, the transaction object, for example, based on snapshot data corresponding to the transaction object from prior to a start of the processing by the microservice and, as discussed in greater detail below with respect to FIG. 18, any additional information that may have been received. In yet another alternative, the workflow stage may be set to the next microservice in a workflow. Once the workflow stage of the transaction object has been updated to remove the paused state, pause microservice 1750 may return the transaction object to the SDP in step 1740, where the transaction object may be processed by one or more additional microservices.

At step 1760, the system (e.g., a watchdog microservice) may determine that the current workflow stage of the transaction object indicates that all requisite processing steps of the workflow have been completed. If, at step 1760, the system determines that the workflow is complete, processing may proceed to step 1770 where the transaction object is removed from the SDP of the transaction exchange platform and outputted as complete. For example, the transaction object may be updated with an indication that it completed the workflow and is approved, and may be put to a public SDP 340 that is accessible to enterprise systems and users 350. If, at step 1760, the system determines that the workflow is incomplete, processing may continue by the next microservice in the workflow. The process may continue until each step of the workflow is completed. Once processing is complete, the transaction object may be removed from the SDP of the transaction exchange platform and outputted as complete, in step 1770. Removing the transaction object from the SDP may comprise removing the transaction object from a scheduling sub-system, such as an external repository (e.g., Redis).

Although not shown in FIG. 17, pause microservice 1750 may receive an indication to cancel processing of the transaction object, instead of the indication to resume processing in step 1754. When pause microservice 1750 receives an indication (e.g., API call) to cancel processing of the transaction object, pause microservice 1750 may update the workflow status of the transaction object, in step 1755, to indicate that processing of the transaction object should be terminated (e.g., cancelled). Pause microservice 1750 may update the workflow stage of a transaction object that has been cancelled. As noted above, updating the workflow stage of a transaction object to indicate that the transaction object has been cancelled may comprise appending a suffix (e.g., ".SNAG") to the transaction object. Transaction exchange platform may monitor for transaction objects with the cancelled workflow stage and remove those transaction objects from the platform, e.g., in step 1770.

Figure 18:
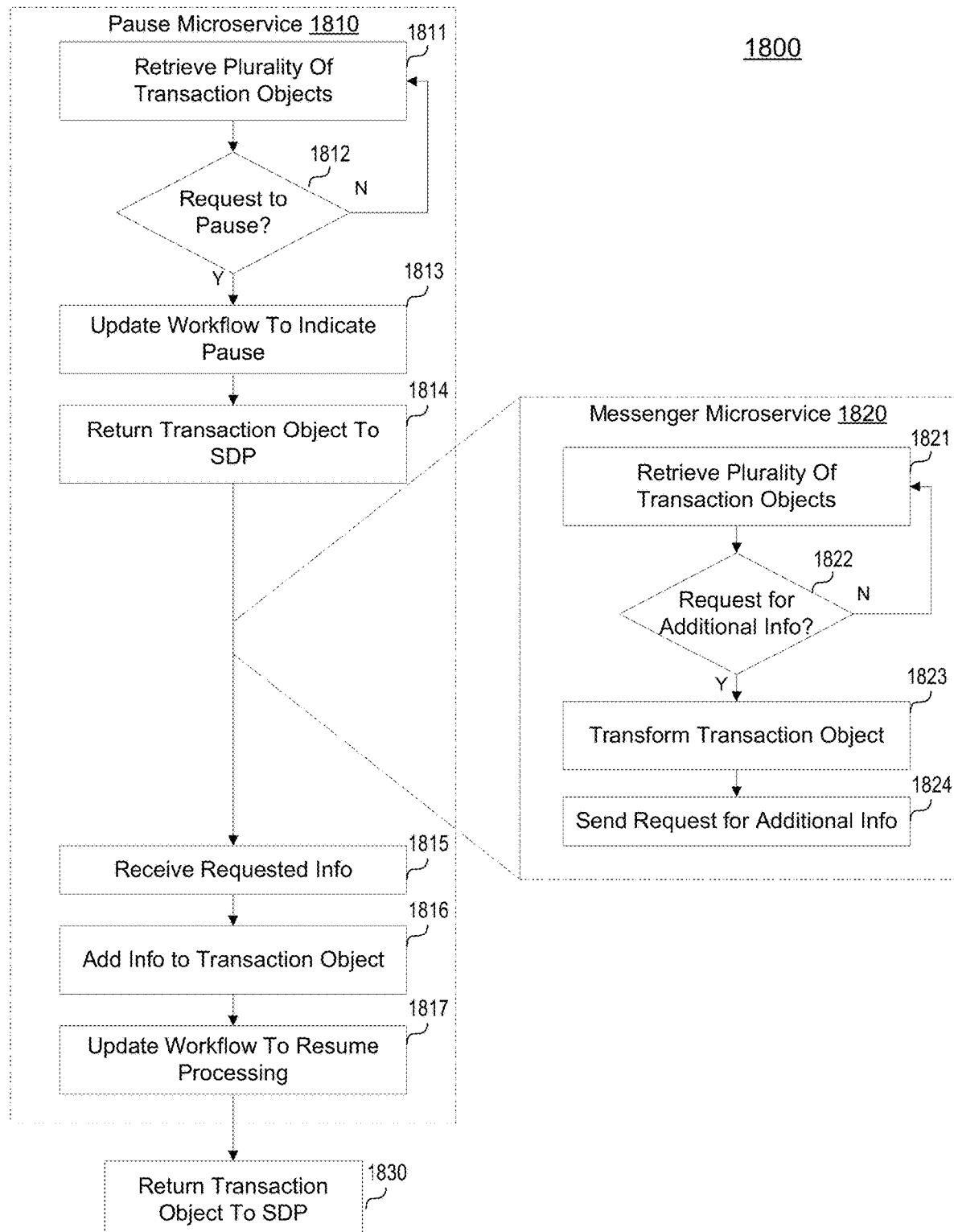
FIG. 18 depicts an illustrative method for pausing processing of a transaction object and requesting additional information for the transaction object according to one or more aspects of the disclosure.

FIG. 18 depicts an illustrative method for pausing processing of a transaction object and requesting additional information for the transaction object according to one or more aspects of the disclosure. Method 1800 may be performed by any suitable computing device and/or combination of computing devices, referred to as the system implementing method 1800.

In step 1811, pause microservice 1810 may retrieve a plurality of transaction objects from the SDP (e.g., SDP 325), similar to step 1751 described above. In step 1812, pause microservice 1810 may determine which, if any, of the plurality of transaction objects comprise a request to pause processing. If none of the plurality of transaction objects comprise a request to pause processing, pause microservice 1810 may return to step 1811 to monitor the SDP for transaction objects with a request to pause. However, when pause microservice 1810 identifies transaction objects with a workflow stage indicating a request to pause processing, pause microservice 1810 may update the current workflow stage of the transaction object in step 1813, using any of the techniques described above. In some examples, the request to pause may include an indication of why processing is being paused. For example, the indication may comprise an indication that the transaction object comprises insufficient information or improper (incorrect) information. Additionally or alternatively, the indication may be that the transaction object generates a fraud alert and requires further review from a third-party (e.g., fraud department). In step 1814, pause microservice 1810 may add the transaction object to the streaming data platform with an acknowledgement indicating processing of the transaction object has been paused. While the transaction object is paused, the processing of the other transaction objects, by a plurality of microservices, may continue in accordance with their associated workflows. Additionally or alternatively, pause microservice 1810 may add a flag, or another suitable indicator, to the paused transaction object that indicates why processing of the transaction object has been paused.

In step 1821, messenger microservice 1820 may retrieve a plurality of transaction objects from the SDP. The plurality of transaction objects may comprise the paused transaction object. In step 1822, messenger microservice 1820 may determine whether the paused transaction object requires additional information from a party external to the streaming data platform. If not, messenger microservice 1820 may continue to monitor the SDP, e.g., in step 1821. However, when messenger microservice 1820 determines that the paused transaction object requires additional information, messenger microservice 1820 may determine what information is missing and/or who to direct an inquiry to regarding the basis for pausing processing of the transaction object. As noted above, this additional information may be obtained via a flag, or some other indicator, that provides a signal to messenger microservice 1820 about the nature of the additional information that is required in order to allow processing of the paused transaction object to resume. In step 1823, messenger microservice 1820 may transform the transaction object, for example, prior to transmitting the request for additional processing to a third-party. Transforming the transaction object may comprise changing the format of the transaction object from a first format to a second format that is suitable for an external platform. For example, the transaction object may be transformed (converted) into a JSON format prior to being transmitted. In step 1824, messenger microservice 1820 may send (e.g., transmit) a request for additional processing of the transaction object to the external party. In some examples, transmitting the request for additional processing may include sending an electronic communication to the external platform. Additionally or alternatively, transmitting the request for additional processing may comprise writing the transaction object to a public streaming data platform. In some examples, the system may receive an acknowledgement from the external party that additional processing has been received and is being handled.

In step 1815, pause microservice 1810 may receive a response to the request for additional processing of the transaction object. The response may be received via an API (e.g., API 1617). The response may comprise the additional information or an indication that the transaction object is not associated with a fraudulent transaction. In some examples, the response may be transformed prior to updating the transaction object with the additional information. The transformation (e.g., conversion) may be the inverse of the transformation performed above by messenger microservice 1820. In step 1816, pause microservice 1810 may update the paused transaction object based on the response. For example, pause microservice 1810 may write additional information to the transaction object, for example, as addenda data. In step 1817, pause microservice may update the current workflow stage of the transaction object to indicate that the transaction object may resume processing. As discussed above, this indication may include restarting the workflow (e.g., setting the workflow stage to "INIT"), re-executing by the prior microservice, and/or advancing the processing to the next microservice in the workflow. The process 1800 may conclude with pause microservice 1810 returning the un-paused transaction object to SDP, e.g., SDP 325, in step 1830, so that processing according to the workflow may continue.

Figure 19:
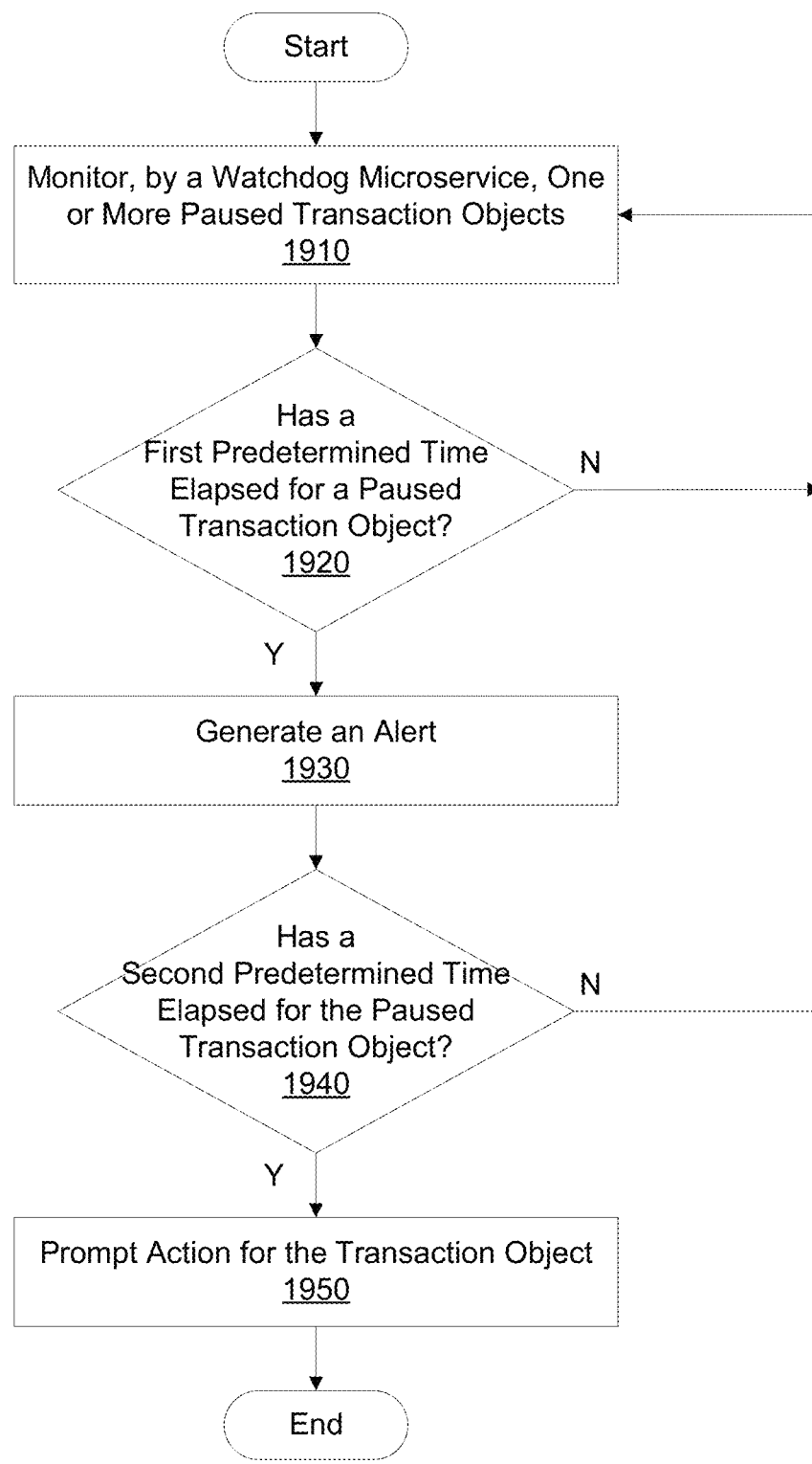
FIG. 19 depicts an illustrative method for handling stalled transaction objects according to one or more aspects of the disclosure.

Occasionally, paused transaction objects may stall. FIG. 19 depicts an illustrative method for handling stalled transaction objects according to one or more aspects of the disclosure. Method 1900 may be performed by any suitable computing device and/or combination of computing devices, referred to as the system implementing method 1900.

In step 1910, the system (e.g., a watchdog microservice) may monitor (e.g., listen to) the SDP. The system may retrieve a plurality of transaction objects from the SDP. In particular, the system (e.g., the watchdog microservice) may retrieve one or more transaction objects that include an indication that processing of the transaction object has been paused. The system (e.g., the watchdog microservice) may store information related to the transaction object, such as when the transaction object was initially paused, the steps taken to remediate the transaction object, etc. This information may be stored in a database, such as the watchdog database 985. In response to retrieving one or more paused transaction objects from the SDP, the system may determine whether a first predetermined amount of time has elapsed since the transaction object was initially paused, in step 1920. If the first predetermined amount of time has not elapsed, the system (e.g., the watchdog microservice) may return to step 1910 to monitor the SDP.

However, when the first predetermined amount of time has elapsed, the system (e.g., the watchdog microservice) may generate an alert indicating that the transaction object remains paused. The alert may be displayed on one or more devices. Additionally or alternatively, the alert may provide one or more options for resuming processing of the paused transaction object. The one or more options may comprise a request for the missing or incorrect information, a confirmation that the transaction object is not associated with a fraudulent transaction, etc. Additionally or alternatively, the one or more options may comprise an option to re-submit the transaction object or resume processing of the transaction object.

In step 1940, the system (e.g., the watchdog microservice) may determine whether a second predetermined amount of time has elapsed since the transaction object was initially paused. If not, the system returns to step 1910 to monitor the status of paused transaction objects. However, if a second predetermined amount of time has passed since the transaction object was initially paused, method 1900 may proceed to step 1950 where the system (e.g., the watchdog microservice) prompts action for the transaction object. These actions may include removing the paused transaction object from the streaming data platform, updating the workflow stage of the transaction object to begin processing of the transaction object again, updating the workflow stage of the transaction object to advance processing of the transaction object to the next microservice in the workflow, updating the workflow stage of the transaction object to re-execute the transaction object by the microservice that last processed the transaction object, updating the workflow of the transaction object to a different workflow, etc. When the system prompts re-execution of the transaction object, the system (e.g., the snapshot microservice) may regenerate the transaction object, for example, based on snapshot data corresponding to the transaction object from prior to a start of the processing by the microservice and return the re-generated transaction object to the SDP. In some examples, the watchdog microservice may cause processing of the transaction object to change from a first workflow to a second workflow, different from the first workflow as described in U.S. application Ser. No. 17/859,081, entitled "Transaction Exchange Platform with Classification Microservice to Generate Alternative Workflows," the entirety of which is incorporated herein by reference. In this regard, the watchdog microservice, or another microservice of the transaction exchange platform, may review the transaction object to determine if the transaction process could be processed by a different workflow. When the transaction object can be processed by a different workflow, the transaction exchange platform may change the workflow of the transaction object. In some instances, the transaction exchange platform may receive user approval before changing the workflow of the transaction object. Changing the workflow of the transaction object may resolve the issues that caused the transaction to be paused, thereby improving the processing of transaction objects. Additionally or alternatively, the watchdog microservice may cause the transaction object to be processed by a troubleshooter microservice. The troubleshooter microservice may be configured to fix (address) any problems and/or issues that arise with the processing of the transaction object.

Instead of using the watchdog microservice to monitor for stalled or delayed transaction objects, the pause microservice may stop the processing of transaction objects, for example, in response to a predetermined amount of time elapsing. In this regard, the addenda data of a transaction object may include one or more parameters and/or conditions that indicate that a transaction object should be stopped. The one or more parameters may be timer conditions associated with the transaction object. The timer conditions may be used in lieu of, or in conjunction with, the watchdog microservice. For example, the one or more parameters may indicate that processing of a transaction object should be stopped if the transaction object has been paused for a predetermined amount of time. That is, if a timer associated with the transaction object expires, processing of the transaction object may be stopped. In another example, the one or more parameters may indicate that processing of a transaction object should be stopped if processing the transaction object surpasses (e.g., exceeds) a predetermined date and/or time. Based on the one or more parameters included in the addenda data, the pause microservice may stop processing of a transaction object if the one or more parameters (e.g. conditions) are met (e.g., satisfied). This may allow an administrator to verify some action associated with the transaction object, such as fraud. The pause microservice may automatically stop payment of the transaction object, for example, based on the fraud research taking too long or based on the transaction object not having been processed by a certain date and/or time.

In some instances, it may be desirable to schedule a payment or processing of a payment. In this regard, the pause microservice described herein may implement a "pause and hold" functionality. The pause microservice may be used to create a payment at some arbitrary time and have it scheduled for processing via the associated the workflow at a later date. This would allow a file of payments to be processed after banking hours and scheduled to run during banking hours, thereby allowing an administrator to verify one or more actions associated with the transactions, such as researching fraud and auto-stopping a payment. Additionally or alternatively, the pause and hold functionality may allow a user to set up recurring payments based on the pause microservice's ability to create payments at arbitrary dates and/or times. Additionally, the pause microservice may be used, for example, if too much time elapses. That is, the pause microservice may be used to remove, or otherwise restart, transactions that have stalled during processing. Additionally, an intentional delay may be introduced for the processing of a transaction to allow time for slower clearing systems to process before checking a status of the transaction. In this regard, a transaction object may include a scheduling timestamp in the addenda. Upon realizing the transaction object included a scheduling timestamp, the system may initiate the transaction object with the current workflow stage set to pause. After the time associated with the scheduling timestamp passed, the pause microservice may set the current workflow stage of the transaction object to the first microservice in a workflow (e.g., INIT). The transaction object may then be processed in accordance with the workflow. Additionally, the addenda data may be used to override the transaction exchange platform's default behavior to stop a payment, for example, if a timer expires.

Finally, the transaction object may provide a release-at-timestamp and/or release-in-duration condition in the addenda data of a transaction object to terminate transactions that are taking an inordinate amount of time.

Figure 20:
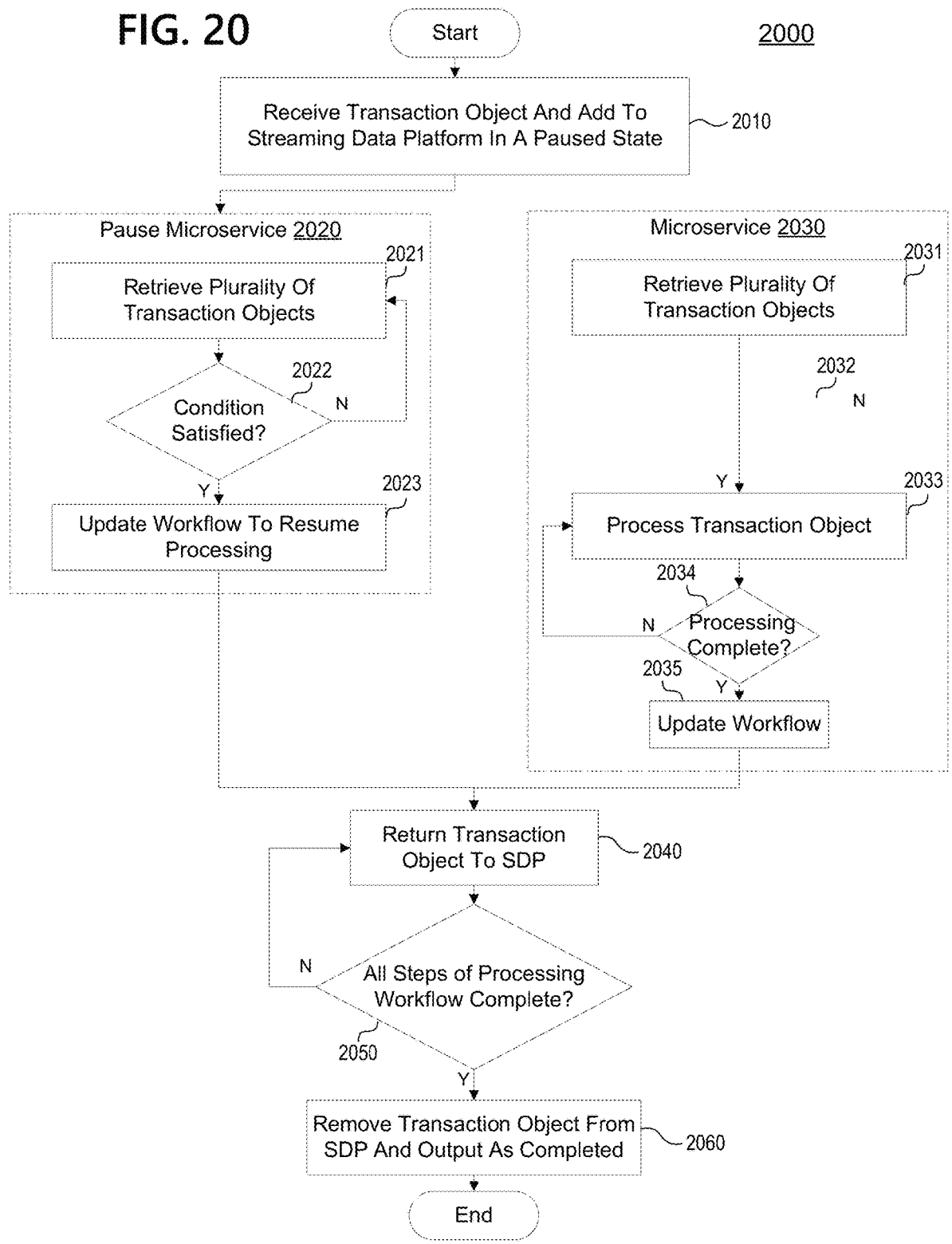
FIG. 20 depicts an illustrative method for handling embargoed transaction objects according to one or more aspects of the disclosure.

FIG. 20 depicts an illustrative method 2000 for delaying processing of a transaction object according to one or more aspects of the disclosure. Method 2000 may be performed by any suitable computing device and/or combination of computing devices, referred to as the system implementing method 2000.

In step 2010, a system (e.g., a streaming data platform of a transaction exchange platform) may receive a transaction object in a paused state. In some examples, the transaction object may be placed on the SDP with a pause request. Pause microservice 2020 may process the transaction object with the pause request using any of the techniques described above. As noted above, the transaction object may include addenda data. The addenda data may indicate that processing of the transaction object should be paused until a predetermined condition occurs. For example, addenda data may indicate that processing of the transaction object is to occur at a predetermined time. That is, the addenda data may schedule the processing of the transaction object. Additionally or alternatively, the addenda data may indicate that processing of the transaction object may not occur before a predetermined time. In these examples, the addenda data may include a scheduling timestamp indicating when processing of the transaction object may occur. In further examples, the addenda data may indicate that the transaction object is associated with a recurring payment and that processing of the transaction object should occur at predetermined intervals (e.g., weekly, monthly, yearly, etc.).

In step 2021, pause microservice 2020 may retrieve a plurality of transaction objects from the SDP (e.g., SDP 325). In step 2022, pause microservice 2020 may determine whether a condition associated with the paused transaction objects has occurred. As noted above, the condition may comprise whether the predetermined date and/or time has passed (elapsed) such that a scheduled transaction object may be processed. If the condition has not occurred, pause microservice 2020 may continue to monitor one or more paused transaction objections to determine whether a condition has occurred that would indicate that one or more paused transaction objects may be processed.

When the condition has occurred, pause microservice 2020 may update the workflow stage of the transaction object to resume processing of the transaction object. As noted above, this may be in response to a predetermined date and/or time elapsing or some other suitable condition occurring. The workflow stage may be set to "INIT" or any other suitable workflow stage. The workflow stage may be updated using any of the techniques described above. After the workflow stage has been updated to indicate an un-paused state, pause microservice 2020 may add the transaction object to the SDP, for example, in step 2040. The transaction object may be then be processed by one or more microservices, in accordance with one or more workflows. For example, microservice 2030 may retrieve a plurality of transaction objects, in step 2031. In step 2032, microservice 2030 may determine whether the current workflow stage of the transaction object matches a workflow stage associated with microservice 2030. Based on a determination that the current workflow stage matches the workflow stage associated with microservice 2030, microservice 2030 may process the transaction object in step 2033. In step 2034, the microservice 2030 may determine whether processing of the transaction object has been completed. If processing has not been completed, method 2000 returns to step 2033, with microservice 2030 continuing to process the transaction object. However, if processing has been completed, microservice 2030 may update the workflow stage of the transaction object in step 2035 and return the transaction object, with the updated workflow stage, to the SDP (e.g., SDP 325) in step 2040. At step 2050, the system (e.g., a watchdog microservice) may determine that the current workflow stage of the transaction object indicates that all requisite processing steps of the workflow have been completed. If, at step 2050, the system determines that the workflow is complete, processing may proceed to step 2060 where the transaction object is removed from the SDP of the transaction exchange platform and outputted as complete. Removing the transaction object from the SDP may comprise removing the transaction object from a scheduling sub-system, such as an external repository (e.g., Redis). If, at step 2050, the system determines that the workflow is incomplete, processing may continue by the next microservice in the workflow. The process may continue until each step of the workflow is completed. Once processing is complete, the transaction object may be removed from the SDP of the transaction exchange platform and outputted as complete, in step 2060. As noted above, removing the transaction object from the SDP of the transaction exchange platform may comprise removing the transaction object from a scheduling sub-system (e.g., Redis).

By including conditions on when transaction objects may be processed, the payment system allows for payments to be created at any time and be scheduled for processing at a later date. This may allow a file of payments to be processed after banking hours and scheduled to be run (e.g., processed) during normal banking hours. Furthermore, the pausing of transaction objects allows an intentional delay to be introduced to allow for slower clearing systems to clear transaction objects before processing additional transaction objects or checking the status of the slower workflows.

Figure 21:
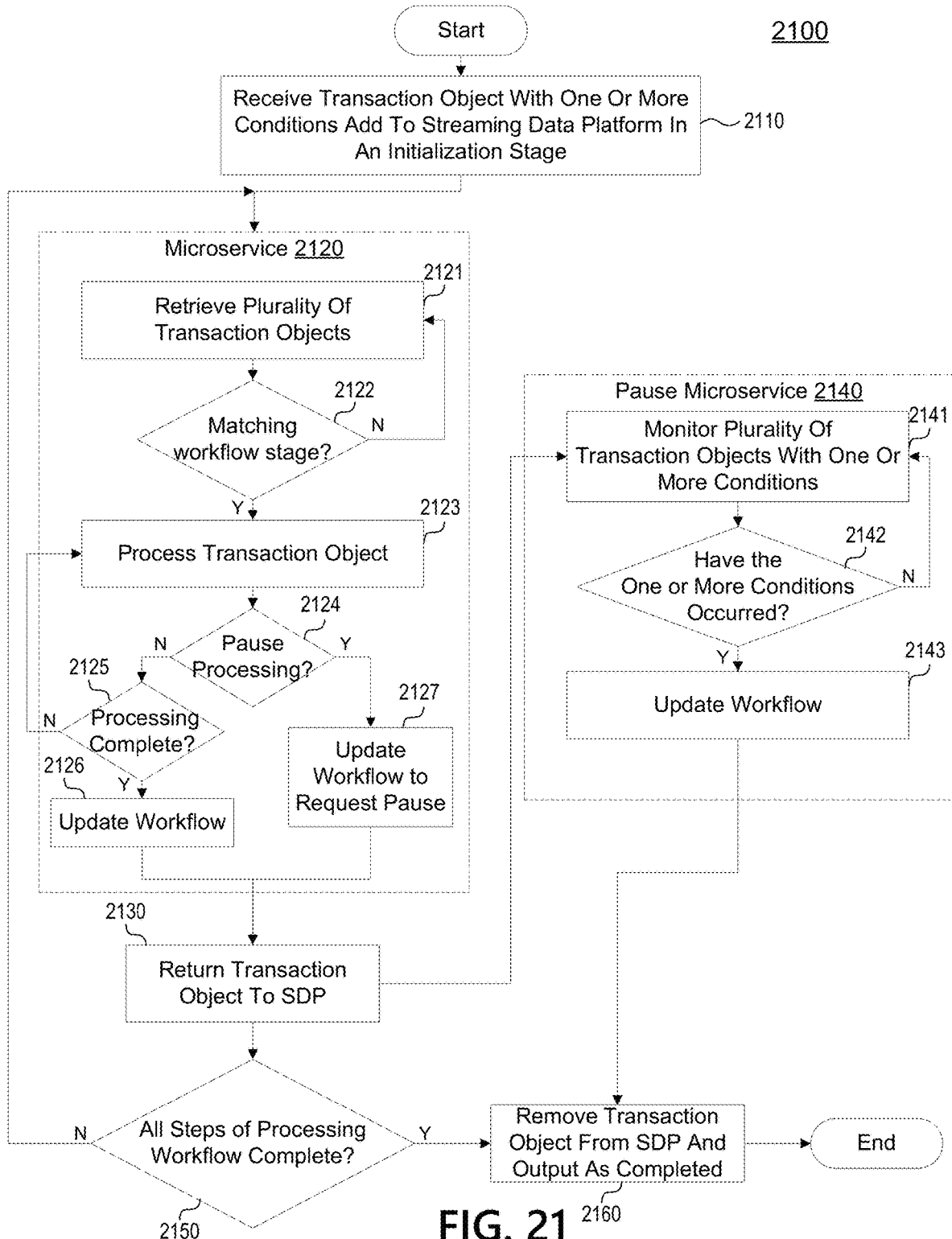
FIG. 21 depicts an illustrative method for managing transaction objects when one or more conditions occur during processing of the transaction object according to one or more aspects of the disclosure.

Additionally, conditions may be used to ensure that transaction objects are processed in a timely manner. For example, the conditions may include a timer. If the timer expires before a transaction object has finished processing, a microservice, such as the pause microservice, may terminate processing of the transaction object. FIG. 21 shows an example of a method 2100 for managing transaction objects when one or more conditions occur during processing of the transaction object in accordance with one or more aspects of the disclosure. Method 2100 may be performed by any suitable computing device and/or combination of computing devices, referred to as the system implementing method 2100.

In step 2110, a system (e.g., a streaming data platform of a transaction exchange platform) may receive a transaction object. As noted above, the transaction object may comprise transaction details and transaction metadata. The transaction metadata may include one or more conditions for the transaction object. For example, the one or more conditions may include at least one of a start time for the transaction object, an end time for the transaction object, a timer, and the like. The start time for the transaction object may indicate a time after which processing of the transaction object may begin. The end time may indicate a time by which processing of the transaction object must be completed. If processing of the transaction object does not complete by the end time, processing of the transaction object may be terminated, for example, using the pause microservice. The timer may indicate a length of time that processing of the transaction object is allowed to occur. If the timer expires, processing of the transaction object may be terminated, for example, using the pause microservice.

In step 2121, microservice 2120, of a plurality of microservices executing on the system, may retrieve a plurality of transaction objects, including the transaction object received in step 2110. In step 2122, microservice 2120 may determine whether the current workflow stage of the transaction object matches a workflow stage associated with microservice 2120. Based on a determination that the current workflow stage matches the workflow stage associated with microservice 2120, microservice 2120 may process the transaction object in step 2123. In step 2124, microservice 2120 may determine whether processing of the transaction object should be paused (or cancelled). When microservice 2120 determines that processing should be paused (or cancelled), the method 2100 may proceed to step 2127, where microservice 2120 may update the workflow stage of the transaction object to indicate a request to pause processing of the transaction object. Microservice 2120, or an equivalent API, may update the workflow stage of the transaction object to indicate a request to pause. Additionally or alternatively, microservice 2120 may generate the request to pause using any of the techniques described above. After updating the workflow stage of the transaction object, microservice 2120 may add the transaction object back to the SDP (e.g., SDP 325), where the transaction object will be placed in a pause state using the techniques described above with respect to FIG. 17.

Alternatively, when microservice 2120 determines that processing should not be paused, method 2100 may proceed to step 2125, with the microservice 2120 determining whether processing is complete. If processing has not been completed, method 2100 returns to step 2123, with microservice 2120 continuing to process the transaction object. However, if processing has been completed, microservice 2120 may update the workflow stage of the transaction object in step 21266 and return the transaction object, with the updated workflow stage, to the SDP (e.g., SDP 325) in step 2130. At step 2150, the system (e.g., a watchdog microservice) may determine that the current workflow stage of the transaction object indicates that all requisite processing steps of the workflow have been completed. If, at step 2150, the system determines that the workflow is complete, processing may proceed to step 2160 where the transaction object is removed from the SDP of the transaction exchange platform and outputted as complete. Conversely, if, at step 2150, the system determines that the workflow is incomplete, processing may continue by the next microservice in the workflow. The process may continue until each step of the workflow is completed. Once processing is complete, the transaction object may be removed from the SDP of the transaction exchange platform and outputted as complete, in step 2160.

In some instances, pause microservice 2140 may monitor a plurality of transactions to determine if one or more conditions associated with a transaction object have occurred. In step 2141, pause microservice 2141 may monitor a plurality of transaction objects on the SDP (e.g., SDP 325) and, specifically, those transaction objects that include one or more conditions. Pause microservice 2140 may store transaction objects and their associated conditions, for example, in a table, database, or a similar storage mechanism. In step 2142, pause microservice 2140 may determine whether one or more conditions have occurred. As noted above, the one or more conditions may comprise at least one of an end time or a timer. Accordingly, pause microservice

2140 may determine whether processing of the transaction object has completed by the end time or whether the timer has expired. If the one or more conditions have not yet been met, then the process may return to step 2141 with the pause microservice 2140 continuing to monitor transaction objects and, especially, those with one or more conditions associated therewith.

If pause microservice 2140 determines that one or more conditions have been met (e.g., satisfied), pause microservice 2143 may update the workflow of the transaction object. In some instances, the workflow of the transaction object may be updated to indicate that processing of the transaction object should be terminated (e.g., cancelled), for example, if the end time has passed (e.g., elapsed) or the timer has expired. Pause microservice 2140 may update the workflow stage of a transaction object using any of the techniques described above. For example, the workflow stage of the transaction object may be updated to indicate that processing of the transaction object should be terminated. This indication may be performed by appending a suffix (e.g., ".SNAG") to the transaction object. Transaction exchange platform may monitor for transaction objects with the cancelled workflow stage and remove those transaction objects from the platform, e.g., in step 2160.

Thus, according to some embodiments, a computer-implemented method may receive a transaction object comprising transaction details and transaction metadata. In particular, a streaming data platform of a transaction exchange platform may receive the transaction object. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The computer-implemented method may further comprise retrieving, by a first microservice of a plurality of microservices, a plurality of transaction objects from the streaming data platform. The plurality of transaction objects may comprise the transaction object. The computer-implemented method may further comprise determining, by the first microservice, whether the current workflow stage of the transaction object matches a first workflow stage associated with the first microservice. Based on a determination that the current workflow stage matches the first workflow stage associated with the first microservice, the computer-implemented method may comprise processing, by the first microservice, the transaction object. The computer-implemented method may further comprise determining, by the first microservice and during the processing of the transaction object, that the processing of the transaction object should be paused. Determining that the processing of the transaction object should be paused may be based on a determination that additional processing external to the streaming data platform is required to complete the processing of the transaction object. The computer-implemented method may comprise updating, by the first microservice, the current workflow stage of the transaction object to indicate a request to pause the processing of the transaction object. The computer-implemented method may further comprise adding, by the first microservice, the transaction object to the streaming data platform with an indication of the request to pause the processing of the transaction object. The computer-implemented method may comprise retrieving, by a pause microservice, a second plurality of transaction objects from the streaming data platform. The second plurality of transaction objects may comprise the transaction object with the request to pause. The computer-implemented method may comprise adding, by the pause microservice, the transaction object to the streaming data platform with an acknowledgement indicating that processing of the transaction object has been paused. The processing of the plurality of transaction objects, by the plurality of microservices, may continue in accordance with a workflow of the streaming data platform while the transaction object is paused. The computer-implemented method may further comprise transmitting, to a party external to the streaming data platform, an indication that processing of the transaction object has been paused. The computer-implemented method may comprise receiving, from the party external, a second acknowledgement that processing of the transaction object has been paused. The computer-implemented method may further comprise generating, by a watchdog microservice and based on a predetermined amount of time after the transaction object was initially paused, an alert indicating that the transaction object remains paused.

In some instances, the computer-implemented method may comprise the pause microservice receiving an indication to resume processing of the transaction object. The pause microservice may update a workflow stage of the transaction object that causes processing of the transaction object to advance to a third microservice. Additionally or alternatively, the pause microservice may update a workflow stage of the transaction object that causes the transaction object to be re-executed by the first microservice. In some examples, the computer-implemented method may comprise regenerating, by a snapshot microservice and based on the indication to resume processing indicating re-execution, the transaction object based on snapshot data corresponding to the transaction object from prior to a start of the processing by the first microservice. The computer-implemented method may further comprise returning the regenerated transaction object to the streaming data platform. The current workflow stage of the regenerated transaction object may be set to the first workflow stage. In some examples, the indication to resume processing of the transaction object may be received from a watchdog microservice after a predetermined amount of time has elapsed.

According to some aspects, a transaction exchange platform may comprise a streaming data platform, a plurality of microservices, at least one processor, and memory. The plurality of microservices may comprise at least a first microservice, a pause microservice, a watchdog microservice, and/or a snapshot microservices. The first microservice and the pause microservice may be automatically configured to watch for transactions on the streaming data platform with workflow stages corresponding to the first microservice and/or the pause microservice. The memory may store instructions that, when executed by the at least one processor, cause the transaction exchange platform to receive the transaction object. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The instructions, when executed by the at least one processor, may further cause the platform to retrieve, by a first microservice of a plurality of microservices, a plurality of transaction objects from the streaming data platform. The plurality of transaction objects may comprise the transaction object. The instructions, when executed by the at least one processor, may further cause the platform to determine, by the first microservice, whether the current workflow stage of the transaction object matches a first workflow stage associated with the first microservice. The instructions, when executed by the at least one processor, may further cause the platform to process, by the first microservice, the transaction object, for example, based on a determination that the current workflow stage matches the first workflow stage associated with the first microservice. The instructions, when executed by the at least one processor, may further cause the platform to determine, by the first microservice and during the processing of the transaction object, that the processing of the transaction object should be paused. Determining that the processing of the transaction object should be paused may be based on a determination that additional processing external to the streaming data platform is required to complete the processing of the transaction object. The instructions, when executed by the at least one processor, may further cause the platform to update, by the first microservice, the current workflow stage of the transaction object to indicate a request to pause the processing of the transaction object. The instructions, when executed by the at least one processor, may further cause the platform to add, by the first microservice, the transaction object to the streaming data platform with an indication of the request to pause the processing of the transaction object. The instructions, when executed by the at least one processor, may further cause the platform to retrieve, by a pause microservice, a second plurality of transaction objects from the streaming data platform. The second plurality of transaction objects may comprise the transaction object with the request to pause. The instructions, when executed by the at least one processor, may further cause the platform to add, by the pause microservice, the transaction object to the streaming data platform with an acknowledgement indicating that processing of the transaction object has been paused. The processing of the plurality of transaction objects, by the plurality of microservices, may continue in accordance with a workflow of the streaming data platform while the transaction object is paused. The instructions, when executed by the at least one processor, may further cause the platform to transmit, to a party external to the streaming data platform, an indication that processing of the transaction object has been paused. The instructions, when executed by the at least one processor, may further cause the platform to receive, from the party external, a second acknowledgement that processing of the transaction object has been paused. The instructions, when executed by the at least one processor, may further cause the platform to generate, by a watchdog microservice and based on a predetermined amount of time after the transaction object was initially paused, an alert indicating that the transaction object remains paused.

According to some aspects, one or more non-transitory computer readable media may comprise instructions that, when executed by at least one processor, cause a transaction exchange platform to perform steps. Those steps may comprise receiving, by a streaming data platform, a transaction object comprising transaction details and transaction metadata, wherein the transaction metadata comprises an indication of a workflow corresponding to a transaction type of the transaction object, wherein the workflow corresponding to the transaction type comprises a plurality of processing steps required to validate a given transaction of the transaction type; and a current workflow stage of the transaction object; retrieving, by a first microservice of a plurality of microservices and from the streaming data platform, a plurality of transaction objects, wherein the plurality of transaction objects comprises the transaction object; determining, by the first microservice, whether the current workflow stage of the transaction object matches a first workflow stage associated with the first microservice; processing, by the first microservice and based on a determination that the current workflow stage matches the first workflow stage associated with the first microservice, the transaction object; determining, by the first microservice and during the processing of the transaction object, that the processing of the transaction object should be paused; updating, by the first microservice, the current workflow stage of the transaction object to indicate a request to pause the processing of the transaction object; adding, by the first microservice, the transaction object with an indication of the request to pause the processing of the transaction object to the streaming data platform; retrieving, by a pause microservice and from the streaming data platform, a second plurality of transaction objects, wherein the second plurality of transaction objects comprises the transaction object with the request to pause; and adding, by the pause microservice, the transaction object to the streaming data platform with an acknowledgement indicating that processing of the transaction object has been paused, wherein processing of the plurality of transaction objects, by the plurality of microservices, continues in accordance with a workflow of the streaming data platform.

According to other embodiments, a computer-implemented method may comprise receiving, by a streaming data platform, a transaction object comprising transaction details and transaction metadata. The transaction metadata may comprise an indication of a workflow corresponding to a transaction type of the transaction object, wherein the workflow corresponding to the transaction type comprises a plurality of processing steps required to validate a given transaction of the transaction type and a current workflow stage of the transaction object. The computer-implemented method may further comprise adding the transaction object to the streaming data platform. The computer-implemented method may comprise receiving, by a pause microservice and from a third party external to the streaming data platform, a request to pause processing of the transaction object. The computer-implemented method may comprise retrieving, by the pause microservice and from the streaming data platform, a plurality of transaction objects. The plurality of transaction objects may comprise the transaction object. The computer-implemented method may comprise changing, by the pause microservice, the current workflow stage of the transaction object to indicate a pause in the processing of the transaction object. The computer-implemented method may comprise adding, by the pause microservice, the transaction object to the streaming data platform with an indication that processing of the transaction object has been paused. The processing of the plurality of transaction objects, by a plurality of microservices, may continue in accordance with a workflow of the streaming data platform while the processing of the transaction object is paused. The computer-implemented method may comprise generating, by a watchdog microservice and based on a predetermined amount of time after the transaction object was initially paused, an alert indicating that the transaction object remains paused. The computer-implemented method may comprise receiving, by the pause microservice, an indication to resume processing of the transaction object. The pause microservice may update a workflow stage of the transaction object that causes processing of the transaction object to advance to a next microservice in the workflow. Additionally or alternatively, the pause microservice may update a workflow stage of the transaction object that causes the transaction object to be re-executed by an earlier microservice. The computer-implemented method may comprise regenerating, by a snapshot microservice and based on the indication to resume processing indicating re-execution, the transaction object based on snapshot data corresponding to the transaction object from prior to a start of the processing by the earlier microservice. The computer-implemented method may comprise returning the regenerated transaction object to the streaming data platform. A current workflow stage of the regenerated transaction object may be set to an earlier workflow stage. The indication to resume processing of the transaction object may be received from a watchdog microservice after a predetermined amount of time has elapsed. The computer-implemented method may comprise determining, by a watchdog microservice, that a predetermined amount of time after the transaction object was initially paused has elapsed and removing the transaction object from the streaming data platform. The computer-implemented method may comprise receiving a request to terminate processing of the transaction object and removing the transaction object from the streaming data platform.

According to some aspects, a transaction exchange platform may comprise a streaming data platform, a plurality of microservices, at least one processor, and memory. The plurality of microservices may comprise at least a first microservice, a pause microservice, a watchdog microservice, and/or a snapshot microservices. The first microservice and the pause microservice may be automatically configured to watch for transactions on the streaming data platform with workflow stages corresponding to the first microservice and/or the pause microservice. The memory may store instructions that, when executed by the at least one processor, cause the transaction exchange platform to receive, by the streaming data platform, a transaction object comprising transaction details and transaction metadata, wherein the transaction metadata comprises an indication of a workflow corresponding to a transaction type of the transaction object, wherein the workflow corresponding to the transaction type comprises a plurality of processing steps required to validate a given transaction of the transaction type; and a current workflow stage of the transaction object. The instructions, when executed by the at least one processor, may further cause the platform to add the transaction object to the streaming data platform. The instructions, when executed by the at least one processor, may further cause the platform to receive, by a pause microservice and from a third party external to the streaming data platform, a request to pause processing of the transaction object. The instructions, when executed by the at least one processor, may further cause the platform to retrieve, by the pause microservice and from the streaming data platform, a plurality of transaction objects, wherein the plurality of transaction objects comprises the transaction object; changing, by the pause microservice, the current workflow stage of the transaction object to indicate a pause in the processing of the transaction object. The instructions, when executed by the at least one processor, may further cause the platform to add, by the pause microservice, the transaction object to the streaming data platform with an indication that processing of the transaction object has been paused, wherein processing of the plurality of transaction objects, by a plurality of microservices, continues in accordance with a workflow of the streaming data platform. The instructions, when executed by the at least one processor, may further cause the platform to generate, by a watchdog microservice and based on a predetermined amount of time after the transaction object was initially paused, an alert indicating that the transaction object remains paused. The instructions, when executed by the at least one processor, may further cause the platform to receive, by the pause microservice, an indication to resume processing of the transaction object. The instructions, when executed by the at least one processor, may further cause the platform to regenerate, by a snapshot microservice and based on the indication to resume processing indicating re-execution, the transaction object based on snapshot data corresponding to the transaction object from prior to a start of the processing by the earlier microservice, and return the regenerated transaction object to the streaming data platform, wherein a current workflow stage of the regenerated transaction object is set to the earlier workflow stage. The instructions, when executed by the at least one processor, may further cause the platform to determine, by a watchdog microservice, that a predetermined amount of time after the transaction object was initially paused has elapsed and remove the transaction object from the streaming data platform. The instructions, when executed by the at least one processor, may further cause the platform to receive a request to terminate processing of the transaction object and remove the transaction object from the streaming data platform.

According to some aspects, one or more non-transitory computer readable media may comprise instructions that, when executed by at least one processor, cause a transaction exchange platform to perform steps. Those steps may comprise receiving, by a streaming data platform, a transaction object comprising transaction details and transaction metadata, wherein the transaction metadata comprises an indication of a workflow corresponding to a transaction type of the transaction object, wherein the workflow corresponding to the transaction type comprises a plurality of processing steps required to validate a given transaction of the transaction type; and a current workflow stage of the transaction object; adding the transaction object to the streaming data platform; receiving, by a pause microservice and from a third party external to the streaming data platform, a request to pause processing of the transaction object; retrieving, by the pause microservice and from the streaming data platform, a plurality of transaction objects, wherein the plurality of transaction objects comprises the transaction object; changing, by the pause microservice, the current workflow stage of the transaction object to indicate a pause in the processing of the transaction object; and adding, by the pause microservice, the transaction object to the streaming data platform with an indication that processing of the transaction object has been paused, wherein processing of the plurality of transaction objects, by a plurality of microservices, continues in accordance with a workflow of the streaming data platform. The steps may also comprise generating, by a watchdog microservice and based on a predetermined amount of time after the transaction object was initially paused, an alert indicating that the transaction object remains paused. The steps may comprise receiving, by the pause microservice, an indication to resume processing of the transaction object. The steps may comprise regenerating, by a snapshot microservice and based on the indication to resume processing indicating re-execution, the transaction object based on snapshot data corresponding to the transaction object from prior to a start of the processing by the earlier microservice, and returning the regenerated transaction object to the streaming data platform, wherein a current workflow stage of the regenerated transaction object is set to the earlier workflow stage. The steps may comprise determining, by a watchdog microservice, that a predetermined amount of time after the transaction object was initially paused has elapsed and removing the transaction object from the streaming data platform. The steps may comprise receiving a request to terminate processing of the transaction object and removing the transaction object from the streaming data platform.

Thus, according to some embodiments, a computer-implemented method may comprise receiving, by a streaming data platform of a transaction exchange platform, a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The computer-implemented method may comprise determining, by the first microservice during processing of the transaction object, that the processing of the transaction object should be paused, for example, in response to retrieving a plurality of transaction objects from the streaming data platform and based on a determination that the current workflow stage of the transaction object matches a first workflow stage associated with a first microservice. The computer-implemented method may comprise updating, by the first microservice, the current workflow stage of the transaction object to indicate a request to pause the processing of the transaction object. The computer-implemented method may further comprise adding, by the first microservice, the transaction object with an indication of the request to pause the processing of the transaction object to the streaming data platform. The computer-implemented method may comprise retrieving, by a pause microservice and from the streaming data platform, a second plurality of transaction objects. The second plurality of transaction objects may comprise the transaction object with the request to pause. The computer-implemented method may comprise adding, by the pause microservice, the transaction object to the streaming data platform with an acknowledgement indicating that processing of the transaction object has been paused. Processing of the plurality of transaction objects, by the plurality of microservices, may continue in accordance with a workflow of the streaming data platform while process of the transaction object is paused. The computer-implemented method may comprise retrieving, by a messenger microservice, a third plurality of transaction objects. The third plurality of transaction objects may comprise the paused transaction object. The computer-implemented method may comprise determining, by the messenger microservice, that the paused transaction object requires additional information from a party external to the streaming data platform. The computer-implemented method may comprise transmitting, by the messenger microservice and based on a determination that the transaction object requires additional information, a request for additional processing of the transaction object to the party external to the streaming data platform. The computer-implemented method may comprise receiving, by the pause microservice from the party external to the streaming data platform via an application programming interface, a response to the request for additional processing of the transaction object, wherein the response comprises the additional information. The computer-implemented method may comprise updating, by the pause microservice, the paused transaction object based on the response. The computer-implemented method may further comprise updating, by the pause microservice, the current workflow stage of the transaction object to indicate that the transaction object is to be processed by a second microservice. The computer-implemented method may comprise processing, by the second microservice and based on a determination that the current workflow stage matches a second workflow stage associated with the second microservice, the transaction object, for example, in response to retrieving a plurality of transaction objects from the streaming data platform. The computer-implemented method may comprise updating, by the second microservice, the current workflow stage of the transaction object to indicate that the second microservice has completed processing of the transaction object. The computer-implemented method may comprise adding, by the second microservice, the transaction object to the streaming data platform. The computer-implemented method may comprise determining that the current workflow stage of the transaction object indicates that the transaction object has completed processing corresponding to the workflow. The computer-implemented method may comprise removing the transaction object from the streaming data platform and outputting the transaction object and an indication that the transaction object has completed the processing corresponding to the workflow to a downstream system.

In some instances, the request to pause the processing of the transaction object comprises at least one of an indication that the transaction object comprises insufficient information, an indication that the transaction object comprises improper information, or an indication that the transaction object generates a fraud alert. Further, the request for additional processing may comprise sending an electronic communication or writing the transaction object to a public streaming data platform. The computer-implemented method may comprise transforming, by the messenger microservice and prior to the transmitting the request for additional processing, the transaction object and transmitting, by the messenger microservice, the transformed transaction object with the request for additional processing. The computer-implemented method may comprise transforming the response prior to updating the transaction object. The computer-implemented method may comprise writing additional information as addenda data to the transaction object when updating the paused transaction object based on the response. The computer-implemented method may comprise regenerating, by a snapshot microservice and based on the indication to resume processing indicating re-execution, the transaction object based on snapshot data corresponding to the transaction object from prior to a start of the processing by the first microservice and information received in the response to the request for additional processing of the transaction object, and returning the regenerated transaction object to the streaming data platform. The current workflow stage of the regenerated transaction object may be set to the first workflow stage or a second workflow stage. In some examples, the pause microservice and the messenger microservice are a single microservice.

According to some aspects, a transaction exchange platform may comprise a streaming data platform, a plurality of microservices, at least one processor, and memory. The plurality of microservices may comprise at least a first microservice, a pause microservice, a watchdog microservice, and/or a snapshot microservices. The first microservice and the pause microservice may be automatically configured to watch for transactions on the streaming data platform with workflow stages corresponding to the first microservice and/or the pause microservice. The memory may store instructions that, when executed by the at least one processor, cause the transaction exchange platform to receive, by the streaming data platform of a transaction exchange platform, a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The memory may store instructions that, when executed by the at least one processor, cause the transaction exchange platform to determine, by the first microservice during processing of the transaction object, that the processing of the transaction object should be paused, for example, in response to retrieving a plurality of transaction objects from the streaming data platform and based on a determination that the current workflow stage of the transaction object matches a first workflow stage associated with a first microservice. The memory may store instructions that, when executed by the at least one processor, cause the transaction exchange platform to update, by the first microservice, the current workflow stage of the transaction object to indicate a request to pause the processing of the transaction object. The memory may store instructions that, when executed by the at least one processor, cause the transaction exchange platform to add, by the first microservice, the transaction object with an indication of the request to pause the processing of the transaction object to the streaming data platform. The memory may store instructions that, when executed by the at least one processor, cause the transaction exchange platform to retrieve, by a pause microservice and from the streaming data platform, a second plurality of transaction objects. The second plurality of transaction objects may comprise the transaction object with the request to pause. The memory may store instructions that, when executed by the at least one processor, cause the transaction exchange platform to add, by the pause microservice, the transaction object to the streaming data platform with an acknowledgement indicating that processing of the transaction object has been paused. Processing of the plurality of transaction objects, by the plurality of microservices, may continue in accordance with a workflow of the streaming data platform while process of the transaction object is paused. The memory may store instructions that, when executed by the at least one processor, cause the transaction exchange platform to retrieve, by a messenger microservice, a third plurality of transaction objects. The third plurality of transaction objects may comprise the paused transaction object. The memory may store instructions that, when executed by the at least one processor, cause the transaction exchange platform to determine, by the messenger microservice, that the paused transaction object requires additional information from a party external to the streaming data platform. The memory may store instructions that, when executed by the at least one processor, cause the transaction exchange platform to transmit, by the messenger microservice and based on a determination that the transaction object requires additional information, a request for additional processing of the transaction object to the party external to the streaming data platform. The memory may store instructions that, when executed by the at least one processor, cause the transaction exchange platform to receive, by the pause microservice from the party external to the streaming data platform via an application programming interface, a response to the request for additional processing of the transaction object, wherein the response comprises the additional information. The memory may store instructions that, when executed by the at least one processor, cause the transaction exchange platform to update, by the pause microservice, the paused transaction object based on the response. The memory may store instructions that, when executed by the at least one processor, cause the transaction exchange platform to update, by the pause microservice, the current workflow stage of the transaction object to indicate that the transaction object is to be processed by a second microservice. T The memory may store instructions that, when executed by the at least one processor, cause the transaction exchange platform to process, by the second microservice and based on a determination that the current workflow stage matches a second workflow stage associated with the second microservice, the transaction object, for example, in response to retrieving a plurality of transaction objects from the streaming data platform. The memory may store instructions that, when executed by the at least one processor, cause the transaction exchange platform to update, by the second microservice, the current workflow stage of the transaction object to indicate that the second microservice has completed processing of the transaction object. The memory may store instructions that, when executed by the at least one processor, cause the transaction exchange platform to add, by the second microservice, the transaction object to the streaming data platform. The memory may store instructions that, when executed by the at least one processor, cause the transaction exchange platform to determine that the current workflow stage of the transaction object indicates that the transaction object has completed processing corresponding to the workflow. The memory may store instructions that, when executed by the at least one processor, cause the transaction exchange platform to remove the transaction object from the streaming data platform and outputting the transaction object and an indication that the transaction object has completed the processing corresponding to the workflow to a downstream system.

According to some aspects, one or more non-transitory computer readable media may comprise instructions that, when executed by at least one processor, cause a transaction exchange platform to perform steps. Those steps may comprise receiving, by a streaming data platform, a transaction object comprising transaction details and transaction metadata, wherein the transaction metadata comprises an indication of a workflow corresponding to a transaction type of the transaction object, wherein the workflow corresponding to the transaction type comprises a plurality of processing steps required to validate a given transaction of the transaction type; and a current workflow stage of the transaction object; in response to retrieving a plurality of transaction objects from the streaming data platform and based on a determination that the current workflow stage of the transaction object matches a first workflow stage associated with a first microservice, determining, by the first microservice during processing of the transaction object, that the processing of the transaction object should be paused; updating, by the first microservice, the current workflow stage of the transaction object to indicate a request to pause the processing of the transaction object; adding, by the first microservice, the transaction object with an indication of the request to pause the processing of the transaction object to the streaming data platform; retrieving, by a pause microservice and from the streaming data platform, a second plurality of transaction objects, wherein the second plurality of transaction objects comprises the transaction object with the request to pause; adding, by the pause microservice, the transaction object to the streaming data platform with an acknowledgement indicating that processing of the transaction object has been paused, wherein processing of the plurality of transaction objects, by the plurality of microservices, continues in accordance with a workflow of the streaming data platform;

retrieving, by a messenger microservice, a third plurality of transaction objects, wherein the third plurality of transaction objects comprises the paused transaction object; determining, by the messenger microservice, that the paused transaction object requires additional information from a party external to the streaming data platform; transmitting, by the messenger microservice and based on a determination that the transaction object requires additional information, a request for additional processing of the transaction object to the party external to the streaming data platform; receiving, by the pause microservice from the party external to the streaming data platform via an application programming interface, a response to the request for additional processing of the transaction object, wherein the response comprises the additional information; updating, by the pause microservice, the paused transaction object based on the response; updating, by the pause microservice, the current workflow stage of the transaction object to indicate that the transaction object is to be processed by a second microservice; in response to retrieving a plurality of transaction objects from the streaming data platform, processing, by the second microservice and based on a determination that the current workflow stage matches a second workflow stage associated with the second microservice, the transaction object; updating, by the second microservice, the current workflow stage of the transaction object to indicate that the second microservice has completed processing of the transaction object; adding, by the second microservice, the transaction object to the streaming data platform; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow to a downstream system.

Thus, according to some embodiments, a computer-implemented method may comprise receiving, by a streaming data platform of a transaction exchange platform, a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The computer-implemented method may comprise determining, by a first microservice during processing of the transaction object, that the processing of the transaction object should be paused, for example, in response to retrieving a plurality of transaction objects from the streaming data platform and based on a determination that the current workflow stage of the transaction object matches a first workflow stage associated with the first microservice. The computer-implemented method may comprise updating, by the first microservice, the current workflow stage of the transaction object to indicate a request to pause the processing of the transaction object. The computer-implemented method may comprise adding, by the first microservice, the transaction object with an indication of the request to pause the processing of the transaction object to the streaming data platform. The computer-implemented method may comprise retrieving, by a pause microservice and from the streaming data platform, a second plurality of transaction objects. The second plurality of transaction objects may comprise the transaction object with the request to pause. The computer-implemented method may comprise adding, by the pause microservice, the transaction object to the streaming data platform with an acknowledgement indicating that processing of the transaction object has been paused, wherein processing of the plurality of transaction objects, by the plurality of microservices, continues in accordance with a workflow of the streaming data platform. The computer-implemented method may comprise retrieving, by a watchdog microservice and from the streaming data platform, a third plurality of transaction objects, wherein the third plurality of transaction objects comprises the transaction object with an indication that processing of the transaction object has been paused. The computer-implemented method may comprise generating, by the watchdog microservice and based on determining that a predetermined amount of time after the transaction object was initially paused, an alert indicating that the transaction object remains paused. The computer-implemented method may comprise removing, by the watchdog microservice and based on a second predetermined amount of time after the transaction object was initially paused, the transaction object from the streaming data platform. The computer-implemented method may comprise updating, by the watchdog microservice and based on a second predetermined amount of time after the transaction object was initially paused, the current workflow stage of the transaction object. The current workflow stage of the transaction object may cause processing of the transaction object to advance to a second microservice or re-execution by the first microservice. The computer-implemented method may comprise regenerating, by a snapshot microservice and based on the current workflow stage of the transaction object indicating re-execution by the first microservice, the transaction object based on snapshot data corresponding to the transaction object from prior to a start of the processing by the first microservice, and returning the regenerated transaction object to the streaming data platform. The computer-implemented method may comprise determining that the current workflow stage of the transaction object indicates that the transaction object has completed processing corresponding to the workflow, and removing the transaction object from the streaming data platform and outputting the transaction object and an indication that the transaction object has completed the processing corresponding to the workflow to a downstream system.

In some embodiments, the computer-implemented method may comprise retrieving, by a messenger microservice, a third plurality of transaction objects. The third plurality of transaction objects may comprise the paused transaction object. The computer-implemented method may comprise determining, by the messenger microservice, that the paused transaction object requires additional information from a party external to the streaming data platform. The computer-implemented method may comprise transmitting a request for additional processing of the transaction object to the party external to the streaming data platform. The computer-implemented method may comprise receiving, by the second microservice from the party external to the streaming data platform via an application programming interface, a response to the request for additional processing of the transaction object. The computer-implemented method may comprise updating, by the second microservice, the paused transaction object based on the response. The computer-implemented method may comprise updating, by the second microservice, the current workflow stage of the transaction object to indicate that processing of the transaction object is to resume. The computer-implemented method may comprise resuming, based on the indication to resume processing, processing of the transaction object. The computer-implemented method may comprise writing additional information as addenda data to the transaction object when updating the paused transaction object based on the response. The computer-implemented method may comprise transforming, by the messenger microservice and prior to the transmitting the request for additional processing, the transaction object and transmitting the transformed transaction object with the request for additional processing.

According to some aspects, a transaction exchange platform may comprise a streaming data platform, a plurality of microservices, at least one processor, and memory. The plurality of microservices may comprise at least a first microservice, a pause microservice, a watchdog microservice, and/or a snapshot microservices. The first microservice and the pause microservice may be automatically configured to watch for transactions on the streaming data platform with workflow stages corresponding to the first microservice and/or the pause microservice. The memory may store instructions that, when executed by the at least one processor, cause the transaction exchange platform to receive, by a streaming data platform of a transaction exchange platform, a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to validate a given transaction of the transaction type. The memory may store instructions that, when executed by the at least one processor, cause the transaction exchange platform to determine, by a first microservice during processing of the transaction object, that the processing of the transaction object should be paused, for example, in response to retrieving a plurality of transaction objects from the streaming data platform and based on a determination that the current workflow stage of the transaction object matches a first workflow stage associated with the first microservice. The memory may store instructions that, when executed by the at least one processor, cause the transaction exchange platform to update, by the first microservice, the current workflow stage of the transaction object to indicate a request to pause the processing of the transaction object. The memory may store instructions that, when executed by the at least one processor, cause the transaction exchange platform to add, by the first microservice, the transaction object with an indication of the request to pause the processing of the transaction object to the streaming data platform. The memory may store instructions that, when executed by the at least one processor, cause the transaction exchange platform to retrieve, by a pause microservice and from the streaming data platform, a second plurality of transaction objects. The second plurality of transaction objects may comprise the transaction object with the request to pause. The memory may store instructions that, when executed by the at least one processor, cause the transaction exchange platform to add, by the pause microservice, the transaction object to the streaming data platform with an acknowledgement indicating that processing of the transaction object has been paused, wherein processing of the plurality of transaction objects, by the plurality of microservices, continues in accordance with a workflow of the streaming data platform. The memory may store instructions that, when executed by the at least one processor, cause the transaction exchange platform to retrieve, by a watchdog microservice and from the streaming data platform, a third plurality of transaction objects, wherein the third plurality of transaction objects comprises the transaction object with an indication that processing of the transaction object has been paused. The memory may store instructions that, when executed by the at least one processor, cause the transaction exchange platform to generate, by the watchdog microservice and based on determining that a predetermined amount of time after the transaction object was initially paused, an alert indicating that the transaction object remains paused. The memory may store instructions that, when executed by the at least one processor, cause the transaction exchange platform to remove, by the watchdog microservice and based on a second predetermined amount of time after the transaction object was initially paused, the transaction object from the streaming data platform. The memory may store instructions that, when executed by the at least one processor, cause the transaction exchange platform to update, by the watchdog microservice and based on a second predetermined amount of time after the transaction object was initially paused, the current workflow stage of the transaction object. The current workflow stage of the transaction object may cause processing of the transaction object to advance to a second microservice or re-execution by the first microservice. The memory may store instructions that, when executed by the at least one processor, cause the transaction exchange platform to regenerate, by a snapshot microservice and based on the current workflow stage of the transaction object indicating re-execution by the first microservice, the transaction object based on snapshot data corresponding to the transaction object from prior to a start of the processing by the first microservice, and returning the regenerated transaction object to the streaming data platform. The memory may store instructions that, when executed by the at least one processor, cause the transaction exchange platform to determine that the current workflow stage of the transaction object indicates that the transaction object has completed processing corresponding to the workflow, and remove the transaction object from the streaming data platform and outputting the transaction object and an indication that the transaction object has completed the processing corresponding to the workflow to a downstream system.

According to some aspects, one or more non-transitory computer readable media may comprise instructions that, when executed by at least one processor, cause a transaction exchange platform to perform steps. Those steps may comprise receiving, by a streaming data platform, a transaction object comprising transaction details and transaction metadata, wherein the transaction metadata comprises an indication of a workflow corresponding to a transaction type of the transaction object, wherein the workflow corresponding to the transaction type comprises a plurality of processing steps required to validate a given transaction of the transaction type; and a current workflow stage of the transaction object; in response to retrieving a plurality of transaction objects from the streaming data platform and based on a determination that the current workflow stage of the transaction object matches a first workflow stage associated with a first microservice, determining, by the first microservice during processing of the transaction object, that the processing of the transaction object should be paused; updating, by the first microservice, the current workflow stage of the transaction object to indicate a request to pause the processing of the transaction object; adding, by the first microservice, the transaction object with an indication of the request to pause the processing of the transaction object to the streaming data platform; retrieving, by a pause microservice and from the streaming data platform, a second plurality of transaction objects, wherein the second plurality of transaction objects comprises the transaction object with the request to pause; adding, by the pause microservice, the transaction object to the streaming data platform with an acknowledgement indicating that processing of the transaction object has been paused, wherein processing of the plurality of transaction objects, by the plurality of microservices, continues in accordance with a workflow of the streaming data platform; retrieving, by a watchdog microservice and from the streaming data platform, a third plurality of transaction objects, wherein the third plurality of transaction objects comprises the transaction object with an indication that processing of the transaction object has been paused; and generating, by the watchdog microservice and based on determining that a predetermined amount of time after the transaction object was initially paused, an alert indicating that the transaction object remains paused.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    receiving, by a streaming data platform, a transaction object comprising transaction details and transaction metadata, wherein the transaction metadata comprises:
        an indication of a workflow corresponding to a transaction type of the transaction object, wherein the workflow corresponding to the transaction type comprises a plurality of processing steps required to validate a given transaction of the transaction type; and
        a current workflow stage of the transaction object;
    retrieving, by a first microservice of a plurality of microservices and from the streaming data platform, a plurality of transaction objects, wherein the plurality of transaction objects comprises the transaction object;
    determining, by the first microservice, whether the current workflow stage of the transaction object matches a first workflow stage associated with the first microservice;
    processing, by the first microservice and based on a determination that the current workflow stage matches the first workflow stage associated with the first microservice, the transaction object;
    determining, by the first microservice and during the processing of the transaction object, that the processing of the transaction object should be paused;
    adding, by the first microservice, the transaction object with an indication of a request to pause the processing of the transaction object to the streaming data platform;
    retrieving, by a pause microservice and from the streaming data platform, a second plurality of transaction objects, wherein the second plurality of transaction objects comprises the transaction object with the request to pause;
    adding, by the pause microservice, the transaction object to the streaming data platform with an indication that processing of the transaction object has been paused, wherein the transaction object is not processed in accordance with a workflow based on the indication that processing of the transaction object has been paused while processing of the plurality of transaction objects, by the plurality of microservices, continues in accordance with one or more workflows of the streaming data platform;
    updating, by the pause microservice, the current workflow stage of the transaction object to indicate that processing of the transaction object is to resume; and
    resuming, based on the updated current workflow stage, processing of the transaction object according to the workflow.

2. The computer-implemented method of claim 1, wherein the determining that the processing of the transaction object should be paused is based on a determination that additional processing external to the streaming data platform is required to complete the processing of the transaction object.

3. The computer-implemented method of claim 1, further comprising:
    transmitting, to a party external to the streaming data platform, an indication that processing of the transaction object has been paused; and
    receiving, from the party external to the stream data platform, a second acknowledgement that processing of the transaction object has been paused.

4. The computer-implemented method of claim 3, further comprising:
    determining, by a watchdog microservice, that a predetermined amount of time has elapsed since the transaction object was initially paused; and
    generating, by the watchdog microservice and based on a determination that the transaction object remains paused, an alert.

5. The computer-implemented method of claim 3, further comprising:
    receiving, from the party external to the streaming data platform, additional information associated with the transaction object; and
    updating, by the pause microservice, the transaction object with the additional information, wherein updating the current workflow stage of the transaction object to indicate that processing of the transaction object is to resume is in response to updating the transaction object with the additional information.

6. The computer-implemented method of claim 1, wherein resuming processing of the transaction object according to the workflow is based on the pause microservice receiving an indication to resume processing of the transaction object.

7. The computer-implemented method of claim 6, further comprising:
    updating, by the pause microservice and based on the indication to resume processing of the transaction object, the current workflow stage of the transaction object to indicate that processing of the transaction object is to advance to a third microservice.

8. The computer-implemented method of claim 6, further comprising:
    updating, by the pause microservice and based on the indication to resume processing of the transaction object, the current workflow stage of the transaction object to indicate that processing of the transaction object is to return to the first microservice.

9. The computer-implemented method of claim 8, further comprising:
    re-generating, by a snapshot microservice and based on an indication that the transaction object is to be re-executed by the first microservice, the transaction object based on snapshot data corresponding to the transaction object from prior to a start of the processing by the first microservice; and returning the re-generated transaction object to the streaming data platform, wherein a current workflow stage of the re-generated transaction object is set to the first workflow stage.

10. The computer-implemented method of claim 1, wherein resuming processing of the transaction object according to the workflow is based on receiving an indication to resume processing of the transaction object from a watchdog microservice after a predetermined amount of time has elapsed.

11. A transaction exchange platform comprising:
at least one processor; and
memory storing instructions that, when executed by the at least one processor, cause the transaction exchange platform to:
receive, by a streaming data platform, a transaction object comprising transaction details and transaction metadata, wherein the transaction metadata comprises:
an indication of a workflow corresponding to a transaction type of the transaction object, wherein the workflow corresponding to the transaction type comprises a plurality of processing steps required to validate a given transaction of the transaction type; and
a current workflow stage of the transaction object;
retrieve, by a first microservice of a plurality of microservices and from the streaming data platform, a plurality of transaction objects, wherein the plurality of transaction objects comprises the transaction object;
determine, by the first microservice, whether the current workflow stage of the transaction object matches a first workflow stage associated with the first microservice;
process, by the first microservice and based on a determination that the current workflow stage matches the first workflow stage associated with the first microservice, the transaction object;
determine, by the first microservice and during the processing of the transaction object, that the processing of the transaction object should be paused;
add, by the first microservice, the transaction object with an indication of a request to pause the processing of the transaction object to the streaming data platform;
retrieve, by a pause microservice and from the streaming data platform, a second plurality of transaction objects, wherein the second plurality of transaction objects comprises the transaction object with the request to pause;
add, by the pause microservice, the transaction object to the streaming data platform with an indication that processing of the transaction object has been paused, wherein the transaction object is not processed in accordance with a workflow based on the indication that processing of the transaction object has been paused while processing of the plurality of transaction objects, by the plurality of microservices, continues in accordance with one or more workflows of the streaming data platform;
update, by the pause microservice, the current workflow stage of the transaction object to indicate that processing of the transaction object is to resume; and
resume, based on the updated current workflow stage, processing of the transaction object according to the workflow.

12. The transaction exchange platform of claim 11, wherein the instructions, when executed by the at least one processor, cause the transaction exchange platform to determine that the processing of the transaction object should be paused by determining that additional processing external to the streaming data platform is required to complete the processing of the transaction object.

13. The transaction exchange platform of claim 11, wherein the instructions, when executed by the at least one processor, cause the transaction exchange platform to:
transmit, to a party external to the streaming data platform, an indication that processing of the transaction object has been paused; and
receive, from the party external to the stream data platform, a second acknowledgement that processing of the transaction object has been paused.

14. The transaction exchange platform of claim 13, wherein the instructions, when executed by the at least one processor, cause the transaction exchange platform to:
determine, by a watchdog microservice, that a predetermined amount of time has elapsed since the transaction object was initially paused; and
generate, by the watchdog microservice and based on a determination that the transaction object remains paused, an alert.

15. The transaction exchange platform of claim 13, wherein the instructions, when executed by the at least one processor, cause the transaction exchange platform to:
receive, from the party external to the streaming data platform, additional information associated with the transaction object; and
update, by the pause microservice, the transaction object with the additional information, wherein updating the current workflow stage of the transaction object to indicate that processing of the transaction object is to resume is in response to updating the transaction object with the additional information.

16. The transaction exchange platform of claim 11, wherein the instructions, when executed by the at least one processor, cause the transaction exchange platform to resume processing of the transaction object according to the workflow is based on the pause microservice receiving an indication to resume processing of the transaction object.

17. The transaction exchange platform of claim 16, wherein the instructions, when executed by the at least one processor, cause the transaction exchange platform to update a workflow stage of the transaction object to indicate that processing of the transaction object is to advance to a third microservice.

18. The transaction exchange platform of claim 16, wherein the instructions, when executed by the at least one processor, cause the transaction exchange platform to update a workflow stage of the transaction object to indicate that processing of the transaction object is to return to the first microservice.

19. The transaction exchange platform of claim 18, wherein the instructions, when executed by the at least one processor, cause the transaction exchange platform to:
re-generate, by a snapshot microservice and based on an indication that the transaction object is to be re-executed by the first microservice, the transaction object based on snapshot data corresponding to the transaction object from prior to a start of the processing by the first microservice; and return the re-generated transaction object to the streaming data platform, wherein a current workflow stage of the re-generated transaction object is set to the first workflow stage.

20. The transaction exchange platform of claim 14, wherein the instructions, when executed by the at least one processor, cause the transaction exchange platform to resume processing of the transaction object according to the workflow based on receiving the indication to resume processing of the transaction object from a watchdog microservice after a predetermined amount of time has elapsed.

21. One or more non-transitory computer readable media comprising instructions that, when executed, cause a transaction exchange platform to:
receive, by a streaming data platform, a transaction object comprising transaction details and transaction metadata, wherein the transaction metadata comprises:
an indication of a workflow corresponding to a transaction type of the transaction object, wherein the workflow corresponding to the transaction type comprises a plurality of processing steps required to validate a given transaction of the transaction type; and
a current workflow stage of the transaction object;
retrieve, by a first microservice of a plurality of microservices and from the streaming data platform, a plurality of transaction objects, wherein the plurality of transaction objects comprises the transaction object;
determine, by the first microservice, whether the current workflow stage of the transaction object matches a first workflow stage associated with the first microservice;
process, by the first microservice and based on a determination that the current workflow stage matches the first workflow stage associated with the first microservice, the transaction object;
determine, by the first microservice and during the processing of the transaction object, that the processing of the transaction object should be paused;
add, by the first microservice, the transaction object with an indication of a request to pause the processing of the transaction object to the streaming data platform;
retrieve, by a pause microservice and from the streaming data platform, a second plurality of transaction objects, wherein the second plurality of transaction objects comprises the transaction object with the request to pause; and
add, by the pause microservice, the transaction object to the streaming data platform with an indication that processing of the transaction object has been paused, wherein the transaction object is not processed in accordance with a workflow based on the indication that processing of the transaction object has been paused while processing of the plurality of transaction objects, by the plurality of microservices, continues in accordance with one or more workflows of the streaming data platform;
update, by the pause microservice, the current workflow stage of the transaction object to indicate that processing of the transaction object is to resume; and
resume, based on the updated current workflow stage, processing of the transaction object according to the workflow.

22. The one or more non-transitory computer readable media of claim 21, wherein the instructions, when executed, cause the transaction exchange platform to determine that the processing of the transaction object should be paused by determining that additional processing external to the streaming data platform is required to complete the processing of the transaction object.

23. The one or more non-transitory computer readable media of claim 21, wherein the instructions, when executed, cause the transaction exchange platform to:
transmit, to a party external to the streaming data platform, an indication that processing of the transaction object has been paused; and
receive, from the party external to the stream data platform, a second acknowledgement that processing of the transaction object has been paused.

24. The one or more non-transitory computer readable media of claim 23, wherein the instructions, when executed, cause the transaction exchange platform to:
determine, by a watchdog microservice, that a predetermined amount of time has elapsed since the transaction object was initially paused; and
generate, by the watchdog microservice and based on a determination that the transaction object remains paused, an alert.

25. The one or more non-transitory computer readable media of claim 23, wherein the instructions, when executed, cause the transaction exchange platform to:
receive, from the party external to the streaming data platform, additional information associated with the transaction object; and
update, by the pause microservice, the transaction object with the additional information, wherein updating the current workflow stage of the transaction object to indicate that processing of the transaction object is to resume is in response to updating the transaction object with the additional information.

26. The one or more non-transitory computer readable media of claim 21, wherein the instructions, when executed, cause the transaction exchange platform to resume processing of the transaction object according to the workflow is based on the pause microservice receiving an indication to resume processing of the transaction object.

27. The one or more non-transitory computer readable media of claim 26, wherein the instructions, when executed, cause the transaction exchange platform to update a workflow stage of the transaction object to indicate that processing of the transaction object is to advance to a third microservice.

28. The one or more non-transitory computer readable media of claim 26, wherein the instructions, when executed, cause the transaction exchange platform to update a workflow stage of the transaction object to indicate that processing of the transaction object is to return to the first microservice.

29. The one or more non-transitory computer readable media of claim 28, wherein the instructions, when executed, cause the transaction exchange platform to:
re-generate, by a snapshot microservice and based on an indication that the transaction object is to be re-executed by the first microservice, the transaction object based on snapshot data corresponding to the transaction object from prior to a start of the processing by the first microservice; and
return the re-generated transaction object to the streaming data platform, wherein a current workflow stage of the re-generated transaction object is set to the first workflow stage.

30. The one or more non-transitory computer readable media of claim 26, wherein the instructions, when executed, cause the transaction exchange platform to resume processing of the transaction object according to the workflow based on receiving the indication to resume processing of the transaction object from a watchdog microservice after a predetermined amount of time has elapsed.

\* \* \* \* \*